United States Patent
Yoshizawa

(10) Patent No.: US 7,603,276 B2
(45) Date of Patent: Oct. 13, 2009

(54) STANDARD-MODEL GENERATION FOR SPEECH RECOGNITION USING A REFERENCE MODEL

(75) Inventor: Shinichi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 523 days.

(21) Appl. No.: 10/534,869

(22) PCT Filed: Nov. 18, 2003

(86) PCT No.: PCT/JP03/14626

§ 371 (c)(1),
(2), (4) Date: May 12, 2005

(87) PCT Pub. No.: WO2004/047076

PCT Pub. Date: Jun. 3, 2004

(65) Prior Publication Data

US 2006/0053014 A1    Mar. 9, 2006

(30) Foreign Application Priority Data

Nov. 21, 2002  (JP)  ............................. 2002-338652
Mar. 27, 2003  (JP)  ............................. 2003-089179
Jul. 31, 2003   (JP)  ............................. 2003-284489

(51) Int. Cl.
*G10L 15/14*   (2006.01)
*G10L 15/06*   (2006.01)
(52) U.S. Cl. .................. 704/256.2; 704/243; 704/256
(58) Field of Classification Search ................ 704/243, 704/256.2, 256
See application file for complete search history.

(56) References Cited

U.S. PATENT DOCUMENTS 4,587,670 A * 5/1986 Levinson et al. ............. 704/256
5,450,523 A * 9/1995 Zhao ........................... 704/243

(Continued)

FOREIGN PATENT DOCUMENTS

JP         4-125599          4/1992

(Continued)

OTHER PUBLICATIONS

M. J. F. Gales, "*Cluster Adaptive Training for Speech Recognition*", 1998, Proceedings of ICSLP98, pp. 1783-1786.

(Continued)

*Primary Examiner*—Richemond Dorvil
*Assistant Examiner*—Eric Yen
(74) *Attorney, Agent, or Firm*—Wenderoth, Lind & Ponack, L.L.P.

(57) ABSTRACT

A standard model creating apparatus which provides a high-precision standard model used for pattern recognition such as speech recognition, character recognition, or image recognition using a probability model based on a hidden Markov model, Bayesian theory, or linear discrimination analysis; intention interpretation using a probability model such as a Bayesian net; data-mining performed using a probability model; and so forth. The standard model creating apparatus includes a reference model preparing unit that prepares at least one reference model; a reference model storing unit that stores the reference model prepared by the reference model preparing unit; and a standard model creating unit that creates a standard model by calculating statistics of the standard model so as to maximize or locally maximize the probability or likelihood with respect to the reference model stored in the reference storing unit.

8 Claims, 65 Drawing Sheets

U.S. PATENT DOCUMENTS

| | | | |
|---|---|---|---|
| 5,488,652 A * | 1/1996 | Bielby et al. | 379/88.03 |
| 5,684,924 A * | 11/1997 | Stanley et al. | 704/233 |
| 5,825,978 A * | 10/1998 | Digalakis et al. | 704/256 |
| 5,850,627 A * | 12/1998 | Gould et al. | 704/231 |
| 5,895,447 A * | 4/1999 | Ittycheriah et al. | 704/231 |
| 6,038,535 A * | 3/2000 | Campbell | 704/275 |
| 6,253,181 B1 * | 6/2001 | Junqua | 704/255 |
| 6,263,309 B1 * | 7/2001 | Nguyen et al. | 704/239 |
| 6,430,551 B1 * | 8/2002 | Thelen et al. | 707/3 |
| 6,442,519 B1 * | 8/2002 | Kanevsky et al. | 704/243 |
| 6,487,534 B1 * | 11/2002 | Thelen et al. | 704/270 |
| 6,526,379 B1 * | 2/2003 | Rigazio et al. | 704/245 |
| 6,725,195 B2 * | 4/2004 | Sankar et al. | 704/240 |
| 6,999,925 B2 * | 2/2006 | Fischer et al. | 704/243 |
| 7,191,130 B1 * | 3/2007 | Leggetter et al. | 704/254 |
| 7,209,880 B1 * | 4/2007 | Gajic et al. | 704/231 |
| 7,451,081 B1 * | 11/2008 | Gajic et al. | 704/231 |
| 7,480,617 B2 * | 1/2009 | Chu et al. | 704/256 |
| 7,487,091 B2 * | 2/2009 | Miyazaki | 704/255 |
| 2002/0077823 A1 * | 6/2002 | Fox et al. | 704/260 |
| 2003/0171931 A1 * | 9/2003 | Chang | 704/275 |

FOREIGN PATENT DOCUMENTS

| | | |
|---|---|---|
| JP | 7-69711 | 7/1995 |
| JP | 9-81178 | 3/1997 |
| JP | 10-268893 | 10/1998 |
| JP | 11-143486 | 5/1999 |
| JP | 3251005 | 11/2001 |
| JP | 2002-236494 | 8/2002 |

OTHER PUBLICATIONS

Shinichi Yoshizawa et al., "*Model-Integration Training Based on Maximum Likeihood for Speech Recognition*", disclosed in a collective treatise of Acoustical Society of Japan, Sep. 17, 2003, pp. 105-106.

Yoshizawa et al., "Unsupervised Speaker Adaptation Based on Sufficient HMM Statistics of Selected Speakers", Proceedings of the IEEE International Conference on Acoustics, Speech and Signal Processing (ICASSP '01), May 7, 2001, vol. 1, pp. 341-344.

Hihiri Imai, "*Speech Recognition (Onsei Ninshiki)*", Kyoritsu Shuppan Kabushikigaisha, Nov. 25, 1995 pp. 150-152.

"*Speech Information Processing (Onsei Jouhou Shori)*", Morikita Shuppan Kabushikigaisha, Jun. 30, 1988, pp. 100-104.

Kazuo Shigemasu, "*Introduction to Bayesian Statistic (Beizu Toukei Nyumon)*", Tokyo Daigaku Shuppankai, Apr. 30, 1995, pp. 42-53.

Shinichi Yoshizawa et al., "*Unsupervised Method for Learning Phonological Model Using Sufficient Statistic and Speaker Distance (Jubuntoukeiryo To Washakyori Wo Mochiita Onin Moderu No Kyoushi Nashi Gakushuhou*", the Institute of Electronics, Information and Communication Engineers, Mar. 1, 2002, vol. J85-D-II, No. 3, pp. 382-389.

* cited by examiner

FIG. 3
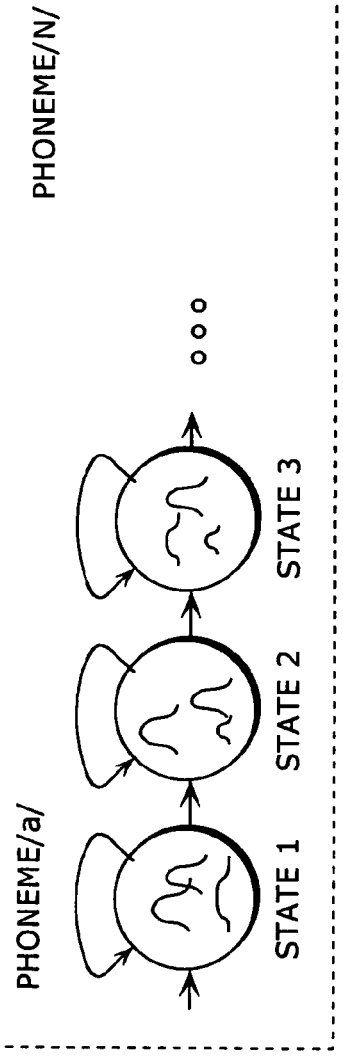
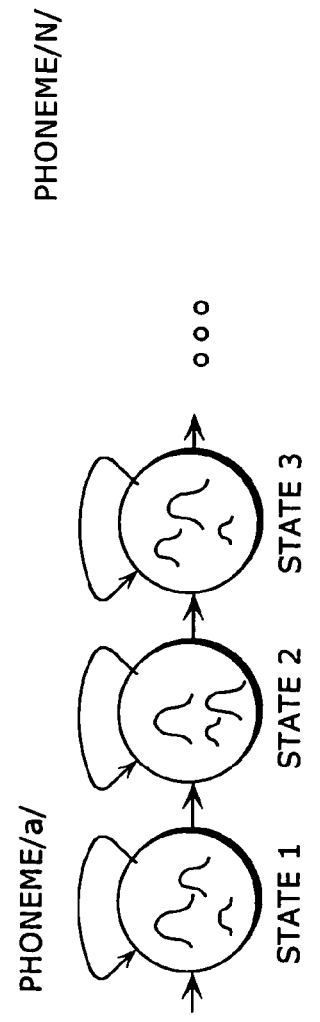
REFERENCE MODELS 121

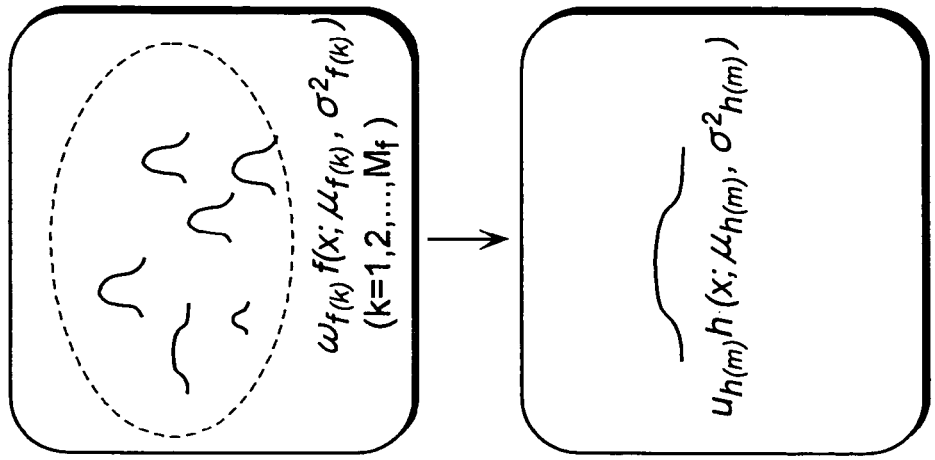

FIG. 7A

COMPLEXITY OF MODEL (NUMBER OF MIXTURE DISTRIBUTIONS)

THREE
TEN
TWENTY

FIG. 7B

USE APPARATUS

TELEVISION
CAR NAVIGATION
CELLULAR PHONE

FIG. 16

NOISE TYPE TO BE IDENTIFIED

| 1. VEHICLE | | 1. 1. CAR |
| | | 1. 2. BUS |
| | | 1. 3. TRUCK |

2. RAIN

3. AIRPLANE

4. WARNING SOUND

FIG. 22

```
NAME"FATHER"
ADDRESS"OSAKA CITY"    GENDER  □MALE  ■FEMALE
                       AGE "50 YEARS OLD"

HOBBY  ■MOTORING           □MASSAGE
          □WATCHING SPORTS    □COMPUTER
          □FISHING            □GAME
          □SHOPPING
          ■HOT SPRING
          □GOLF
          □CAMP
```

FIG. 25
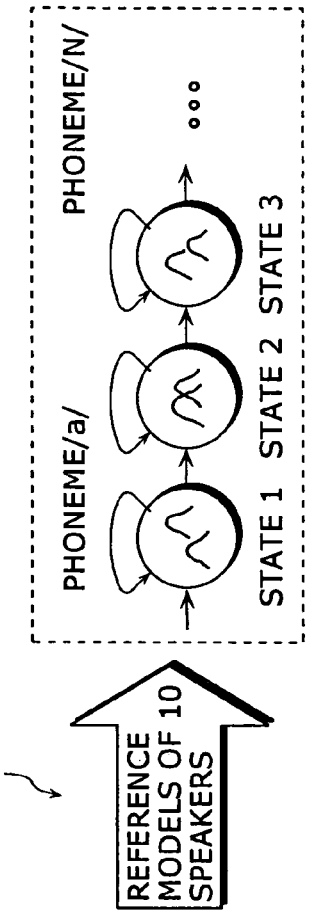
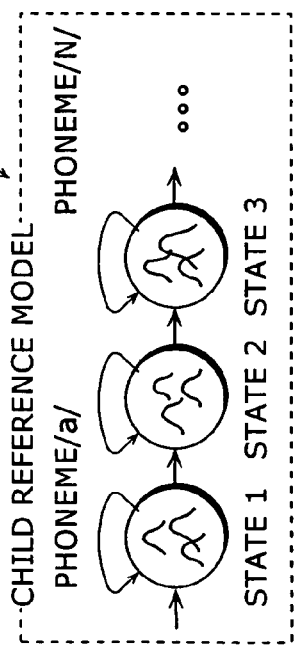
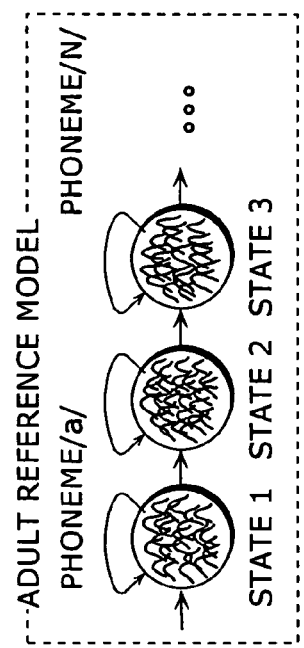
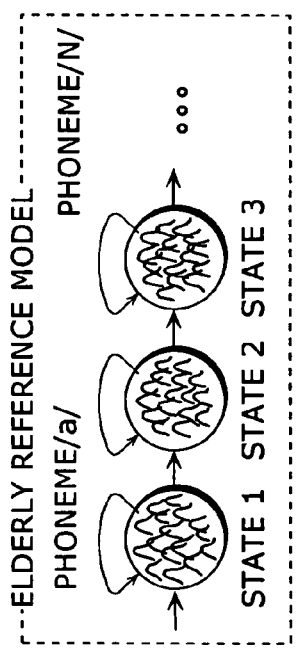

FIG. 31
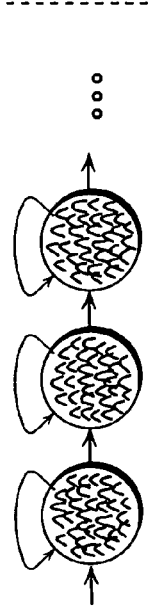
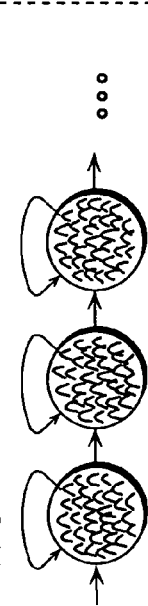
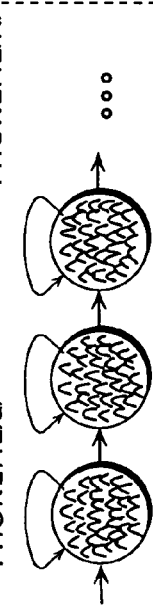
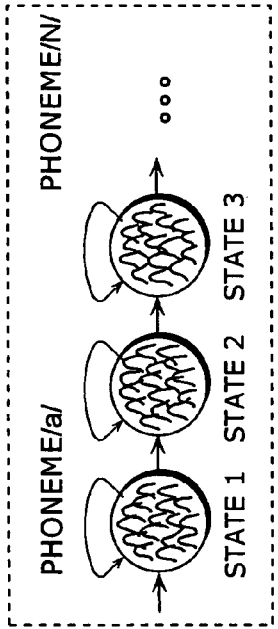

FIG. 41

| ID | APPLICATION NAME | SPECIFICATION INFORMATION |
|---|---|---|
| 1 | GAME A | NUMBER OF MIXTURE DISTRIBUTIONS 3 |
| 2 | GAME B | NUMBER OF MIXTURE DISTRIBUTIONS 5 |
| 3 | STOCK MARKET | NUMBER OF MIXTURE DISTRIBUTIONS 126 |
| 4 | TV REMOTE CONTROL | NUMBER OF MIXTURE DISTRIBUTIONS 5 |
| 5 | TRANSLATION | NUMBER OF MIXTURE DISTRIBUTIONS 64 |

FIG. 45
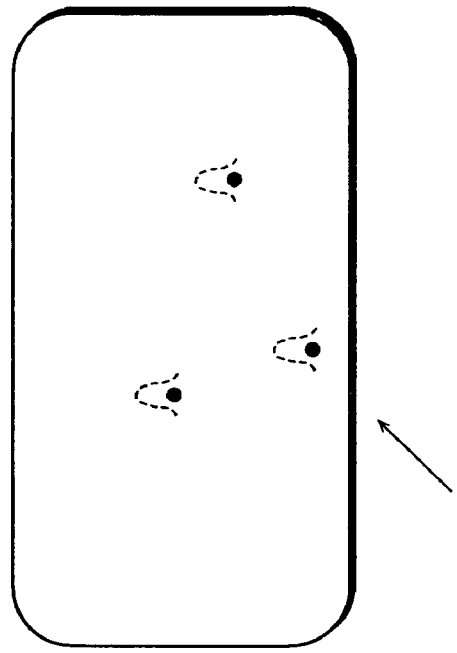
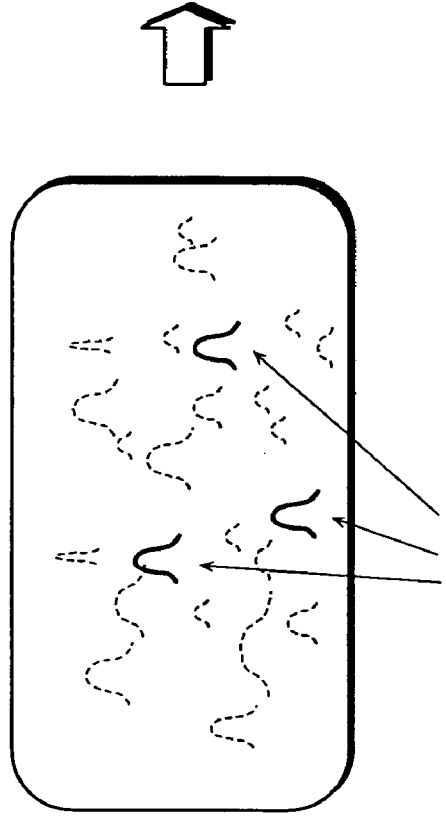

FIG. 52

CORRESPONDENCE TABLE AMONG CLASS ID,
INITIAL STANDARD MODEL, AND REFERENCE MODEL

| CLASS ID | INITIAL STANDARD MODEL | REFERENCE MODEL |
|---|---|---|
| 8A | INITIAL STANDARD MODEL 8A | REFERENCE MODEL 8AA |
| | | REFERENCE MODEL 8AB |
| | | REFERENCE MODEL 8AC |
| | | ⋮ |
| | | REFERENCE MODEL 8AZ |
| ⋮ | ⋮ | ⋮ |
| 64Z | INITIAL STANDARD MODEL 64Z | REFERENCE MODEL 64ZA |
| | | REFERENCE MODEL 64ZB |
| | | REFERENCE MODEL 64ZC |
| | | ⋮ |
| | | REFERENCE MODEL 64ZZ |

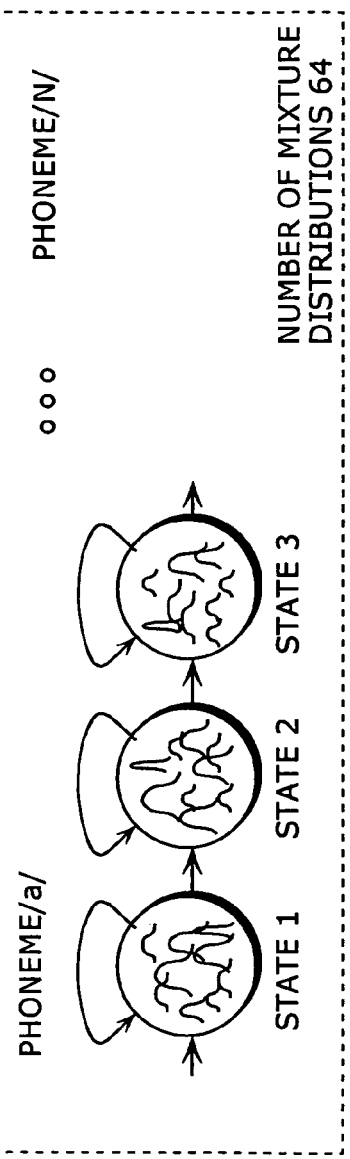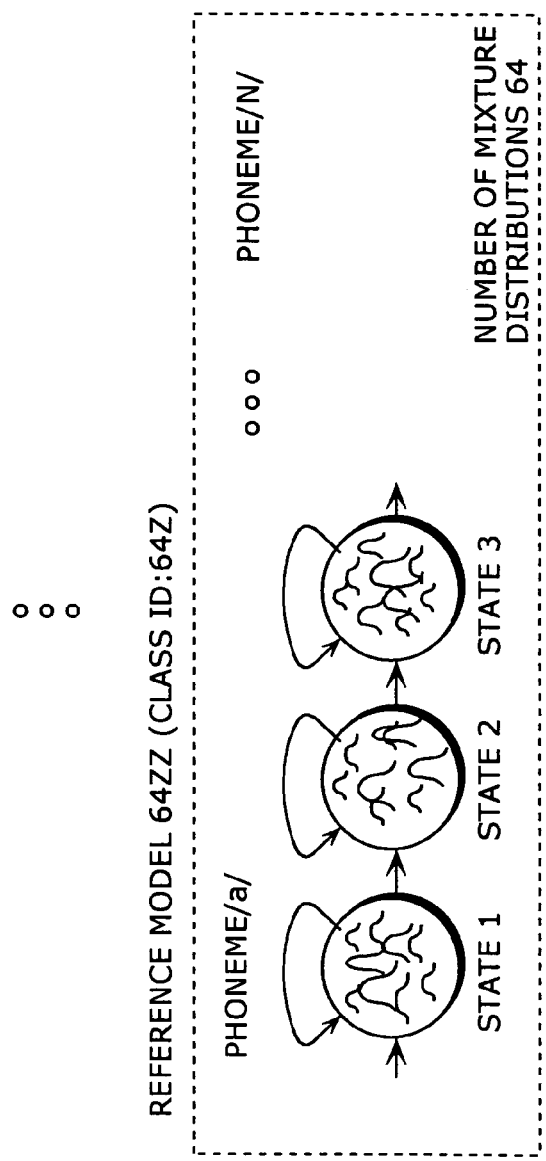
FIG. 54

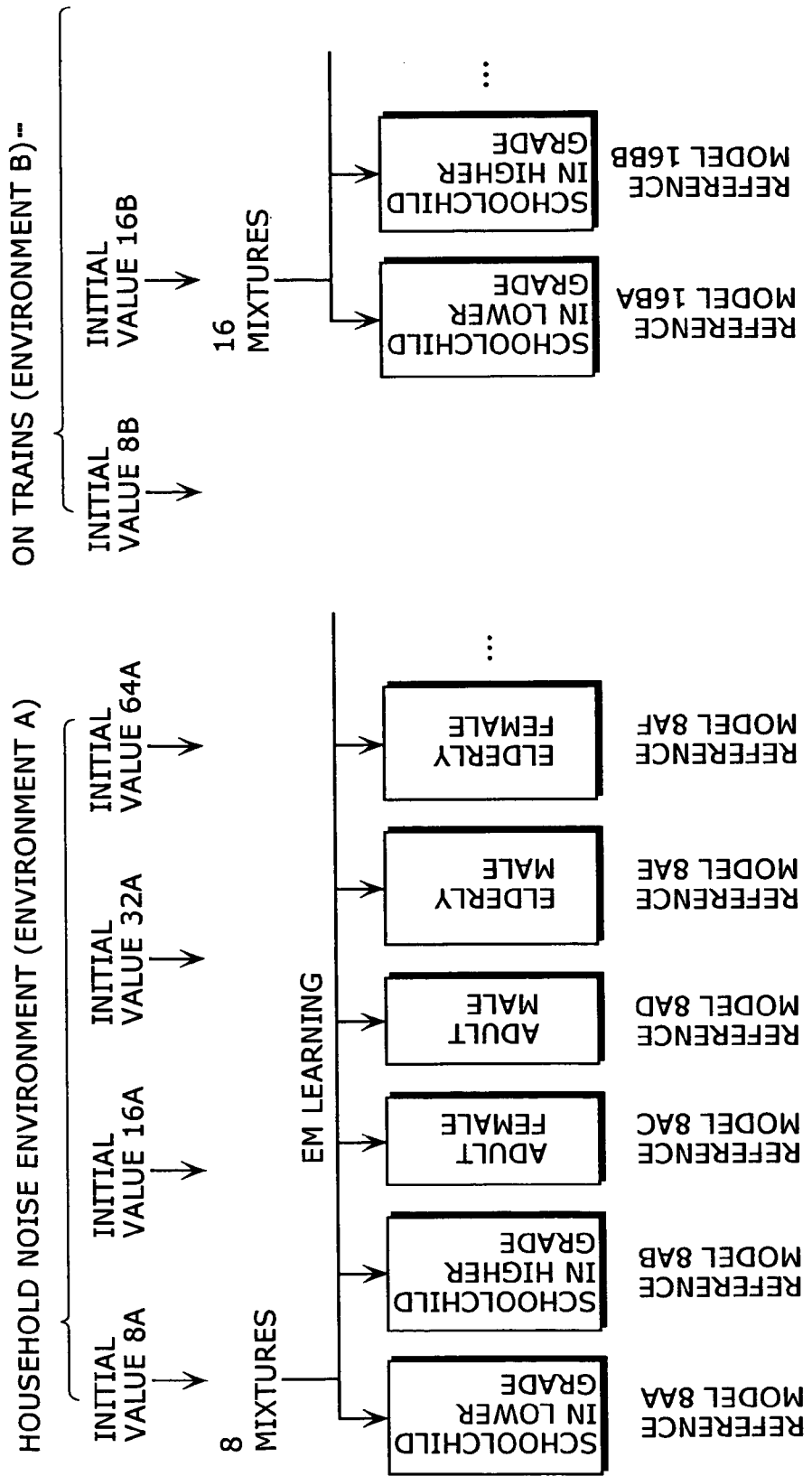

FIG. 60

| CLASS ID | INITIAL STANDARD MODEL | REFERENCE MODEL | REMARKS (CHARACTERISTICS OF REFERENCE MODEL) |
|---|---|---|---|
| 8A | INITIAL STANDARD MODEL 8A | REFERENCE MODEL 8AA | HOUSEHOLD NOISE, 8 MIXTURES, SCHOOLCHILD IN LOWER GRADE |
| | | REFERENCE MODEL 8AB | HOUSEHOLD NOISE, 8 MIXTURES, SCHOOLCHILD IN HIGHER GRADE |
| | | REFERENCE MODEL 8AC | HOUSEHOLD NOISE, 8 MIXTURES, ADULT FEMALE |
| | | ... | ... |
| 16A | INITIAL STANDARD MODEL 16A | REFERENCE MODEL 16AA | HOUSEHOLD NOISE, 16 MIXTURES, SCHOOLCHILD IN LOWER GRADE |
| | | REFERENCE MODEL 16AB | HOUSEHOLD NOISE, 16 MIXTURES, SCHOOLCHILD IN HIGHER GRADE |
| | | REFERENCE MODEL 16AC | HOUSEHOLD NOISE, 16 MIXTURES, ADULT FEMALE |
| | | ... | ... |
| ... | ... | ... | ... |
| 64B | INITIAL STANDARD MODEL 64B | REFERENCE MODEL 64BA | ON TRAINS, 8 MIXTURES, SCHOOLCHILD IN LOWER GRADE |
| | | REFERENCE MODEL 64BB | ON TRAINS, 8 MIXTURES, SCHOOLCHILD IN HIGHER GRADE |
| | | REFERENCE MODEL 64BC | ON TRAINS, 8 MIXTURES, ADULT FEMALE |
| | | ... | ... |

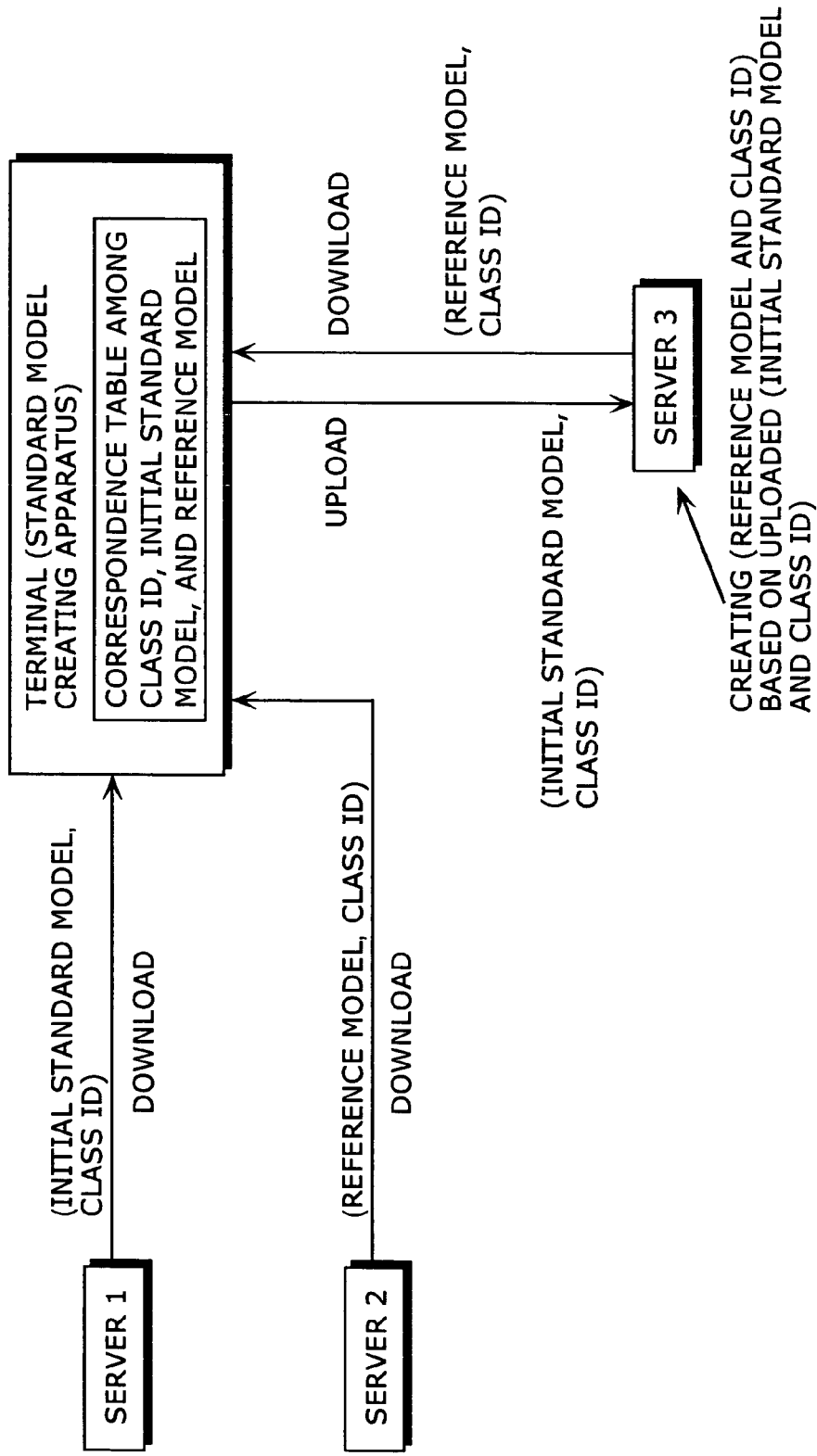

FIG. 63

| SELECTED REFERENCE MODELS | CLASS ID |
|---|---|
| SELECTED REFERENCE MODEL 8AA | 8A |
| SELECTED REFERENCE MODEL 16AA | 16A |
| SELECTED REFERENCE MODEL 16AB | 16A |
| SELECTED REFERENCE MODEL 16AC | 16A |
| SELECTED REFERENCE MODEL 16BA | 16B |
| SELECTED REFERENCE MODEL 64BA | 64B |

FIG. 65A

AGE    CHILD    ADULT    ELDERLY
STRUCTURE  64 MIXTURES  16 MIXTURES  100 MIXTURES

Reason: Due to variations in voices of children and the elderly, large number are set for their mixtures to create high-precision model.

FIG. 65B

GENDER    FEMALE    MALE
STRUCTURE  16 MIXTURES  64 MIXTURES

Reason: Variations in male voice are greater than those in female voice.

FIG. 65C

TEXTURE OF SPEAKER'S VOICE    NORMAL    HUSKY    HOARSE
STRUCTURE  16 MIXTURES  64 MIXTURES  100 MIXTURES

FIG. 65D

TONE OF VOICE WITH EMOTIONS    NORMAL    ANGRY VOICE    CRYING/LAUGHING VOICE
STRUCTURE  16 MIXTURES  64 MIXTURES  100 MIXTURES

FIG. 65E

SPEAKING RATE    NORMAL    FAST/SLOW
STRUCTURE  16 MIXTURES  100 MIXTURES

FIG. 65F

CIVILITY IN UTTERANCE    DECLAMATORY TONE    ADDRESSING TONE    CONVERSATIONAL TONE
STRUCTURE  16 MIXTURES  64 MIXTURES  200 MIXTURES

FIG. 65G

DIALECT    STANDARD LANGUAGE    OSAKA DIALECT    KAGOSHIMA DIALECT
STRUCTURE  16 MIXTURES  100 MIXTURES  200 MIXTURES

FIG. 65H

BACKGROUND NOISY (SN RATIO)    QUIET (30dB)    SLIGHTLY NOISY (20dB)    NOISY (10dB)
STRUCTURE  200 MIXTURES  64 MIXTURES  10 MIXTURES

Reason: If noisy, ambiguous model with a small number of mixtures can respond to variations in noise types.

FIG. 65I

MICROPHONE    STANDARD    LOW LEVEL    HIGH LEVEL
STRUCTURE  16 MIXTURES  10 MIXTURES  100 MIXTURES

FIG. 65J

COMPLEXITY IN RECOGNIZABLE VOCABULARY    WORD (SIMPLE)    SHORT SENTENCE    LONG SENTENCE (DIFFICULT)
STRUCTURE  10 MIXTURES  64 MIXTURES  200 MIXTURES

STANDARD-MODEL GENERATION FOR SPEECH RECOGNITION USING A REFERENCE MODEL

TECHNICAL FIELD

The present invention relates to an apparatus and a method for creating a standard model which is used for: pattern recognition, such as speech recognition, character recognition, or image recognition, using a probability model based on a hidden Markov model, Bayesian theory, or linear discrimination analysis; intention interpretation (intention recognition) using a probability model such as a Bayesian net; data-mining (recognition of data characteristics) performed using a probability model; human detection, fingerprint authentication, face authentication, and iris authentication (recognizing an object and then judging whether it is a specific object); predictions (recognizing a circumstance and then making a judgment) such as stock price prediction and weather prediction; synthesis of voices of a plurality of speakers and synthesis of a plurality of face images (people can recognize and enjoy the synthesized model); and so forth.

BACKGROUND ART

In recent years, the widespread use of the Internet or the like has advanced the increase in network capacity and the reduction in communication costs. On account of this, it has become possible to collect many recognition models (reference models) using the networks. For example, as to speech recognition, it has become possible to download, via the Internet, many speech recognition models (such as a child model, an adult model, an elderly model, an in-vehicle model, and a cell-phone model) distributed by various research institutions. Also, owing to the network connection between devices, it has become possible to download a speech recognition model to be used for a car navigation system or the like, to a television or a personal computer. As to intention interpretation, it has become possible to collect, via the network, recognition models which have learned experiences of various people living in different places.

Moreover, owing to the development of recognition technology, recognition models are used by a wide variety of devices, such as a personal computer, a television remote control, a cellular phone, and a car navigation system, each of which has different specifications for its CPU power, its memory capacity, etc. They are also used for a wide variety of applications which respectively require different specifications. As examples of such applications, there are an application requiring a recognition precision for security, etc., and an application requiring rapidity when a recognition result is outputted as in a case where an operation is performed using a television remote control.

Furthermore, the recognition technology is used in many environments in which recognition objects are different. For example, the speech recognition technology is used in many environments, such as where voices of children, adults, and the elderly are to be recognized and where voices in a vehicle or on a cellular phone are to be recognized.

In view of these changes in the social environment, it is preferable to create and provide a user with, in a short period of time, a high-precision recognition model (standard model) suitable for the specifications of apparatuses and applications and for usage environments, by effectively utilizing many recognition models (reference models).

In the field of pattern recognition such as speech recognition, a method that employs a probability model as a standard recognition model has received attention in recent years. Particularly, a hidden Markov model (referred to as an HMM hereafter) and a Gaussian mixture distribution model (referred to as a GMM hereafter) are widely used. Meanwhile, as to the intention interpretation, attention has been given in recent years to a method that employs a probability model as a standard recognition model representing intention, knowledge, preference, etc. Particularly, a Bayesian net and the like are widely used. In the field of data mining, attention has been given to a method that employs a probability model as a representative model for each category in order to classify data, and the GMM and the like are widely used for this. In the field of authentication such as speech authentication, fingerprint authentication, face authentication, and iris authentication, a method employing a probability model as a standard authentication model has received attention, and the GMM and the like are used. As a learning algorithm of a standard model represented by an HMM, the Baum-Welch re-estimation method is widely used (see, for example, Hijiri Imai, "Speech Recognition (Onsei Ninshiki)", Kyoritsu Shuppan Kabushikigaisha, Nov. 25, 1995, pp. 150-152). As a learning algorithm of a standard model represented by a GMM, the EM (Expectation-Maximization) algorithm is widely used (see, for example, Hiro Furui, "Speech Information Processing (Onsei Jouhou Shori)", Morikita Shuppan Kabushikigaisha, Jun. 30, 1998, pp. 100-104). According to the EM algorithm, the standard model is expressed as follows.

$$\sum_{m=1}^{M_f} \omega_{f(m)} f(x; \mu_{f(m)}, \sigma^2_{f(m)}) \quad \text{(Equation 1)}$$

(Here:

$$f(x; \mu_{f(m)}, \sigma_{f(m)}^2) \ (m=1,2,\ldots,M_f) \quad \text{(Equation 2)}$$

represents a Gaussian distribution; and $$x=(x_{(1)},x_{(2)},\ldots,x_{(J)}) \in R^J \quad \text{(Equation 3)}$$

represents input data in $J (\geq 1)$ dimension.) A mixture weighting coefficient showing a statistic represented as $$\omega_{f(m)} \ (m=1,2,\ldots,M_f), \quad \text{(Equation 4)}$$

a mean value in $J (\geq 1)$ dimension represented as $$\mu_{f(m)}=(\mu_{f(m,1)},\mu_{f(m,2)},\ldots,\mu_{f(m,J)}) \in R^J (m=1,2,\ldots, M_f, j=1,2,\ldots,J), \quad \text{(Equation 5)}$$

and a variance in $J (\geq 1)$ dimension (I diagonal elements of the covariance matrix) represented as $$\sigma_{f(m)}^2=(\sigma_{f(m,1)}^2,\sigma_{f(m,2)}^2,\ldots,\sigma_{f(m,J)}^2) \in R^J (m=1,2,\ldots, M_f, j=1,2,\ldots,J) \quad \text{(Equation 6)}$$

are repeatedly calculated one or more times for learning so as to maximize or locally maximize, on the basis of the N sets of learning data represented as $$x[i]=(x_{(1)}[i],x_{(2)}[i],\ldots,x_{(J)}[i]) \in R^J \ (i=1,2,\ldots,N), \quad \text{(Equation 7)}$$

the likelihood with respect to the learning data, the likelihood being represented as $$\log P = \sum_{i=1}^{N} \log \left[ \sum_{m=1}^{M_f} \omega_{f(m)} f(x[i]; \mu_{f(m)}, \sigma^2_{f(m)}) \right].$$ (Equation 8)

For such calculations, the following equations are used:

$$\omega_{f(m)} = \frac{\sum_{i=1}^{N} \gamma(x[i], m)}{\sum_{k=1}^{M_f} \sum_{i=1}^{N} \gamma(x[i], k)}$$ (Equation 9)

$(m = 1, 2, \ldots, M_f);$ $$\mu_{f(m,j)} = \frac{\sum_{i=1}^{N} \gamma(x[i], m) x_{(j)}}{\sum_{i=1}^{N} \gamma(x[i], m)}$$ (Equation 10)

$(m = 1, 2, \ldots, M_f, j = 1, 2, \ldots, J);$ and $$\sigma^2_{f(m,j)} = \frac{\sum_{i=1}^{N} \gamma(x[i], m)(x_{(j)} - \mu_{f(m,j)})^2}{\sum_{i=1}^{N} \gamma(x[i], m)}$$ (Equation 11)

$(m = 1, 2, \ldots, M_f, j = 1, 2, \ldots, J).$ (Here:

$$\gamma(x[i], m) = \frac{\omega_{f(m)} f(x[i]; \mu_{f(m)}, \sigma^2_{f(m)})}{\sum_{k=1}^{M_f} \omega_{f(k)} f(x[i]; \mu_{f(k)}, \sigma^2_{f(k)})} \quad (m = 1, 2, \ldots, M_f)$$ (Equation 12)

Moreover, a method such as the Bayes estimation method has been suggested (see, for example, Kazuo Shigemasu, "Introduction to Bayesian Statistic (Beizu Toukei Nyumon)", Tokyo Daigaku Shuppankai, Apr. 30, 1985, pp. 42-53). In each of the leaning algorithms, including the Baum-Welch re-estimation method, the EM algorithm, and the Bayes estimation method, a standard model is created by calculating parameters (statistics) of the standard model so as to maximize or locally maximize the probability (likelihood) with respect to the learning data. These learning methods realize maximization or local maximization of the probability (likelihood), that is to say, the mathematical optimization is realized.

In a case where the above-stated learning methods are used for creating a standard model for speech recognition, it is preferable to learn the standard model based on a number of sets of speech data in order to respond to variations in the amount of acoustic characteristics, such as various kinds of speakers and noises. In a case where these methods are used for intention interpretation, it is preferable to learn the standard model based on a number of sets of data in order to respond to variations in speakers and circumstances. Also, in a case where these methods are used for iris authentication, it is preferable to learn the standard model based on a number of sets of iris image data in order to respond to variations in the sunlight and the position and rotation of a camera. However, when such a number of sets of data are treated, it requires an immense amount of time and, therefore, the standard model cannot be provided for the user in a short period of time. In addition, the cost to accumulate such a great amount of data will become enormous. Also, if such data is collected via the network, the communication cost becomes enormous.

Meanwhile, there is a suggested method by which a standard model is created by synthesizing a plurality of models (hereafter, a model prepared for reference in creating a standard model is referred to as a "reference model"). The reference model is a probability distribution model where: a number of sets of learning data is expressed by population parameters (mean, variance, etc.) of a probability distribution; and characteristics of a number of sets of learning data are integrated by a small number of parameters (population parameters). In the conventional technologies described below, the model is represented by the Gaussian distribution.

According to a first conventional method, a reference model is represented by a GMM, and a standard model is created by synthesizing GMMs of a plurality of the reference models by their weights (this technology is disclosed in Japanese Laid-Open Patent Application No. 4-125599, for example).

According to a second conventional method, in addition to the first conventional method, a standard model is created by learning a mixture weight combined linearly through maximization or local maximization of the probability (likelihood) with respect to learning data (this technology is disclosed in Japanese Laid-Open Patent Application No. 10-268893, for example).

According to a third conventional method, a standard model is created by expressing mean values of the standard model using linear combination of mean values of reference models, and then learning a linear combination coefficient by maximizing or locally maximizing the probability (likelihood) with respect to input data. Here, speech data of a specific speaker is used as the learning data, and the standard model is used as a speaker adaptive model for speech recognition (see, for example, M. J. F. Gales, "Cluster Adaptive Training for Speech Recognition", 1998, Proceedings of ICSLP98, pp. 1783-1786).

According to a fourth conventional technology, a reference model is represented by a single Gaussian distribution. A standard model is created by synthesizing the Gaussian distributions of a plurality of reference models and then integrating the Gaussian distributions belonging to the same class through clustering (see Japanese Laid-Open Patent Application No. 9-81178, for example).

According to a fifth conventional technology, a plurality of reference models are represented by Gaussian mixture distributions having the same number of mixtures, and a serial number is assigned to each Gaussian distribution on a one-on-one basis. A standard model is created by synthesizing the Gaussian distributions having the same serial number. A plurality of the reference models to be synthesized are created based on speakers that are acoustically similar to the user, and the standard model to be created is a speaker adaptive model (see, for example, Yoshizawa and six others, "Unsupervised Method for Learning Phonological Model using Sufficient Statistic and Speaker Distance (Jubuntoukeiryo To Washakyori Wo Mochiita Onin Moderu No Kyoushi Nashi Gakushuhou)", the Institute of Electronics, Information and Communication Engineers, Mar. 1, 2002, Vol. J85-D-II, No. 3, pp. 382-389).

Using the first conventional technology, however, the number of mixtures of the standard model is increased along with an increase in the number of the reference models to be synthesized. Thus, the storage capacity and amount of recognition processing for the standard model become enormous, and this is impractical. In addition, the number of mixtures of the standard model cannot be controlled in accordance with the specifications. This problem is considered to become prominent with an increase in the number of the reference models to be synthesized.

Using the second conventional technology, the number of mixtures of the standard model is increased along with an increase in the number of the reference models to be synthesized. Thus, the storage capacity and amount of recognition processing for the standard model become enormous, and this is impractical. In addition, the number of mixtures of the standard model cannot be controlled in accordance with the specifications. Moreover, since the standard model is a simple mixed sum of the reference models and a parameter to be learned is limited to a mixture weighting, a high-precision standard model cannot be created. Furthermore, since the learning is performed using great amounts of learning data to create the standard model, it requires a long period of learning time. These problems are considered to become prominent with an increase in the number of the reference models to be synthesized.

Using the third conventional technology, a parameter to be learned is limited to a linear combination coefficient of the mean values of the reference models. For this reason, a high-precision standard model cannot be created. Moreover, since the learning is performed using great amounts of learning data to create the standard model, it requires a long period of learning time.

Using the fourth conventional technology, clustering is heuristically performed and, therefore, it is difficult to create a high-precision standard model. Moreover, the precision of the reference model is low due to the single Gaussian distribution, and the precision of the standard model that is created by integrating such models is also low. The problem related to the recognition precision is considered to become prominent with an increase in the number of the reference models to be synthesized.

Using the fifth conventional technology, the standard model is created by synthesizing the Gaussian distributions having the same serial number. However, in order to create an optimum standard model, the Gaussian distributions to be synthesized do not always correspond on a one-on-one basis in general. For this reason, the precision of the recognition decreases. Moreover, in a case where a plurality of the reference models have the different numbers of mixtures, the standard model cannot be created. Furthermore, a serial number is not assigned to the Gaussian distribution of the reference model in general and, in this case, the standard model cannot be created. In addition, the number of mixtures of the standard model cannot be controlled in accordance with the specifications.

DISCLOSURE OF INVENTION

The present invention has been conceived in view of the stated problems, and it is an object of this invention to provide a standard model creating apparatus for creating a high-precision standard model that is used for: pattern recognition such as speech recognition, character recognition, or image recognition using a probability model based on a hidden Markov model, Bayesian theory, or linear discrimination analysis; intention interpretation (intention recognition) using a probability model such as a Bayesian net; data-mining (recognition of data characteristics) performed using a probability model; predictions (recognizing a circumstance and then making a judgment) such as stock price prediction and weather prediction; and so forth.

It is another object of the present invention to provide a standard model creating apparatus and the like which can easily create a standard model without requiring learning data or instructor data.

Moreover, it is another object of the present invention to provide a standard model creating apparatus and the like which is superior in general versatility and flexibility, can create a standard model appropriate to an object of recognition that is performed using the standard model, and can create a standard model suitable for the specifications and environment of an apparatus that executes recognition processing using the standard model.

The expression "recognition" used for describing the present invention means not only narrowly-defined recognition such as speech recognition, but also general recognition including pattern matching, identification, authentication, Bayes estimation, and prediction that is performed using a standard model expressed by a probability.

To achieve the stated objects, the standard model creating apparatus of the present invention is an apparatus for creating a standard model used for recognition defined by an output probability of transitions between a group of events and an event or among events, being provided with: a reference model storing unit operable to store at least one reference model created beforehand for recognizing a specific object; and a standard model creating unit operable to create a standard model by calculating statistics of the standard model so as to maximize or locally maximize a probability or a likelihood of the standard model with respect to the at least one reference model stored in the reference model storing unit.

For example, as a standard model creating apparatus for creating a standard model which shows an acoustic characteristic having a specific attribute and is used for speech recognition, using a probability model that expresses a frequency parameter showing an acoustic characteristic as an output probability, the standard model creating apparatus is made up of: a reference model storing unit operable to store at least one reference model which is a probability model showing an acoustic characteristic having a specific attribute; and a standard model creating unit operable to create the standard model by calculating statistics of the standard model using statistics of the at least one reference model stored in the reference model storing unit, wherein the standard model creating unit is operable to include: a standard model structure determining unit operable to determine a structure of the standard model which is to be created; an initial standard model creating unit operable to determine initial values of the statistics specifying the standard model whose structure has been determined; and a statistics estimating unit operable to estimate and calculate the statistics of the standard model so as to maximize or locally maximize a probability or a likelihood of the standard model, whose initial values have been determined, with respect to the reference model.

With this structure, a standard model is created by calculating statistics of the standard model so as to maximize or locally maximize a probability or a likelihood of the standard model with respect to at least one reference model. Thus, a standard model is easily created without requiring learning data or instructor data, such as speech data. In addition, a high-precision standard model is created with comprehensive consideration given to a plurality of reference models which are already created.

Here, the standard model creating unit may further include a reference model preparing unit operable to at least one of: obtain a reference model from an outside source and store the obtained reference model into the reference model storing unit; and create a reference model and store the reference model into the reference model storing unit. For example, for a case of applying to speech recognition, as a standard model creating apparatus for creating a standard model which shows an acoustic characteristic having a specific attribute and is used for speech recognition, using a probability model that expresses a frequency parameter showing an acoustic characteristic as an output probability, the apparatus is made up of: a reference model storing unit operable to store at least one reference model which is a probability model showing an acoustic characteristic having a specific attribute; a reference model preparing unit operable to at least one of: obtain a reference model from an outside source and store the obtained reference model into the reference model storing unit; and create a new reference model and store the new reference model into the reference model storing unit; and a standard model creating unit operable to prepare initial values of statistics of the standard model having a predetermined structure and to create a standard model by calculating the statistics of the standard model using the statistics of the reference model so as to maximize or locally maximize a probability or a likelihood of the standard model with respect to the reference model stored in the reference model storing unit.

With this structure, a new reference model can be obtained from outside of the standard model creating apparatus, and a standard model can be created based on the obtained reference model. Thus, a high-precision standard model creating apparatus having a high versatility to respond to various objects of recognition is realized.

The standard model creating apparatus may be made up of: a usage information creating unit operable to create usage information regarding an object of recognition; and a reference model selecting unit operable to select at least one reference model from among the at least one reference model stored in the reference model storing unit, on the basis of the created usage information, wherein the standard model creating unit may calculate statistics of the standard model so as to maximize or locally maximize a probability or a likelihood of the standard model with respect to the reference model selected by the reference model selecting unit.

With this structure, only the reference models appropriate to an object of recognition are selected from among the prepared plurality of reference models, on the basis of the usage information such as the user's characteristics, age, gender, and the usage environment. Then, these reference models are integrated to create a standard model. As such, a high-precision standard model tailored to a specific object of recognition is created.

Here, the standard model creating apparatus may be made up of a similarity judging unit operable to: calculate a degree of similarity between the usage information and the information regarding the selected reference model; judge whether the similarity degree is equal to or more than a predetermined threshold; and create a judgment signal.

With this structure, if a reference model appropriate (or, similar) to the usage information does not exist in the reference model storing unit, a preparation of a reference model can be requested.

Moreover, the standard model creating apparatus may be connected to a terminal apparatus via a communication channel and further made up of: a usage information receiving unit operable to receive usage information regarding an object of recognition from the terminal apparatus; and a reference model selecting unit operable to select at least one reference model from among the at least one reference model stored in the reference model storing unit, on the basis of the received usage information, wherein the standard model creating unit may calculate statistics of the standard model so as to maximize or locally maximize a probability or a likelihood of the standard model with respect to the reference model selected by the reference model selecting unit.

With this structure, a standard model is created on the basis of the usage information transmitted via the communication channel. On account of this, a standard model can be created by remote control and establishment of a recognition system based on a communication system can also be realized.

Moreover, the standard model creating apparatus may be further made up of: a specification information creating unit operable to create specification information regarding specifications of the standard model to be created, wherein the standard model creating unit may calculate statistics of the standard model so as to maximize or locally maximize a probability or a likelihood of the standard model with respect to the reference model on the basis of the specification information created by the specification information creating unit.

With this structure, a standard model is created on the basis of the specification information regarding: a CPU power or a storage capacity of an apparatus that uses the standard model; a required degree of recognition; a requested recognition processing time; or the like. On account of this, it becomes possible to create a standard model that satisfies a specific specification condition, thereby realizing creation of a standard model that is appropriate to a resource environment, such as a calculation engine, necessary for recognition processing.

Here, the specification information may show specifications corresponding to a type of an application program which uses the standard model. The standard model creating apparatus may be further made up of a specification information holding unit operable to hold an application/specifications correspondence database showing a correspondence between an application program which uses the standard model and specifications of the standard model, and the standard model creating unit may read the specifications corresponding to an application program to be activated from the application/specifications correspondence database held by the specification information holding unit and may calculate statistics of the standard model so as to maximize or locally maximize a probability or a likelihood of the standard model with respect to the reference model on the basis of the read specifications.

With this structure, a standard model is created in accordance with the specifications associated with a corresponding application. On account of this, an optimum standard model can be created for each application, thereby improving the recognition degree of a recognition system or the like that uses the standard model.

Moreover, the standard model creating apparatus may be connected to a terminal apparatus via a communication channel and further made up of a specification information receiving unit operable to receive specification information regarding specifications of the standard model to be created from the terminal apparatus, wherein the standard model creating unit may calculate statistics of the standard model so as to maximize or locally maximize a probability or a likelihood of the standard model with respect to the reference model on the basis of the specification information received by the specification information receiving unit.

With this structure, a standard model is created on the basis of the usage information transmitted via the communication channel. On account of this, a standard model can be created by remote control and establishment of a recognition system based on a communication system can also be realized.

For example, each of the reference model and the standard model may be expressed using at least one Gaussian distribution, wherein the standard model creating unit may determine the number of mixture distributions (the number of Gaussian distributions) of the standard model on the basis of the specification information.

In this way, the number of mixture distributions of a Gaussian distribution included in a standard model to be created is dynamically determined. Thus, it becomes possible to control the structure of the standard model, depending on an environment where the recognition processing is to be performed and on required specifications. As examples, in cases where a CPU power of a recognition apparatus that uses the standard model is small, where a storage capacity of a recognition apparatus that uses the standard model is small, and where a requested recognition processing time is short, the number of mixture distributions of the standard model can be set at a small number to respond to the specifications. Meanwhile, in a case where a required degree of recognition is high, the number of mixture distributions can be set at a large number to raise the degree of recognition.

It should be noted that the reference model preparing unit is not necessarily required if a standard model is created using the usage information or the specification information. This is because reference models may be stored into a standard model creating apparatus prior shipment on the basis of the user's request or regardless of the user's request, for example, and then a standard model can be created using the usage information or the specification information.

Moreover, each of the reference model and the standard model may be expressed using at least one Gaussian distribution, wherein the reference model storing unit may store a pair of reference models, each having at least a different number of mixture distributions (the number of Gaussian distributions), and the standard model creating unit may calculate the statistics of the standard model so as to maximize or locally maximize a probability or a likelihood of the standard model with respect to the pair of reference models, each having at least a different number of mixture distributions (the number of Gaussian distributions).

With this, a standard model is created on the basis of the reference models each having a different number of mixture distributions. Thus, it becomes possible to create a standard model on the basis of the prepared reference models having various structures, so that creation of a high-precision standard model more appropriate to an object of recognition is realized.

The standard model creating apparatus may be further made up of a standard model storing unit operable to store a standard model created by the standard model creating unit.

With this structure, it becomes possible to temporarily buffer the created standard model so as to immediately output it in response to a transmission request. Alternatively, it can play a role as a data server that provides for other apparatuses.

The standard model creating apparatus may be connected to a terminal apparatus via a communication channel and further made up of a standard model transmitting unit operable to transmit the standard model created by the standard model creating unit to the terminal apparatus.

With this structure, the created standard model is transmitted to an external apparatus that is located at a spatially distant place. Thus, the present standard model creating apparatus can be independent as a standard model creating engine, or can function as a server in a communication system.

The standard model creating apparatus may be connected to a terminal apparatus via a communication channel and further made up of a reference model receiving unit operable to receive the reference model transmitted from the terminal apparatus, wherein the standard model creating unit may calculate the statistics of the standard model so as to maximize or locally maximize a probability or a likelihood of the standard model with respect to the reference model received by the reference model receiving unit.

Accordingly, the reference model held by the terminal apparatus and suitable for the usage environment is transmitted via the communication channel, and a standard model can be created using the transmitted reference model. As a result, creation of a high-precision standard model more appropriate to an object of recognition is realized. As an example, suppose that a reference model A which has been used by a user A in an environment A is held by the terminal apparatus and the user A now wishes to use it in an environment B. In this case, by creating a standard model using the reference model A, a high-precision standard model reflecting the characteristics of the user A can be created.

The reference model preparing unit may perform at least one of an update and an addition to the reference model stored in the reference model storing unit. For example, the standard model creating apparatus may be connected to a terminal apparatus via a communication channel and further made up of a reference model receiving unit operable to receive the reference model transmitted from the terminal apparatus, wherein the reference model preparing unit may perform at least one of an update and an addition to the reference model stored in the reference model storing unit using the reference model received by the reference model receiving unit.

Accordingly, addition or update is made to the prepared reference model. Thus, a model responding to various kinds of recognition objects can be added as a reference model or can be replaced with a reference model with a higher degree of precision. As a result, a standard model can be recreated using the updated reference model, and feedback learning where the created standard model is used as a reference model to recreate a standard model becomes possible.

The standard model creating unit may include: a standard model structure determining unit operable to determine a structure of the standard model which is to be created; an initial standard model creating unit operable to determine initial values of the statistics specifying the standard model whose structure has been determined; and a statistics estimating unit operable to estimate and calculate the statistics of the standard model so as to maximize or locally maximize a probability or a likelihood of the standard model with respect to the reference model. Here, the initial standard model creating unit may determine initial values of statistics specifying the standard model using the at least one reference model that is used by the statistics estimating unit for calculating the statistics of the standard model. For example, the initial standard model creating unit may determine the initial values on the basis of a class ID identifying the type of the standard model. To be more specific, the initial standard model creating unit may hold a correspondence table showing a correspondence among the class ID, the initial values, and the reference model, and then may determine the initial values in accordance with the correspondence table.

Accordingly, a class ID is assigned for each type of recognition objects for which the standard model is to be used, so that an initial standard model having the same properties as the ultimately required standard model can be used. As such, a high-precision standard model is created.

As described so far, the present invention provides a high-precision standard model that is used for : pattern recognition such as speech recognition, character recognition, or image recognition using a probability model based on a hidden Markov model, Bayesian theory, or linear discrimination analysis; intention interpretation (intention recognition) using a probability model such as a Bayesian net; data-mining (recognition of data characteristics) performed using a probability model; human detection, fingerprint authentication, face authentication, and iris authentication (recognizing an object and then judging whether it is a specific object); predictions (recognizing a circumstance and then making a judgment) such as stock price prediction and weather prediction; and so forth. This practical value is extremely high.

It should be noted that the present invention can be realized not only as such a standard model creating apparatus, but also as a standard model creating method having steps represented by the characteristic components provided for the standard model creating apparatus and as a program causing a computer to execute these steps. Also, it should be understood that this program can be distributed via a recording medium such as a CD-ROM or via a transmission medium such as the Internet.

BRIEF DESCRIPTION OF DRAWINGS

FIG. 3 shows examples of reference models stored in a reference model storing unit shown in FIG. 1.

FIG. 5 is a diagram illustrating an approximate calculation performed by a first approximating unit 104e shown in FIG. 1.

FIG. 7A shows a screen display example used when the structure (the number of mixture distributions) of a standard model to be created is designated; and FIG. 7B shows a screen display example used when specification information is selected.

FIG. 16 shows an example of a selection screen of the PDA.

FIG. 22 shows an example of a screen displayed when personal information as usage information is inputted.

FIG. 25 shows examples of the reference models and standard models in order to explain the operational procedure executed by the server.

FIG. 31 shows examples of the reference models and standard model in order to explain the operational procedure executed by the server.

FIG. 41 shows an example of data of an application/specification information correspondence database.

FIG. 45 shows a specific example of step S1004 in FIG. 44.

FIG. 52 shows an example of a correspondence table among class ID, initial standard model, and reference model.

FIG. 54 shows examples of reference models 64ZA to 64ZZ in the correspondence table among class ID, initial standard model, and reference model shown in FIG. 52.

FIG. 59 shows a specific example of the step S1103 in FIG. 56.

FIG. 60 shows a specific example of the step S1104 in FIG. 56.

FIG. 61 is a diagram showing a procedure executed by a terminal to complete a correspondence table among class ID, initial standard model, and reference model by communicating with a server.

FIG. 63 shows a specific example of the step S1105 in FIG. 62.

FIG. 65A to 65J respectively show examples of a relation between an attribute of a speech recognition object and a structure (the number of Gaussian mixture distributions) of the standard model.

BEST MODE FOR CARRYING OUT THE INVENTION

Figure 1:
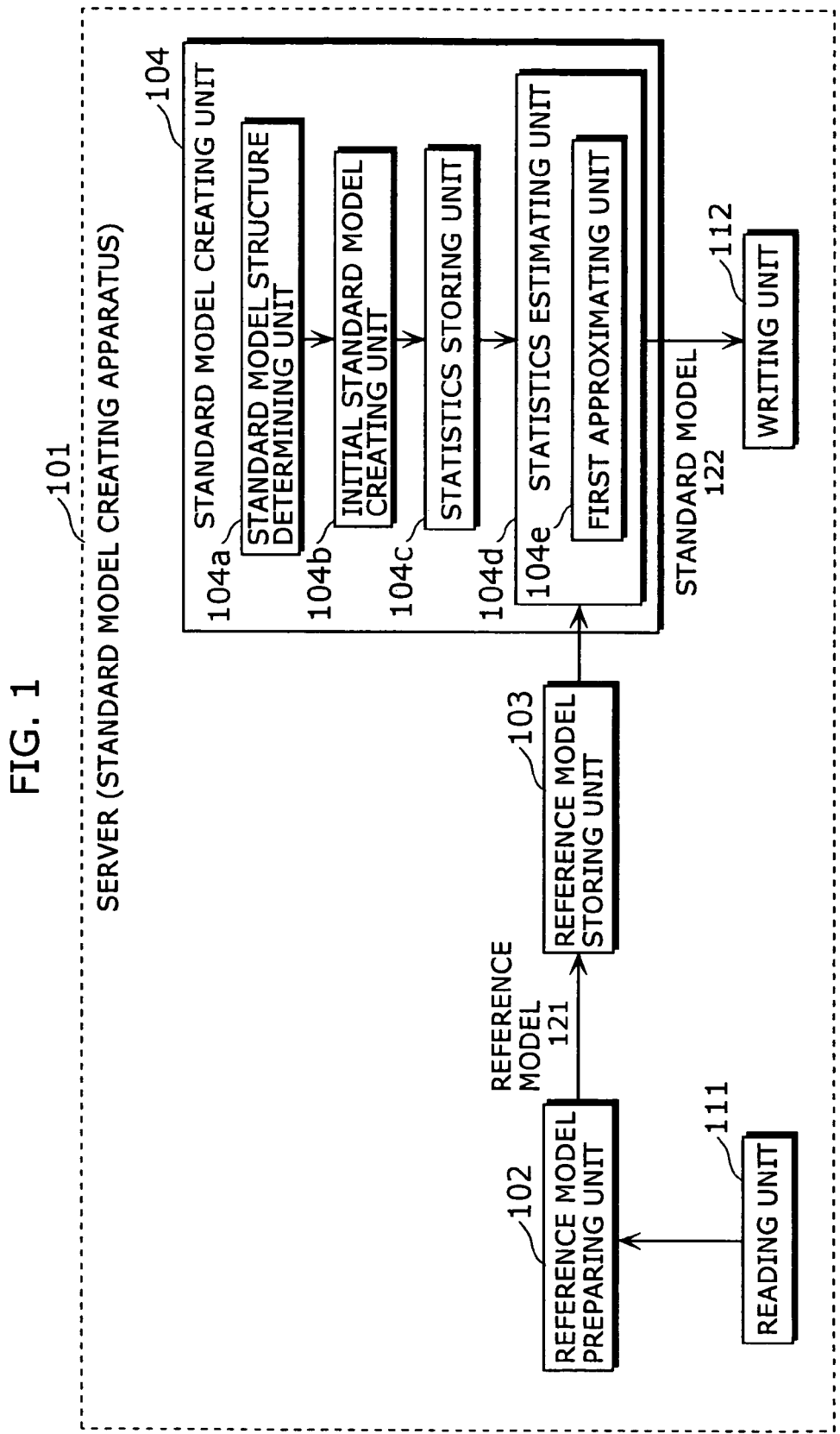
FIG. 1 is a block diagram showing the overall structure of a server related to a standard model creating apparatus in the first embodiment of the present invention.

The following is a description of embodiments of the present invention, with reference to the drawings. It should be noted that the same numerals will be given to the same or equivalent parts in the drawings, and the explanation of them will not be repeated.

First Embodiment

FIG. 1 is a block diagram showing the overall structure of a standard model creating apparatus in the first embodiment of the present invention. This diagram shows an example in which the standard model creating apparatus of the present invention is embedded in a server 101 of a computer system. In the present embodiment, an explanation is given as to a case, as an example, where a standard model for speech recognition that shows an acoustic characteristic having a specific attribute is created.

The server 101 is a computer apparatus or the like used in a communication system. As a standard model creating apparatus for creating a standard model for speech recognition that is defined by a hidden Markov model represented by an output probability of transitions between a group of events and an event or among events, the server 101 is composed of a reading unit 111, a reference model preparing unit 102, a reference model storing unit 103, a standard model creating unit 104, and a writing unit 112.

The reading unit 111 reads a child reference model, an adult reference model, and an elderly reference model written on a storage device such as a CD-ROM. The reference model preparing unit 102 transmits the read reference models 121 to the reference model storing unit 103. The reference model storing unit 103 stores the three reference models 121. Here, a reference model refers to a pre-created model (in the present example, it is a speech recognition model, i.e., a probability model showing an acoustic characteristic having a certain attribute) that is referenced when a standard model is to be created.

The standard model creating unit 104 is a processing unit for creating a standard model 122 so as to maximize or locally maximize the probability or likelihood with respect to the three (Ng=3) reference models 121 stored in the reference model storing unit 103. The standard model creating unit 104 is composed of: a standard model structure determining unit 104*a* for determining the structure (such as the number of Gaussian mixture distributions) of the standard model; an initial standard model creating unit 104*b* for creating an initial standard model by determining initial values of statistics used for calculating the standard model; a statistics storing unit 104*c* for storing the determined initial standard model; and a statistics estimating unit 104*d* for calculating statistics so as to maximize or locally maximize the probability or likelihood with respect to the three (Ng=3) reference models 121 stored in the reference model storing unit 103, using approximate calculation or the like performed by a first approximating unit 104*e* on the initial standard model stored in the statistics storing unit 104*c* (that is to say, the statistics estimating unit 104*d* generates a final standard model). Note that the statistics refer to parameters specifying a standard model and refer to a mixture weighting coefficient, a mean value, and a variance in the present example.

The writing unit 112 writes the standard model 122 created by the standard model creating unit 104 into a storage device such as a CD-ROM.

Next, an explanation is given as to an operation of the server 101 structured as described so far.

Figure 2:
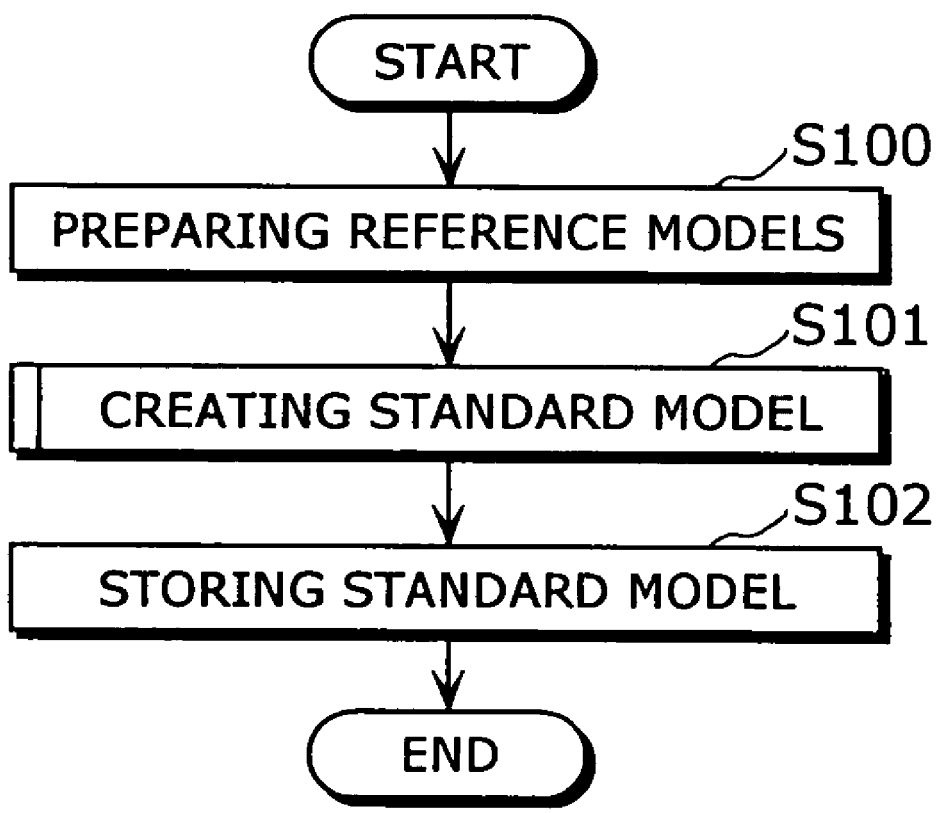
FIG. 2 is a flowchart showing an operational procedure executed by the server.

FIG. 2 is a flowchart showing an operation procedure executed by the server 101.

First, in advance of the standard model creation, reference models serving as criteria are prepared (step S100). To be more specific: the reading unit 111 reads the child reference model, the adult reference model, and the elderly reference model written on the storage device such as a CD-ROM; the reference model preparing unit 102 transmits the read reference models 121 to the reference model storing unit 103; and the reference model storing unit 103 stores the three reference models 121.

The reference model 121 is composed of an HMM for each phoneme. FIG. 3 shows examples of the reference models 121. Here, conceptual drawings of the child reference model, the adult reference model, and the elderly reference model are shown (it should be noted that the conceptual drawing of the elderly reference model is omitted in this diagram). Each of these three reference models is composed of three states, in each of which an output distribution of the HMM is structured by three mixtures of Gaussian mixture distributions. As the amount of characteristic, a 12-dimension (J=12) cepstrum coefficient is used.

Next, the standard model creating unit 104 creates a standard model 122 so as to maximize or locally maximize the probability or likelihood with respect to the three reference models 121 stored in the reference model storing unit 103 (step S101).

Finally, the writing unit 112 writes the standard model 122 created by the standard model creating unit 104 to a storage device such as a CD-ROM (step S102). The standard model written to the storage device such as a CD-ROM is used as a standard model for speech recognition created with consideration given to children, adults, and the elderly.

Figure 4:
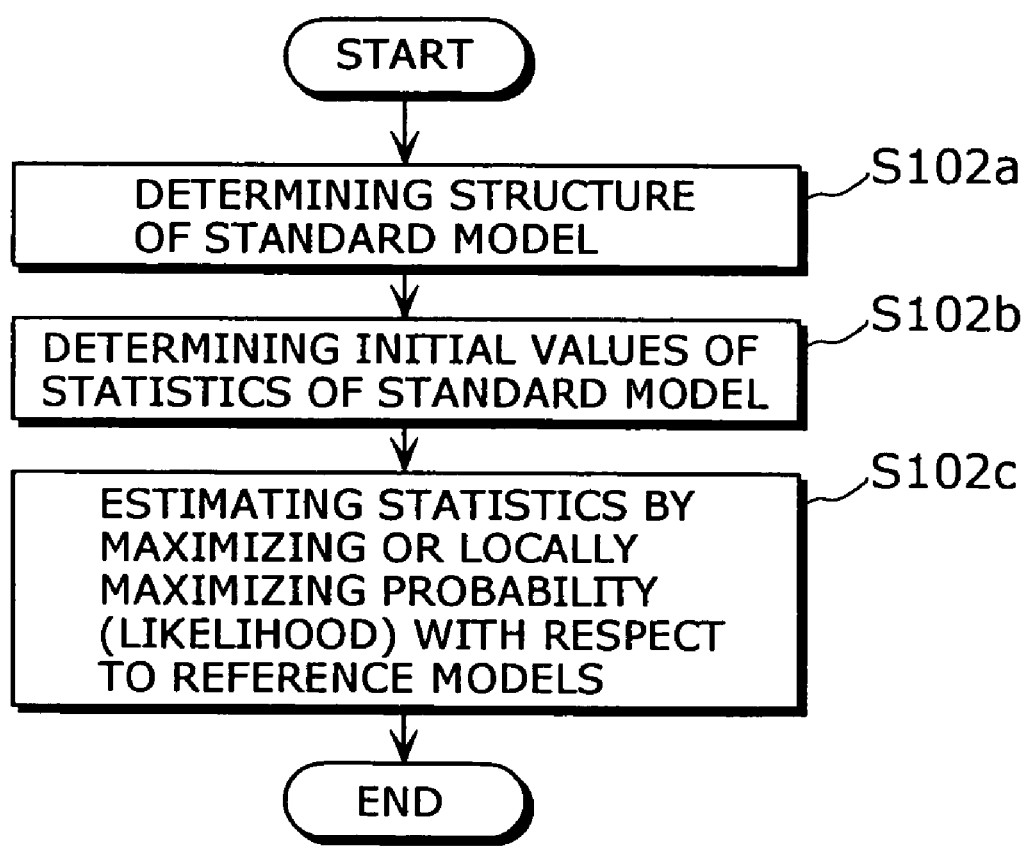
FIG. 4 is a flowchart showing a detailed procedure performed at the step S101 (i.e., the step for creating a standard model) in FIG. 2.

FIG. 4 is a flowchart showing a detailed procedure performed at the step S101 (i.e., the step of creating a standard model) in FIG. 2.

First, the standard model structure determining unit 104a determines the structure of the standard model (step S102a). Here, as the structure of the standard model, it determines that the standard model is made up of an HMM for each phoneme and has three states in each of which the number of mixtures of an output distribution is three (Mf=3).

Next, the initial standard model creating unit 104b determines initial values of statistics in order to calculate the standard model (step S102b). Here, the three reference models stored in the reference model storing unit 103 are integrated into one Gaussian distribution by statistical processing calculation and this integrated one is used as the initial values of the statistics. Then, the initial values are stored as an initial standard model into the statistics storing unit 104c.

More specifically, the initial standard model creating unit 104b creates an output distribution represented as the following Equation 13 for each of the above three states I (I=1, 2, and 3). It should be noted that Mf (the number of Gaussian mixture distributions) is three here.

$$\sum_{m=1}^{M_f} \omega_{f(m)} f(x; \mu_{f(m)}, \sigma^2_{f(m)}) \quad \text{(Equation 13)}$$

Here, $$f(x; \mu_{f(m)}, \sigma^2_{f(m)}) \ (m=1,2,\ldots,M_f) \quad \text{(Equation 14)}$$

represents a Gaussian distribution;

$$x=(x_{(1)}, x_{(2)}, \ldots, x_{(J)}) \in R^J \quad \text{(Equation 15)}$$

represents a 12-dimensional (J=12) LPC cepstrum coefficient;

$$\omega_{f(m)} \ (m=1,2,\ldots,M_f) \quad \text{(Equation 16)}$$

represents a mixture weighting coefficient of the Gaussian distribution;

$$\mu_{f(m)}=(\mu_{f(m,1)}, \mu_{f(m,2)}, \ldots, \mu_{f(m,J)}) \in R^J \ (m=1,2,\ldots,M_f) \quad \text{(Equation 17)}$$

represents a mean value of the Gaussian distribution; and $$\sigma^2_{f(m)}=(\sigma_{f(m,1)}^2, \sigma_{f(m,2)}^2, \ldots, \sigma_{f(m,J)}^2) \in R^J \ (m=1,2,\ldots,M_f) \quad \text{(Equation 18)}$$

represents a variance of the Gaussian distribution.

The statistics estimating unit 104d estimates the statistics of the standard model stored in the statistics storing unit 104c, using the three reference models 121 stored in the reference model storing unit 103 (step S102c).

To be more specific, the statistics estimating unit 104d estimates the statistics of the standard model (i.e., the mixture weighting coefficient represented as the above Equation 16, the mean value represented as the above Equation 17, and the variance represented as the above Equation 18) that locally maximize or maximize the probability or likelihood of the standard model with respect to the output distribution for each state I (I=1, 2, and 3) of the three (Ng=3) reference models 121, that is, the output distribution represented as the following Equation 19.

$$\sum_{l=1}^{L_{g(i)}} v_{g(i,l)} g(x; \mu_{g(i,l)}, \sigma^2_{g(i,l)}) \ (i=1, 2, \ldots, N_g) \quad \text{(Equation 19)}$$

Here, $$g(x; \mu_{g(i,l)}, \sigma^2_{g(i,l)}) \ (i=1,2,\ldots,N_g, l=1,2,\ldots,L_{(i)}) \quad \text{(Equation 20)}$$

represents a Gaussian distribution;

$$L_{g(i)} \ (i=1,2,\ldots,N_g) \quad \text{(Equation 21)}$$

represents the number of the mixture distributions (three in this case) of each reference model;

$$v_{g(i,l)} \ (l=1,2,\ldots,L_{g(i)}) \quad \text{(Equation 22)}$$

represents a mixture weighting coefficient of each Gaussian distribution;

$$\mu_{g(i,l)} \ (l=1,2,\ldots,L_{g(i)}) \quad \text{(Equation 23)}$$

represents a mean value of the Gaussian distribution; and $$\sigma^2_{g(i,l)} \ (l=1,2,\ldots,L_{g(i)}) \quad \text{(Equation 24)}$$

represents a variance of the Gaussian distribution.

$$\log P = \sum_{i=1}^{N_g} \int_{-\infty}^{\infty} \log\left[\sum_{m=1}^{M_f} \omega_{f(m)} f(x; \mu_{f(m)}, \sigma^2_{f(m)})\right] \quad \text{(Equation 25)}$$

$$\left\{\sum_{l=1}^{L_{g(i)}} \upsilon_{g(i,l)} g(x; \mu_{g(i,j)}, \sigma^2_{g(i,l)})\right\} dx$$

Using the following Equation 26, Equation 27, and Equation 28, the mixture weighting coefficient, the mean value, and the variance of the standard model are respectively calculated.

$$\omega_{f(m)} = \frac{\sum_{i=1}^{N_g} \int_{-\infty}^{\infty} \gamma(x, m) \left\{\sum_{l=1}^{L_{g(i)}} \upsilon_{g(i,l)} g(x; \mu_{g(i,l)}, \sigma^2_{g(i,l)})\right\} dx}{\sum_{k=1}^{M_f} \sum_{i=1}^{N_g} \int_{-\infty}^{\infty} \gamma(x, k) \left\{\sum_{l=1}^{L_{g(i)}} \upsilon_{g(i,l)} g(x; \mu_{g(i,l)}, \sigma^2_{h(i,l)})\right\} dx} \quad \text{(Equation 26)}$$

$$(m = 1, 2, \ldots, M_f)$$

$$\mu_{f(m,j)} = \frac{\sum_{i=1}^{N_g} \int_{-\infty}^{\infty} \gamma(x, m) x_{(j)} \left\{\sum_{l=1}^{L_{g(i)}} \upsilon_{g(i,l)} g(x; \mu_{g(i,l)}, \sigma^2_{g(i,l)})\right\} dx}{\sum_{i=1}^{N_g} \int_{-\infty}^{\infty} \gamma(x, m) \left\{\sum_{l=1}^{L_{g(i)}} \upsilon_{g(i,l)} g(x; \mu_{g(i,l)}, \sigma^2_{g(i,l)})\right\} dx} \quad \text{(Equation 27)}$$

$$(m = 1, 2, \ldots, M_f, j = 1, 2, \ldots, J)$$

$$\sigma^2_{f(m,j)} = \frac{\sum_{i=1}^{N_g} \int_{-\infty}^{\infty} \gamma(x, m)(x_{(j)} - \mu_{f(m,j)})^2 \left\{\sum_{l=1}^{L_{g(i)}} \upsilon_{g(i,l)} g(x; \mu_{g(i,l)}, \sigma^2_{g(i,j)})\right\} dx}{\sum_{i=1}^{N_g} \int_{-\infty}^{\infty} \gamma(x, m) \left\{\sum_{l=1}^{L_{g(i)}} \upsilon_{g(i,l)} g(x; \mu_{g(i,l)}, \sigma^2_{g(i,l)})\right\} dx} \quad \text{(Equation 28)}$$

$$(m = 1, 2, \ldots, M_f, j = 1, 2, \ldots, J)$$

Here, the first approximating unit 104e of the statistics estimating unit 104d uses an approximate expression represented as the following Equation 29.

$$\gamma(x, m) = \frac{\omega_{f(m)} f(x; \mu_{f(m)}, \sigma^2_{f(m)})}{\sum_{k=1}^{M_f} \omega_{f(k)} f(x; \mu_{f(k)}, \sigma^2_{f(k)})} \approx \frac{\omega_{f(m)} f(x; \mu_{f(m)}, \sigma^2_{f(m)})}{u_{h(m)} h(x; \mu_{h(m)}, \sigma^2_{h(m)})} \quad \text{(Equation 29)}$$

$$(m = 1, 2, \ldots, M_f)$$

Here, $$u_{h(m)} h(x; \mu_{h(m)}, \sigma_{h(m)}^2) \ (m=1,2,\ldots,M_f) \quad \text{(Equation 30)}$$

represents a single Gaussian distribution, where $$u_{h(m)} \ (m=1,2,\ldots,M_f) \quad \text{(Equation 31)}$$

represents a weight, $$\mu_{h(m)} = (\mu_{h(m,1)}, \mu_{h(m,2)}, \ldots, \mu_{h(m,J)}) \in R^J \quad \text{(Equation 32)}$$

represents a mean value, and $$\mu_{h(m)}^2 = (\sigma_{h(m,1)}^2, \sigma_{h(m,2)}^2, \ldots, \sigma_{h(m,J)}^2) \in R^J \quad \text{(Equation 33)}$$

represents a variance.

Moreover, the first approximating unit 104e calculates the weight (Equation 31), the mean value (Equation 32), and the variance (Equation 33) of the single Gaussian distribution represented as the above Equation 30, respectively using the following Equation 34, Equation 35, and Equation 36.

$$u_{h(m)} = \sum_{p=1}^{M_f} \omega_{f(m,p)} = \sum_{p=1}^{M_f} \omega_{f(p)} = 1.0 \ (m, = 1, 2, \ldots, M_f) \quad \text{(Equation 34)}$$

$$\mu_{h(m,j)} = \frac{\sum_{p=1}^{M_f} \omega_{f(m,p)} \mu_{f(m,p,j)}}{\sum_{p=1}^{M_f} \omega_{f(m,p)}} = \frac{\sum_{p=1}^{M_f} \omega_{f(p)} \mu_{f(p,j)}}{\sum_{p=1}^{M_f} \omega_{f(p)}} \quad \text{(Equation 35)}$$

-continued $$(m = 1, 2, \ldots, M_f, j = 1, 2, \ldots, J)$$

$$\sigma^2_{h(m,j)} = \frac{\sum_{p=1}^{M_f} \omega_{f(m,p)}(\sigma^2_{f(m,p,j)} + \mu^2_{f(m,p,j)})}{\sum_{p=1}^{M_f} \omega_{f(m,p)}} - \mu^2_{h(m,j)} = \quad \text{(Equation 36)}$$

$$\frac{\sum_{p=1}^{M_f} \omega_{f(p)}(\sigma^2_{f(p,j)} + \mu^2_{f(p,j)})}{\sum_{p=1}^{M_f} \omega_{f(p)}} - \mu^2_{h(m,j)}$$

$$(m = 1, 2, \ldots, M_f, j = 1, 2, \ldots, J)$$

FIG. 5 is a diagram illustrating an approximate calculation performed by the first approximating unit 104e. As shown in this diagram, the first approximating unit 104e determines the single Gaussian distribution (Equation 30) included in the approximate expression represented as the above Equation 29, using all the Gaussian mixture distributions making up the standard model.

In summary with consideration given to the above approximate expression used by the first approximating unit 104e, a calculation formula used by the statistics estimating unit 104d is as follows. The statistics estimating unit 104d calculates the mixture weighting coefficient, the mean value, and the variance respectively using the following Equation 37, Equation 38, and Equation 39, and then stores them into the statistics storing unit 104c. After this, the statistics estimating unit 104d repeats such series of estimating the statistics and storing them into the statistics storing unit 104c, R ($\geq 1$) times. Then, the statistics estimating unit 104d outputs the resultant statistics as the statistics of the standard model 122 that is to be eventually generated.

$$\omega_{f(m)} = \frac{\sum_{i=1}^{N_g} \prod_{j=1}^{J} \sum_{l=1}^{L_{g(i)}} A_{(m,l,i,j)}}{\sum_{i=1}^{N_g} \sum_{k=1}^{M_f} \prod_{j=1}^{J} \sum_{l=1}^{L_{g(i)}} A_{(k,l,i,j)}} \quad (m = 1, 2, \ldots, M_f) \quad \text{(Equation 37)}$$

$$A_{(m,l,i,j)} = \frac{\omega_{f(m)} \upsilon_{g(l,j)} \sigma^2_{h(m,j)}}{\sqrt{\sigma^2_{f(m,j)}\sigma^2_{h(m,j)} + \sigma^2_{g(i,l,j)}\sigma^2_{h(m,j)} - \sigma^2_{f(m,j)}\sigma^2_{g(i,l,j)}}} \times \exp$$

$$\left\{ \frac{1}{2} \frac{\left(\left(\frac{\sigma_{f(m,j)}\sigma_{g(i,l,j)}}{\sigma_{h(m,j)}}\right)\mu_{h(m,j)} - \frac{\sigma_{f(m,j)}\sigma_{h(m,j)}}{\sigma_{g(i,l,j)}}\mu_{g(i,j)} - \frac{\sigma_{g(i,l,j)}\sigma_{h(m,j)}}{\sigma_{f(m,j)}}\mu_{f(m,j)}\right)^2}{\sigma^2_{f(m,j)}\sigma^2_{h(m,j)} + \sigma^2_{g(i,l,j)}\sigma^2_{k(m,j)} - \sigma^2_{j(m,j)}\sigma^2_{f(i,l,j)}} + \frac{\mu_{h(m,j)}}{\sigma^2_{h(m,j)}} - \frac{\mu_{g(i,j)}}{\sigma^2_{g(i,l,j)}} - \frac{\mu_{f(m,j)}}{\sigma^2_{f(m,j)}} \right\}$$

$$\mu_{f(m,j)} = \frac{\sum_{i=1}^{N_g} \sum_{l=1}^{L_{g(i)}} B_{(m,l,i,j)}}{\sum_{i=1}^{N_g} \prod_{j=1}^{J} \sum_{l=1}^{L_{g(i)}} A_{(m,l,i,j)}} \quad (m = 1, 2, \ldots, M_f, j = 1, 2, \ldots, J) \quad \text{(Equation 38)}$$

$$B_{(m,l,i,j)} = \frac{\sigma^2_{f(m,j)}\sigma^2_{h(m,j)}\mu_{g(i,j)} + \sigma^2_{g(i,l,j)}\sigma^2_{h(m,j)}\mu_{f(m,j)} - \sigma^2_{f(m,j)}\sigma^2_{g(i,l,j)}\mu_{h(m,j)}}{\sigma^2_{f(m,j)}\sigma^2_{h(m,j)} + \sigma^2_{g(i,l,f)}\sigma^2_{h(m,j)} - \sigma^2_{f(m,j)}\sigma^2_{g(i,l,j)}} \times A_{(m,l,i,j)}$$

$$\sigma^2_{f(m,j)} = \frac{\sum_{i=1}^{N_g} \sum_{l=1}^{L_{g(i)}} C_{(m,l,i,j)}}{\sum_{i=1}^{N_g} \prod_{j=1}^{J} \sum_{l=1}^{L_{g(i)}} A_{(m,l,i,j)}} \quad (m = 1, 2, \ldots, M_f)$$ (Equation 39)

$$C_{(m,l,i,l)} = \left\{ \frac{\sigma^2_{j(m,j)}\sigma^2_{g(i,l,j)}\sigma^2_{h(m,j)}}{\sigma^2_{f(m,j)}\sigma^2_{h(m,j)} + \sigma^2_{g(i,l,j)}\sigma^2_{h(m,j)} - \sigma^2_{f(m,j)}\sigma^2_{g(i,l,f)}} + \right.$$
$$\left. - \frac{\sigma^2_{f(m,j)}\sigma^2_{h(m,j)}\mu_{g(i,j)} + \sigma^2_{g(i,l,j)}\sigma^2_{h(m,j)}\mu_{f(m,j)} - \sigma^2_{f(m,j)}\sigma^2_{g(i,l,j)}\mu_{h(m,j)}}{\sigma^2_{f(m,j)}\sigma^2_{h(m,j)} + \sigma^2_{g(i,l,j)}\sigma^2_{h(m,j)} - \sigma^2_{f(m,j)}\sigma^2_{g(i,l,j)}} \right\}^2 \times A_{(m,l,i,j)}$$

It should be noted that a probability used as the state transition probability is obtained by normalization in such a manner that all state transition probabilities of the corresponding HMMs are added with respect to the reference models 121 to sum up to one.

Next, an explanation is given as to a specific example in which the present embodiment is applied to speech recognition performed by a personal computer. Here, note that a personal computer (PC) is used as the server 101 and a CD-ROM drive apparatus is used as the reading unit 111. Also note that the explanation is given mainly as to a specific way of using the standard model.

First, the user inserts a CD-ROM storing a plurality of acoustic models as reference models into the CD-ROM drive apparatus (the reading unit 111) of the PC (the server 101). The CD-ROM stores the acoustic models of "toddler", "child: male", "child: female", "adult: male","adult: female", "elderly: male", and "elderly: female", for example.

Figure 6A:
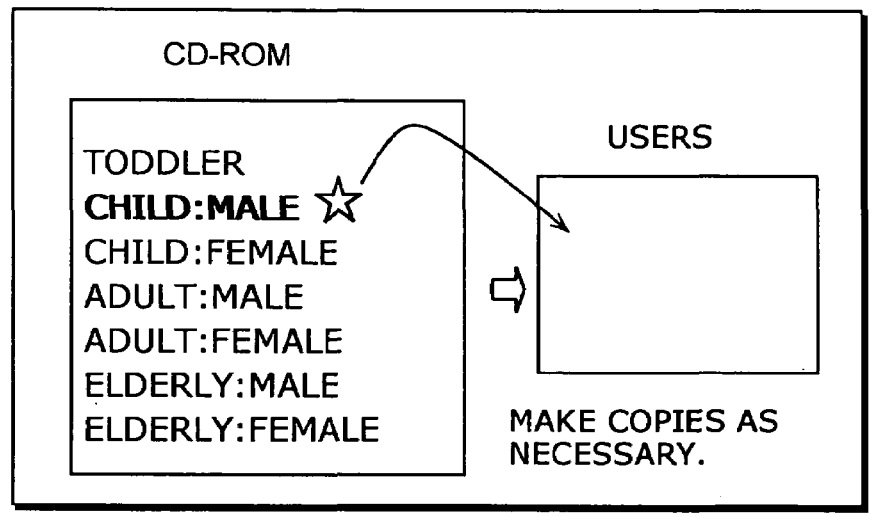
FIG. 6 shows screen display examples used when reference models are selected.
Figure 6B:
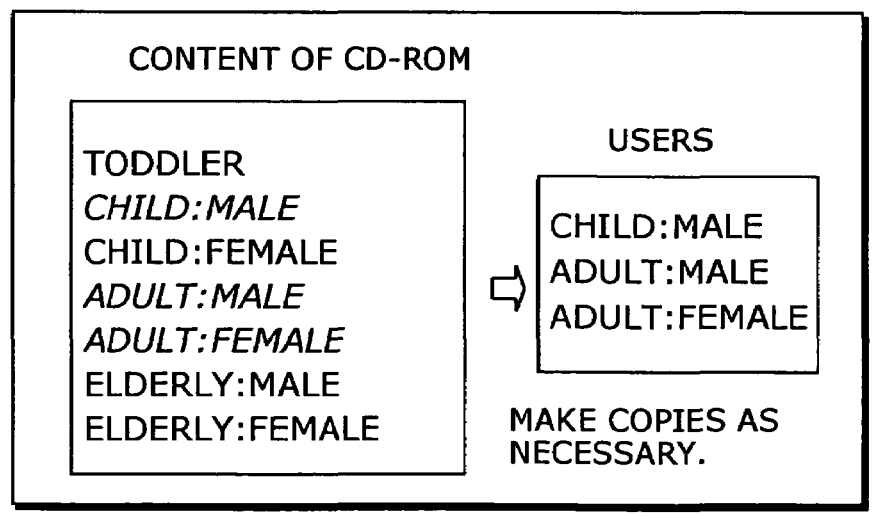

Next, the user selects acoustic models corresponding to the family members (i.e., those who use the speech recognition) using a display connected to the PC (the server 101), as shown by screen display examples in FIG. 6A and FIG. 6B. FIG. 6 shows that the acoustic models stored in the CD-ROM are displayed in a box indicated as "CD-ROM" and that the acoustic models selected from among these models have been copied into a box indicated as "USERS". In the present example, the family members of the user are a 10-year-old son, a 50-year-old father, and a 40-year-old mother. The user (father) has copied three models of "child: male", "adult: male", and "adult: female" into the box indicated as "USERS" by dragging. Through such an operation, the reference model preparing unit 102 prepares the reference models. More specifically, the reading unit 111 reads the three reference models, which are then stored into the reference model storing unit 103 via the reference model preparing unit 102.

Following this, the user designates the structure (the number of mixture distributions) of the standard model, as shown by a screen display example in FIG. 7A. In FIG. 7A, "3", "10", and "20" are displayed as "the number of mixture distributions", and the user selects a desired number from among these. Through this operation, the standard model structure determining unit 104a determines the structure of the standard model that is to be created.

It should be noted that the way to determine the number of the mixture distributions is not limited to such a direct designation. For example, as shown by a screen display example in FIG. 7B, the number of the mixture distributions may be determined on the basis of the specification information selected by the user. FIG. 7B shows that the user selected an apparatus to be used out of three types of "USE APPARATUS", that are "television", "car navigation", and "cellular phone", as an object apparatus that will execute the speech recognition using the standard model. Here, according to a pre-stored correspondence table, the number of mixture distributions may be determined as 3 when "television" is selected, the number of mixture distributions may be determined as 20 when "car navigation" is selected, and the number of mixture distributions may be determined as 10 when "cellular phone" is selected, for example.

In addition, the way to determine the number of the mixture distributions may be determined by selecting recognition speed and precision from among "quick recognition", "normal", and "high-precision recognition". By doing so, the value corresponding to the selected item (i.e., "quick recognition"=3, "normal"=10, and "high-precision recognition"=20) may be determined as the number of the mixture distributions.

Figure 8A:
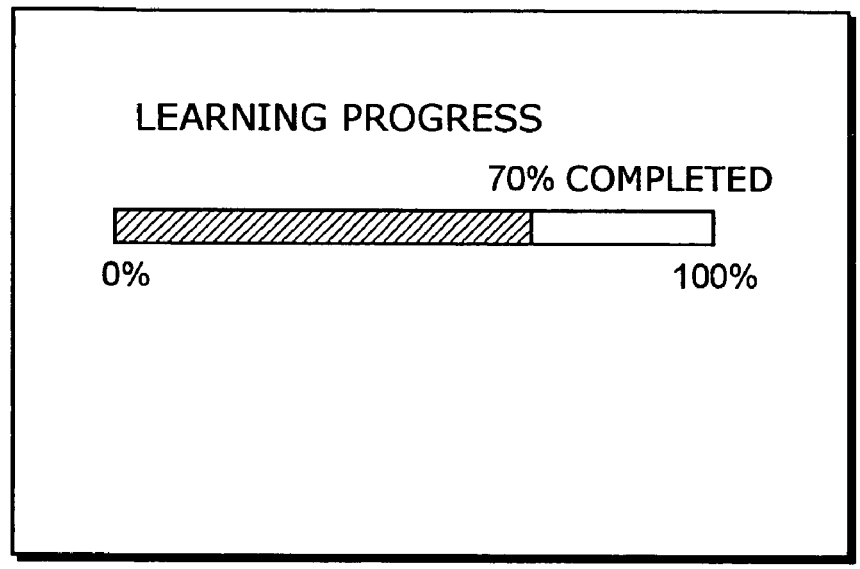
FIG. 8 shows screen display examples indicating a progress of the standard model creation.
Figure 8B:
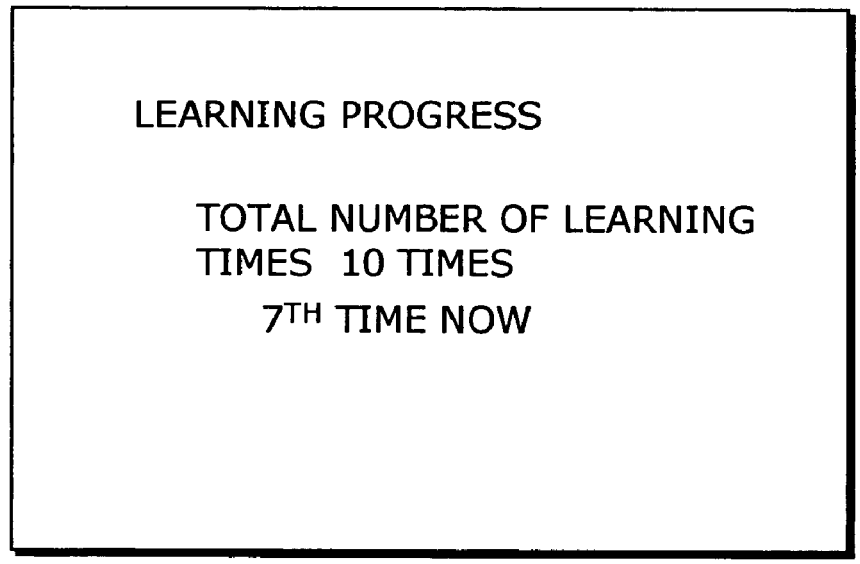

After the end of such an input operation, the initial standard model creating unit 104b creates an initial standard model, and then the statistics estimating unit 104d performs the repetitive calculations (learning) to create the standard model. At this time, as shown by screen display examples in FIG. 8, the standard model structure determining unit 104a displays a learning progress. The user can be informed of the learning progress, the ending time of the learning, etc., so can wait free of worry until the completion of the standard model creation. Note that the progress may be displayed by a bar indicating the learning degree as shown in FIG. 8A, or by the number of learning times as shown in FIG. 8B. Also, it may be displayed by a likelihood criterion or the like. Moreover, as the progress display, a general face image may be displayed before the learning is started, and then it may be gradually changed into the user's face image as the learning comes toward the end. Similarly, as the progress display, a baby may be displayed before the learning is started, and then it may be gradually changed into a rishi as the learning comes toward the end.

On the completion of the standard model creation, the created standard model is recorded into a memory card (the writing unit 112) by the standard model creating unit 104. The user removes the memory card from the PC (the writing unit 112 of the server 101) and inserts it into a memory card slot of the use apparatus, such as a television. In this way, the created standard model is moved from the PC (the server 101) to the use apparatus (television). The television performs the speech recognition for the users (in the present example, the family members who use the television) using the standard model recorded in the memory card inserted into the television. For example, by recognizing speech inputted to a microphone attached to the television, the television judges it as a command for a television manipulation and then executes the command (for example, channel switching or program searching by an EPG or the like). Accordingly, a voice-actuated television manipulation is realized using the standard model created by the standard model creating apparatus of the present embodiment.

As explained so far, according to the first embodiment of the present invention, a standard model is created by calculating the statistics of the standard model so as to maximize or locally maximize the probability or likelihood with respect to the reference models prepared in advance. On account of this, the standard model can be easily created without requiring learning data or instructor data and, at the same time, the high-precision standard model is created in overall consideration of a plurality of the pre-created reference models.

It should be noted that the structure of the standard model 122 is not limited to the one composed of an HMM for each phoneme, and may be composed of a context-dependent HMM.

Also, the standard model creating unit 104 may create a model with respect to an output probability of an event in some of states of some of phonemes.

Moreover, the HMM making up the standard model 122 may be structured by a different number of states for each phoneme, or by a different number of Gaussian mixture distributions for each state.

Furthermore, the reference models 121, i.e., the child reference model, the adult reference model, and the elderly reference model, may be respectively composed of the different numbers of states or the different numbers of the Gaussian mixture distributions.

Also, the server 101 may perform the speech recognition using the standard model 122.

Moreover, instead of reading the reference models 121 from the storage device such as a CD-ROM or DVD-RAM, the server 101 may create the reference models 121 using speech data.

Furthermore, the reference model preparing unit 102 may add a new reference model read from the storage device such as a CD-ROM or DVD-RAM or update the reference model, as necessary. In other words, the reference model preparing unit 102 may not only store the new reference model into the reference model storing unit 103, but also, when a reference model is already stored in the reference model storing unit 103 for the same recognition object, update this reference model by replacing it with the new one and delete an unnecessary reference model from the reference model storing unit 103.

Also, the reference model preparing unit 102 may add a new reference model into the reference model storing unit 103 via a communication channel or update the reference model, as necessary.

Moreover, after the standard model creation, the learning may be further performed using speech data.

Furthermore, the standard model structure determining unit 104a may determine the HMM structure, such as a monophone-based, triphone-based, or state-tying structure, and may also determine the number of states and the like.

Second Embodiment

Figure 9:
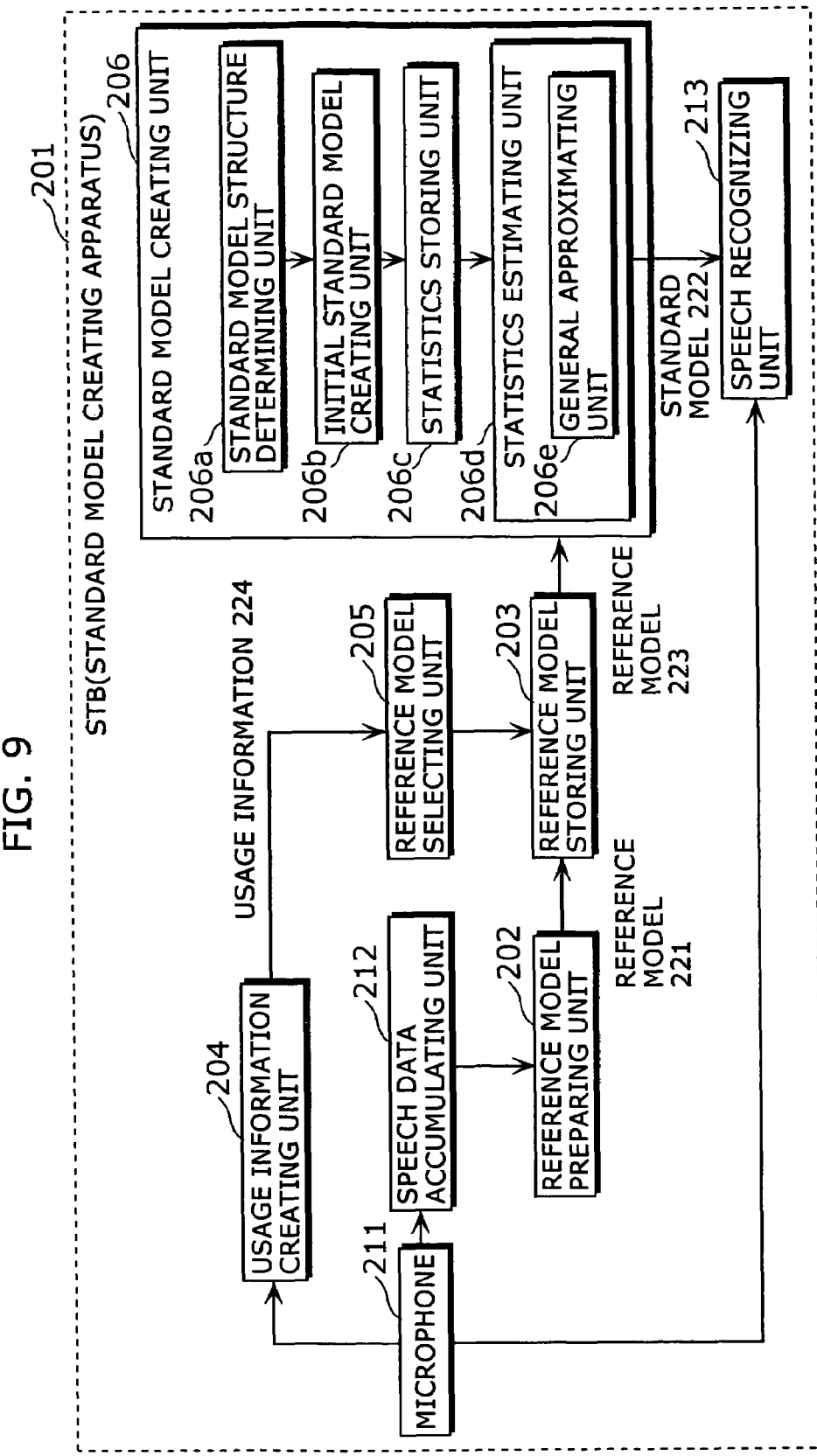
FIG. 9 is a block diagram showing the overall structure of an STB related to a standard model creating apparatus of the second embodiment of the present invention.

FIG. 9 is a block diagram showing the overall structure of a standard model creating apparatus of the second embodiment of the present invention. In this diagram, the standard model creating apparatus of the present invention is embedded in a set top box (referred to as the STB hereafter) 201. In the present embodiment, an explanation is given as to a case where a standard model for speech recognition (speaker adaptive model) is created. More specifically, an explanation is given as to a case, as an example, where EPG search, program switching, and timer recording on television are performed using a speech recognition function of the STB.

The STB 201 is a receiver for digital broadcasting that recognizes speech of the user and accordingly performs automatic TV program switching, etc. As the standard model creating apparatus for creating a standard model for speech recognition that is defined by an output probability of transitions between a group of events and an event or among events, the STB 201 is composed of a microphone 211, a speech data accumulating unit 212, a reference model preparing unit 202, a reference model storing unit 203, a usage information creating unit 204, a reference model selecting unit 205, a standard model creating unit 206, and a speech recognizing unit 213.

Speech data collected by the microphone 211 is accumulated into the speech data accumulating unit 212. The reference model preparing unit 202 creates reference models 221 for each speaker using the speech data accumulated in the speech data accumulating unit 212, and then stores them into the reference model storing unit 203.

The usage information creating unit 204 collects speech of the user as usage information 224 using the microphone 211. Here, the user information refers to information regarding an object (a person or a thing) of recognition (narrowly-defined recognition, identification, authentication, etc.). In the present example, it refers to speech of the user that is to be an object of speech recognition. On the basis of the usage information 224 created by the usage information creating unit 204, the reference model selecting unit 205 selects reference models 223, which are acoustically similar to the speech of the user indicated by the usage information 224, from among the reference models 221 stored in the reference model storing unit 203.

The standard model creating unit 206 is a processing unit for creating a standard model 222 so as to maximize or locally maximize the probability or likelihood with respect to the reference models 223 selected by the reference model selecting unit 205. The standard model creating unit 206 is composed of: a standard model structure determining unit 206a for determining the structure (such as the number of Gaussian mixture distributions) of the standard model; an initial standard model creating unit 206b for creating an initial standard model by determining initial values of statistics used for calculating the standard model; a statistics storing unit 206c for storing the determined initial standard model; and a statistics estimating unit 206d for calculating statistics so as to maximize or locally maximize the probability or likelihood with respect to the reference models 223 selected by the reference model selecting unit 205, using approximate calculation or the like performed by a general approximating unit 206e on the initial standard model stored in the statistics storing unit 206c (that is to say, the statistics estimating unit 206d generates a final standard model).

The speech recognizing unit 213 recognizes speech of the user using the standard model 222 created by the standard model creating unit 206.

Next, an operation performed by the STB 201 structured as described so far is explained.

Figure 10:
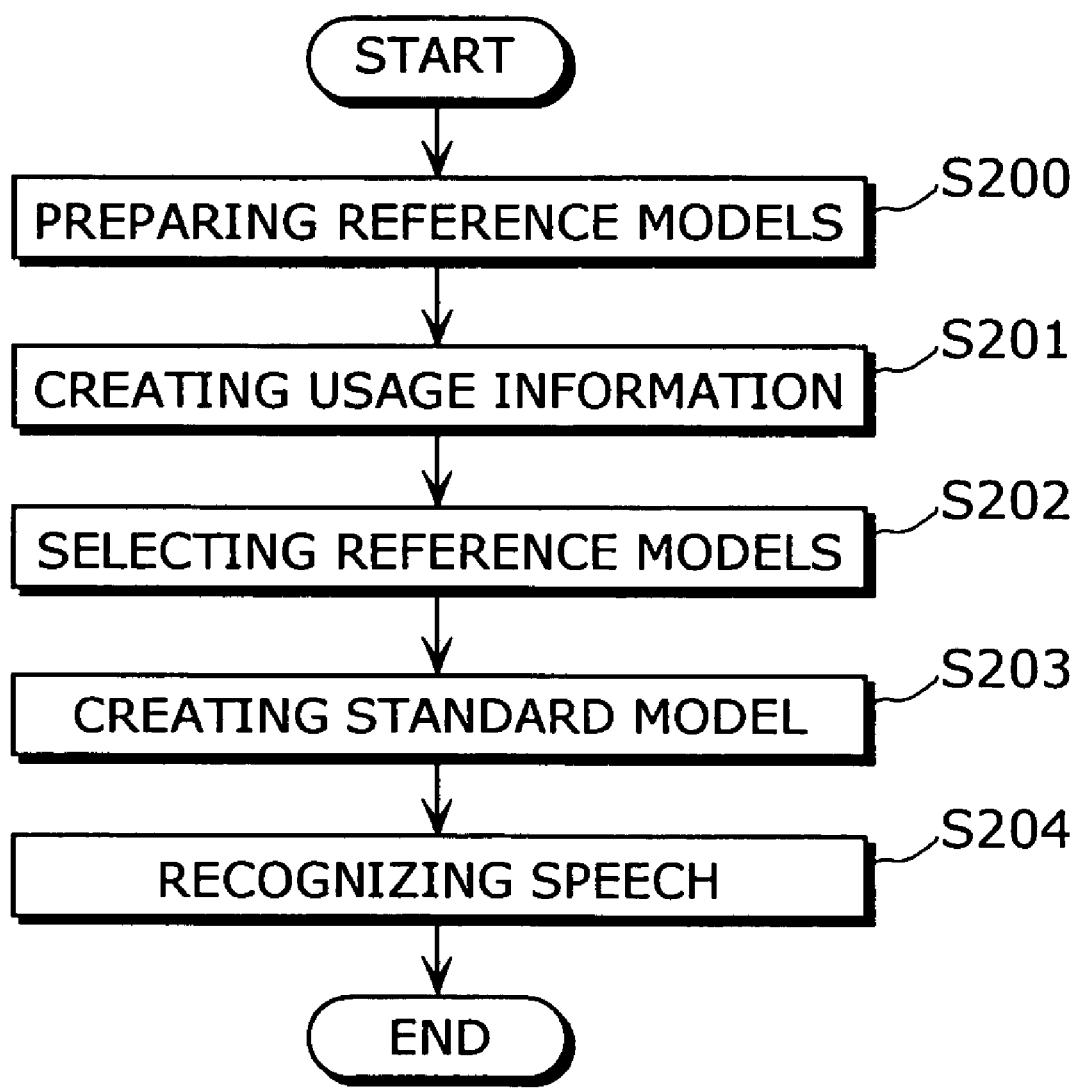
FIG. 10 is a flowchart showing an operational procedure executed by the STB.

FIG. 10 is a flowchart showing an operational procedure executed by the STB 201.

First, in advance of the standard model creation, reference models serving as criteria are prepared (step S200). To be more specific, speech data of speakers A to Z is collected using the microphone 211 and is accumulated into the speech data accumulating unit 212. For example, a plurality of microphones set indoors, a microphone contained in a television remote control, telephone equipment, etc. are connected to the speech data accumulating unit 212 of the STB 201. Speech data inputted from the microphones and telephone equipment is accumulated into the speech data accumulating unit 212. For example, voices of brothers, sisters, father, mother, grandfather, neighbors, friends, etc. are accumulated.

The reference model preparing unit 202 creates the reference models 221 for each speaker using the speech data accumulated in the speech data accumulating unit 212, according to the Baum-Welch re-estimation method. This processing is performed before the standard model creation is requested.

Figure 11:
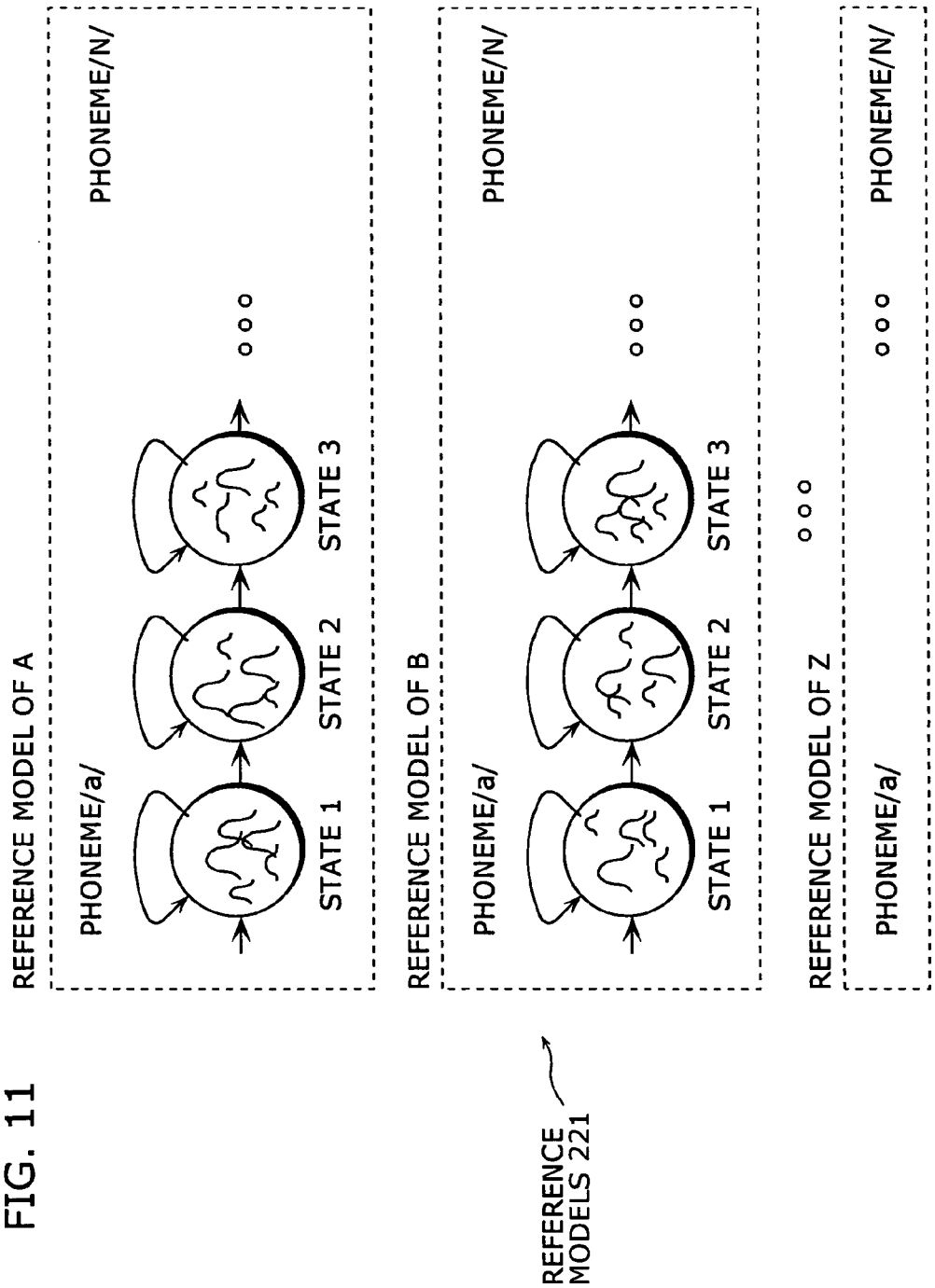
FIG. 11 shows examples of reference models stored in a reference model storing unit shown in FIG. 10.

The reference model storing unit 203 stores the reference models 221 created by the reference model preparing unit 202. The reference model 221 is composed of an HMM for each phoneme. FIG. 11 shows examples of the reference models 221. Here, each reference model of the speakers A to Z has three states, in each of which an output distribution of the HMM is structured by a Gaussian mixture distribution having five mixtures. As the amount of characteristic, a 25-dimensional (J=25) mel-cepstrum coefficient is used.

Suppose that the standard model creation is requested here. The request for the standard model creation is issued when the user presses a button indicated as "user verification", for example. As a method for providing the button of "user verification", it may be displayed on a television screen, or a switch of "user verification" may be provided for the television remote control. As a timing of pressing the button, a timing at which the television is activated or a timing at which the user wishes to have a standard model suited for himself/herself during a command operation performed using the speech recognition function can be considered.

Next, the usage information creating unit 204 collects speech of the user as the usage information 224 using the microphone 211 (step S201). For example, when the standard model creation is requested, a message saying "Input your name" is displayed on the screen. The user inputs his/her name (i.e., speech of the user) using the microphone contained in the television remote control. This speech of the user is the usage information. Note that the input speech is not limited to the user's name. For example, a message saying "Utter adaptation" may be displayed so that the user will utter "Adaptation".

The reference model selecting unit 205 selects the reference models 223 that are acoustically similar to the speech of the user from among the reference models 221 stored in the reference model storing unit 203 (step S202). To be more specific, the reference model selecting unit 205 inputs the speech of the user to the reference models of the speakers A to Z and then selects 10 reference models (Ng=10) whose likelihood is high with respect to the uttered word.

Then, the standard model creating unit 206 creates the standard model 222 so as to maximize or locally maximize the probability or likelihood with respect to the 10 reference models 223 selected by the reference model selecting unit 205 (step S203). At this time, as in the case with the first embodiment, the learning progress may be displayed. With this, the user can be informed of the learning progress, the ending time of the learning, etc., so can create the standard model creation, free of worry. In addition, a progress non-displaying unit may be provided so that the learning progress will not be displayed. With this function, the screen can be effectively used. Moreover, on account of such a non-display function, a skillful user will not be annoyed by the display.

Finally, the speech recognizing unit 213 receives the speech of the user as an input transmitted via the microphone 211 and performs the speech recognition using the standard model 222 created by the standard model creating unit 206 (step S204). For example, the speech recognizing unit 213 calculates a 25-dimensional mel-cepstrum coefficient by performing acoustic analysis or the like on the speech uttered by the user, and then inputs it to the standard model 222 for each phoneme so as to specify a phoneme string that has a high likelihood. Then, the speech recognizing unit 213 compares the phoneme string with program names included in electronic program data that is previously received. If the likelihood at equal to or higher than a certain level is detected, the speech recognizing unit 213 controls automatic program switching so that the current program is switched to the corresponding program.

Next, a detailed procedure performed at the step S203 (i.e., the step of creating the standard model) in FIG. 10 is explained. The procedure flow is the same as described with reference to the flowchart shown in FIG. 4. Note that, however, the structure of the standard model to be adopted and specific approximate calculation are different.

First, the standard model structure determining unit 206a determines the structure of the standard model (step S102a in FIG. 4). Here, as the structure of the standard model, it determines that the standard model is made up of an HMM for each phoneme and has three states in each of which the number of mixtures in an output distribution is 16 (Mf=16).

Next, the initial standard model creating unit 206b determines initial values of the statistics in order to calculate the standard model (step S102b in FIG. 4). Here, the 10 reference models 223 selected by the reference model selecting unit 205 are integrated into one Gaussian distribution using statistical processing calculation and this integrated one is determined as the initial values of the statistics. Then, the initial values are stored as an initial standard model into the statistics storing unit 206c. In the present example, using five-mixture reference models which are learned for each speaker, a high-precision standard model (speaker adaptive model) whose number of mixture distributions is 16 (16-mixture) is created.

More specifically, the initial standard model creating unit 206b generates an output distribution represented as the above Equation 13 for each of the above three states I (I=1, 2, and 3).

In the present embodiment, however, $$x=(x_{(1)},x_{(2)},\ldots,x_{(J)}) \in R^J \quad \text{(Equation 40)}$$

included in the output distribution represented as the above Equation 13 represents a 25-dimensional (J=25) mel-cepstrum coefficient.

The statistics estimating unit 206d estimates the statistics of the standard model stored in the statistics storing unit 206c, using the 10 reference models 223 selected by the reference model selecting unit 205 (step S102c in FIG. 4).

To be more specific, the statistics estimating unit 206d estimates the statistics of the standard model (i.e., the mixture weighting coefficient represented as the above Equation 16, the mean value represented as the above Equation 17, and the variance represented as the above Equation 18) that locally maximize or maximize the probability or likelihood of the standard model with respect to an output distribution for each state I (I=1, 2, and 3) of the 10 (Ng=10) reference models 223, that is, the output distribution represented as the above Equation 19.

In the present embodiment, however, $$L_{g(i)} (i=1,2,\ldots,N_g) \quad \text{(Equation 41)}$$

included in the output distribution represented as the above Equation 19 is five (the number of mixture distributions of each reference model).

More specifically, using the above Equation 26, Equation 27, and Equation 28, the mixture weighting coefficient, the mean value, and the variance of the standard model are respectively calculated.

Here, the general approximating unit 206e of the statistics estimating unit 206d uses the approximate expression represented as the above Equation 29.

Unlike in the case of the first embodiment, the general approximating unit 206e selects three (Ph(m)=3) output distributions represented as $$\omega_{f(m,p)} f(x; \mu_{f(m,p)}, \sigma_{f(m,p)}^2) \quad (m=1,2,\ldots,M_f, p=1,2,\ldots,P_{h(m)}) \quad \text{(Equation 44)}$$

which are close in distance to the output distribution represented as $$\omega_{f(m)} f(x; \mu_{f(m)}, \sigma_{f(m)}^2) \quad \text{(Equation 43)}$$

shown in the numerator of the approximate expression represented as the above Equation 29, the three being selected from among the output distributions represented as $$\omega_{f(k)} f(x; \mu_{f(k)}, \sigma_{f(k)}^2) \quad (k=1,2,\ldots,M_f) \quad \text{(Equation 42)}$$

shown in the denominator of the approximate expression represented as the above Equation 29. The general approximating unit 206e calculates the weight (Equation 31), the mean value (Equation 32), and the variance (Equation 33) of the single Gaussian distribution represented as the above Equation 30, using the three output distributions, according to the following Equation 45, Equation 46, and Equation 47.

included in the approximate expression represented as the above Equation 29, using only some (Ph(M)) Gaussian mixture distributions which are close to the Gaussian mixture distribution that is a calculation object, out of the Mf Gaussian mixture distributions making up the standard model. Therefore, as compared with the first embodiment where all (Mf) the Gaussian mixture distributions are used, the amount of calculation performed for the approximate calculation is reduced.

In summary with consideration given to the approximate expression used by the general approximating unit 206e, a calculation formula used by the statistics estimating unit 206e is as follows. The statistics estimating unit 206e calculates the mixture weighting coefficient, the mean value, and the variance respectively using the following Equation 48, Equation 49, and Equation 50, and then stores them into the statistics storing unit 206c. After this, the statistics estimating unit 206d repeats such series of estimating the statistics and storing them into the statistics storing unit 206c, R ($\geq 1$) times. Then, the statistics estimating unit 206d outputs the resultant statistics as the statistics of the standard model 222 that is to be eventually generated. It should be noted that the repetitive $$u_{h(m)} = \sum_{p=1}^{P_{h(m)}} \omega_{f(m,p)} \quad (m=1,2,\ldots,M_f) \quad \text{(Equation 45)}$$

$$\mu_{h(m,j)} = \frac{\sum_{p=1}^{P_{h(m)}} \omega_{f(m,p)} \mu_{f(m,p,j)}}{\sum_{p=1}^{P_{h(m)}} \omega_{f(m,p)}} \quad (m=1,2,\ldots,M_f, j=1,2,\ldots,J) \quad \text{(Equation 46)}$$

$$\sigma_{h(m,j)}^2 = \frac{\sum_{p=1}^{P_{h(m)}} \omega_{f(m,p)} (\sigma_{f(m,p,j)}^2 + \mu_{f(m,p,j)}^2)}{\sum_{p=1}^{P_{h(m)}} \omega_{f(m,p)}} - \mu_{h(m,j)}^2 \quad (m=1,2,\ldots,M_f, j=1,2,\ldots,J) \quad \text{(Equation 47)}$$

Figures 12A, 12B:
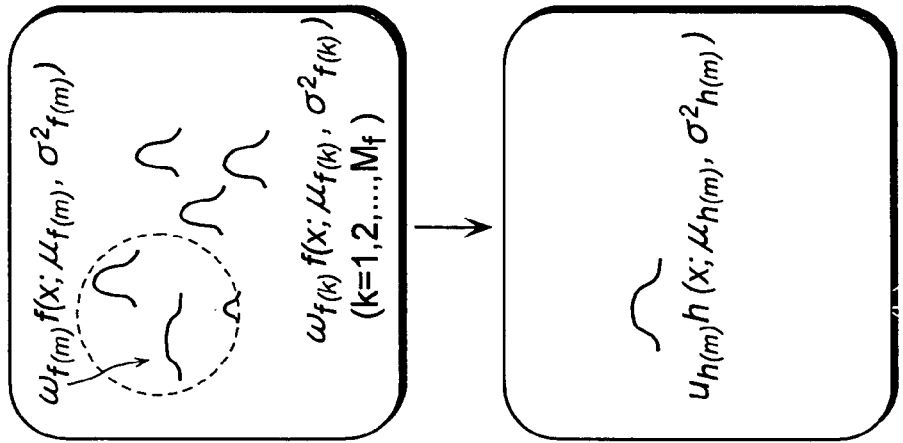
FIG. 12 is a diagram illustrating an approximate calculation performed by a second approximating unit shown in FIG. 10.

FIG. 12 is a diagram illustrating an approximate calculation performed by the general approximating unit 206e. As shown in this diagram, the general approximating unit 206e determines the single Gaussian distribution (Equation 30)

calculations are performed in accordance with the number of calculation times so that the number of selected output distributions Ph(m) in the above approximate calculation is reduced ultimately to Ph(m)=1.

$$\omega_{f(m)} = \frac{\sum_{i=1}^{N_g} \sum_{l=1}^{L_{g(i)}} \alpha_{(m,l,i)}}{\sum_{k=1}^{M_j} \omega_{f(k)} \left( \sum_{i=1}^{N_g} \sum_{l=1}^{L_{g(i)}} \alpha_{(k,l,i)} \right)} \quad (m=1,2,\ldots,M_f) \quad \text{(Equation 48)}$$

$$\alpha_{(m,l,i)} = \nu_{g(i,l)} \prod_{j=1}^{J} D_{(m,l,i,j)}$$

-continued $$D_{(m,l,i,j)} = \frac{\sigma_{j(m,j)}^2}{\sqrt{\sigma_{f(mj)}^2 \sigma_{k(mj)}^2 + \sigma_{g(i,l,j)}^2 \sigma_{h(m,j)}^2 - \sigma_{f(mj)}^2 \sigma_{g(i,l,j)}^2}} \times \exp$$

$$\left\{ \frac{1}{2} \left( \frac{\left( \left( \frac{\sigma_{f(m,j)} \sigma_{g(i,l,j)}}{\sigma_{h(m,j)}} \mu_{h(m,j)} - \frac{\sigma_{h(m,j)} \sigma_{h(m,j)}}{\sigma_{g(i,l,j)}} \mu_{g(i,j)} - \frac{\sigma_{g(i,l,j)} \sigma_{h(m,j)}}{\sigma_{f(m,j)}} \mu_{f(m,j)} \right)^2 \right)}{(\sigma_{f(m,j)}^2 \sigma_{h(m,j)}^2 + \sigma_{g(i,l,j)}^2 \sigma_{h(m,j)}^2 - \sigma_{f(h(m,j)}^2 \sigma_{g(i,l,j)}^2)} + \right.$$

$$\left. \frac{\mu_{h(m,j)}}{\sigma_{h(m,j)}^2} \frac{\mu_{g(l,f)}}{\sigma_{g(i,l,j)}^2} \frac{\mu_{f(m,f)}}{\sigma_{f(m,j)}^2} \right) \right\}$$

(Equation 49)

$$\mu_{f(m,j)} = \frac{\sum_{i=1}^{N_g} \sum_{l=1}^{L_{g(i)}} \beta_{(m,l,i,j)} \alpha_{(m,l,i)}}{\sum_{i=1}^{N_g} \sum_{l=1}^{L_{g(i)}} \alpha_{(m,l,i)}} (m = 1, 2, \ldots, M_f, j = 1, 2, \ldots, J)$$

$$\beta_{(m,l,i,l)} = \frac{\sigma_{f(m,j)}^2 \sigma_{h(m,j)}^2 \mu_{f(i,j)} + \sigma_{f(i,l,j)}^2 \sigma_{h(m,j)}^2 \mu_{f(m,j)} - \sigma_{f(m,j)}^2 \sigma_{f(i,l,j)}^2 \mu_{h(m,j)}}{\sigma_{f(m,j)}^2 \sigma_{h(m,j)}^2 + \sigma_{f(i,l,j)}^2 \sigma_{h(m,j)}^2 - \sigma_{f(m,j)}^2 \sigma_{g(i,l,j)}^2}$$

(Equation 50)

$$\sigma_{f(m,j)}^2 = \frac{\sum_{i=1}^{N_g} \sum_{l=1}^{L_{g(i)}} \gamma_{(m,l,i,j)} \alpha_{(m,l,i)}}{\sum_{i=1}^{N_g} \sum_{l=1}^{L_{g(i)}} \alpha_{(m,l,i)}} (m = 1, 2, \ldots, M_f, j = 1, 2, \ldots, J)$$

$$\gamma_{(m,l,i,j)} = \left\{ \frac{\sigma_{f(m,j)}^2 \sigma_{g(i,l,j)}^2 \sigma_{h(m,j)}^2}{\sigma_{f(m,j)}^2 \sigma_{h(m,j)}^2 + \sigma_{g(i,l,j)}^2 \sigma_{h(m,j)}^2 - \sigma_{f(m,j)}^2 \sigma_{g(i,l,j)}^2} + \right.$$

$$\left. \left( \mu_{f(m,j)} - \frac{\sigma_{f(m,j)}^2 \sigma_{h(m,j)}^2 \mu_{g(i,j)} + \sigma_{f(i,l,j)}^2 \sigma_{h(m,j)}^2 \mu_{f(m,j)} - \sigma_{f(m,j)}^2 \sigma_{g(i,l,j)}^2 \mu_{h(m,j)}}{\sigma_{f(m,j)}^2 \sigma_{h(m,j)}^2 + \sigma_{g(i,l,j)}^2 \sigma_{h(m,j)}^2 - \sigma_{f(m,j)}^2 \sigma_{g(i,l,j)}^2} \right)^2 \right\}$$

It should be noted that a probability used as the state transition probability is obtained by normalization in such a manner that all state transition probabilities of the corresponding HMMs are added with respect to the reference models 223 to sum up to one.

As explained so far, according to the second embodiment of the present invention, the standard model is created so as to maximize or locally maximize the probability or likelihood with respect to a plurality of reference models selected on the basis of the usage information. Thus, a high-precision standard model more appropriate to a usage environment is provided.

Note that the timing of creating the standard model is not limited to the explicit instruction given by the user as in the case of the present embodiment and that the standard model may be created at other timings. For example, the STB 201 may be further provided with a user change judging unit that automatically judges whether the user has been changed. The user change judging unit judges whether the user has been changed, that is, whether the current user is the same as the user who was an object of speech recognition immediately before, on the basis of the speech inputted for recognition into the television remote control. If the user is judged to be changed, the standard model is created using that speech as the usage information. In this way, the speech recognition is performed using the standard model that is appropriate to the user, without the user being aware of it.

It should be noted that the structure of the standard model 222 is not limited to the one composed of an HMM for each phoneme, and may be composed of a context-dependent HMM.

Also, the standard model creating unit 206 may create a model with respect to an output probability of an event in some of states of some of phonemes.

Moreover, the HMM making up the standard model 222 may be structured by a different number of states for each phoneme, or by a different number of Gaussian mixture distributions for each state.

Furthermore, the reference model 221 may be composed of an HMM having a different number of states or a different number of the Gaussian mixture distributions for each speaker. Also, the reference model 221 is not limited to be composed of an HMM for each speaker, and may be created for each combination of speaker, noise, and tone of voice.

Moreover, the standard model 222 may be recorded to a storage device, such as a CD-ROM, a hard disc, or a DVD-RAM.

Furthermore, instead of creating the reference models 221, they may be read from a storage device, such as a CD-ROM or DVD-RAM.

Also, the reference model selecting unit 205 may select a different number of reference models for each user on the basis of the usage information.

Moreover, the reference model preparing unit 202 may create and add a new reference model or update the reference model as necessary, and may also delete an unnecessary reference model from the reference model storing unit 203.

Furthermore, the reference model preparing unit 202 may add a new reference model into the reference model storing unit 203 via a communication channel or update the reference model as necessary.

Also, the number of output distributions Ph(m) selected according to the above approximate calculation may be different depending on an object event or the output distribution of the standard model, or may be determined on the basis of distances among the distributions.

Moreover, after the standard model creation, the learning may be further performed using speech data.

Furthermore, the standard model structure determining unit may determine the HMM structure, such as a monophone-based, triphone-based, or state-tying structure, and may also determine the number of states and the like.

Also, the number of mixture distributions may be set at a predetermined value when the STB of the present embodiment is shipped. Alternatively, the number of mixture distributions may be determined on the basis of the specifications, such as a CPU power, of an apparatus made in consideration of network connection and on the basis of the specifications of an application to be activated.

Third Embodiment

Figure 13:
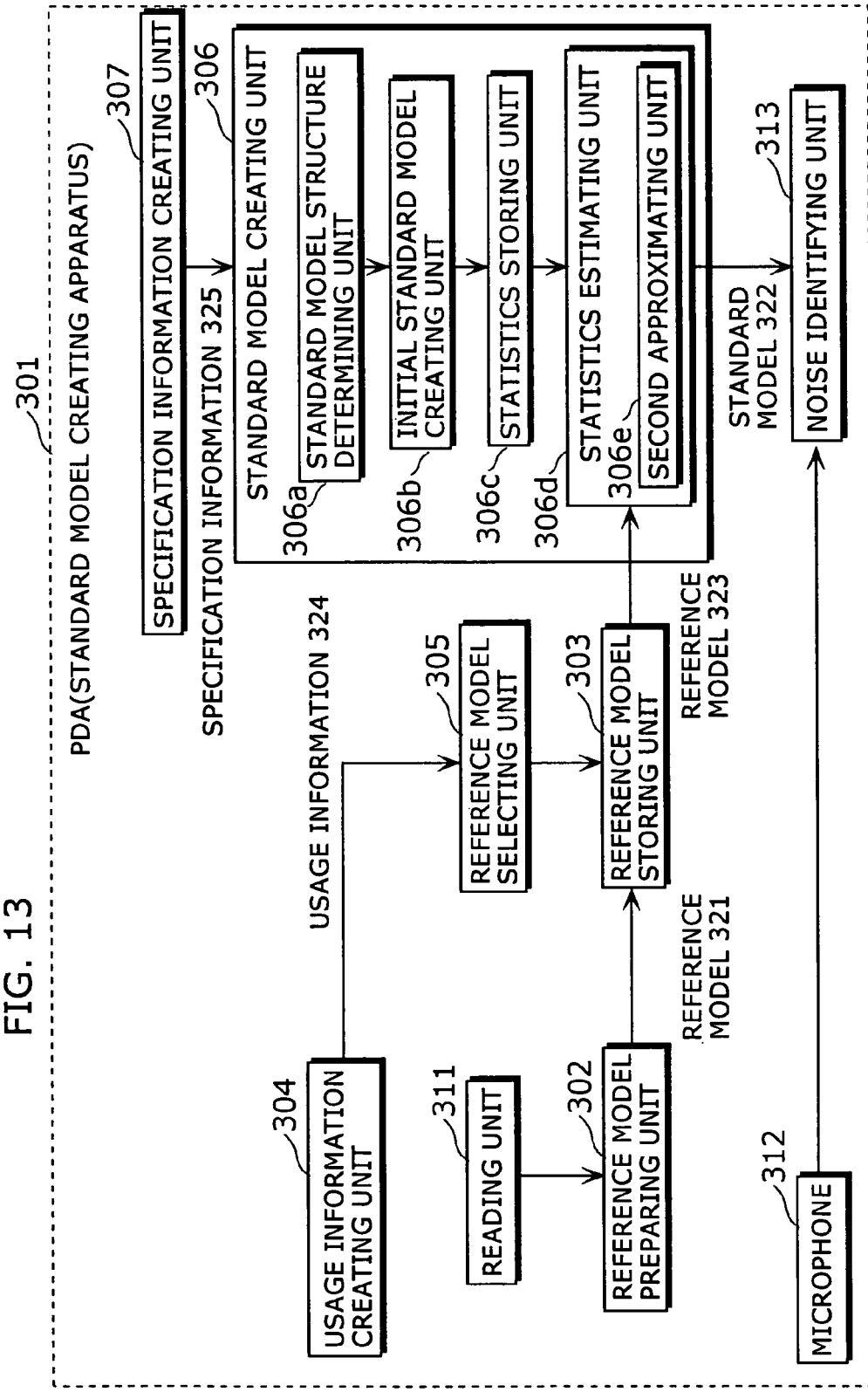
FIG. 13 is a block diagram showing the overall structure of a PDA related to a standard model creating apparatus of a third embodiment of the present invention.

FIG. 13 is a block diagram showing the overall structure of a standard model creating apparatus of the third embodiment of the present invention. In this diagram, the standard model creating apparatus of the present invention is embedded in a PDA (Personal Digital Assistant) 301. In the present embodiment, an explanation is given as to a case, as an example, where a standard model for noise identification (noise model) is created.

The PDA 301 is a portable information terminal. As the standard model creating apparatus for creating a standard model for noise identification that is defined by an output probability of an event, the PDA 301 is composed of a reading unit 311, a reference model preparing unit 302, a reference model storing unit 303, a usage information creating unit 304, a reference model selecting unit 305, a standard model creating unit 306, and a specification information creating unit 307, a microphone 312, and a noise identifying unit 313.

The reading unit 311 reads noise reference models, such as a car-A reference model, a car-B reference model, a bus-A reference model, a light-rain reference model, and a heavy-rain reference model, which are written on a storage device such as a CD-ROM. The reference model preparing unit 302 transmits the read reference models 321 to the reference model storing unit 303. The reference model storing unit 303 stores the reference models 321.

The usage information creating unit 304 creates a noise type as usage information 324, using a screen and keys of the PDA 301. The reference model selecting unit 305 selects the reference models which are acoustically similar to the noise type, i.e., the usage information 324, from among the reference models 321 stored in the reference model storing unit 303. The specification information creating unit 307 creates specification information 325 on the basis of the specifications of the PDA 301. Here, the specification information refers to information regarding the specifications of the standard model to be created. In the present example, it refers to information regarding the processing capacity of a CPU provided for the PDA 301.

The standard model creating unit 306 a processing unit for creating a standard model 322 so as to maximize or locally maximize the probability or likelihood with respect to the noise reference models 323 selected by the reference model selecting unit 305, on the basis of the specification information 325 created by the specification information creating unit 307. The standard model creating unit 306 is composed of: a standard model structure determining unit 306a for determining the structure (such as the number of Gaussian mixture distributions) of the standard model; an initial standard model creating unit 306b for creating an initial standard model by determining initial values of statistics used for calculating the standard model; a statistics storing unit 306c for storing the determined initial standard model; and a statistics estimating unit 306d for calculating statistics so as to maximize or locally maximize the probability or likelihood with respect to the reference models 323 selected by the reference model selecting unit 305, using approximate calculation or the like performed by a second approximating unit 306e on the initial standard model stored in the statistics storing unit 306c (that is to say, the statistics estimating unit 306d generates a final standard model).

The noise identifying unit 313 identifies a type of noise inputted from the microphone 312, using the standard model 322 created by the standard model creating unit 306.

The following is an explanation of an operation performed by the PDA 301 structured as described so far.

Figure 14:
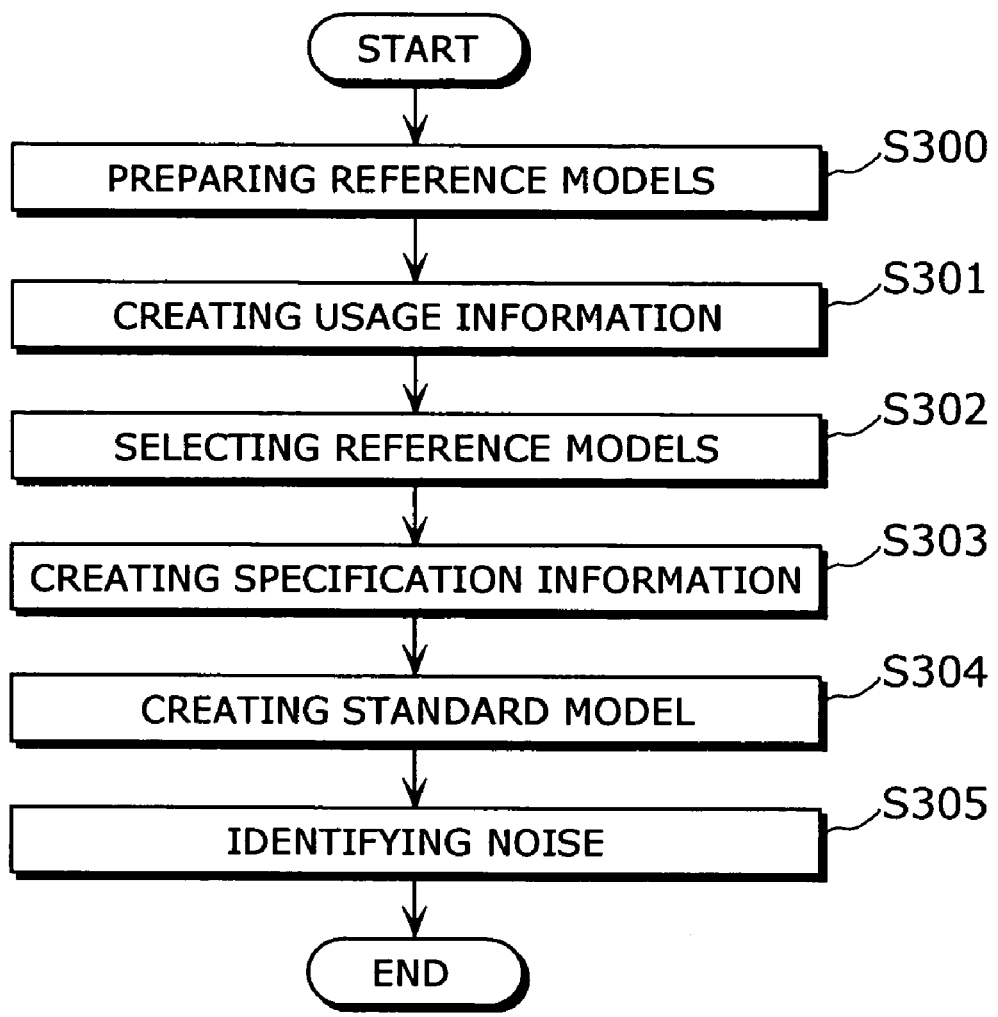
FIG. 14 is a flowchart showing an operational procedure executed by the PDA.

FIG. 14 is a flowchart showing an operational procedure executed by the PDA 301.

First, in advance of the standard model creation, reference models serving as criteria are prepared (step S300). To be more specific: the reading unit 311 reads the noise reference models written on the storage device such as a CD-ROM; the reference model preparing unit 302 transmits the read reference models 321 to the reference model storing unit 303; and the reference model storing unit 303 stores the reference models 321.

Figure 15:
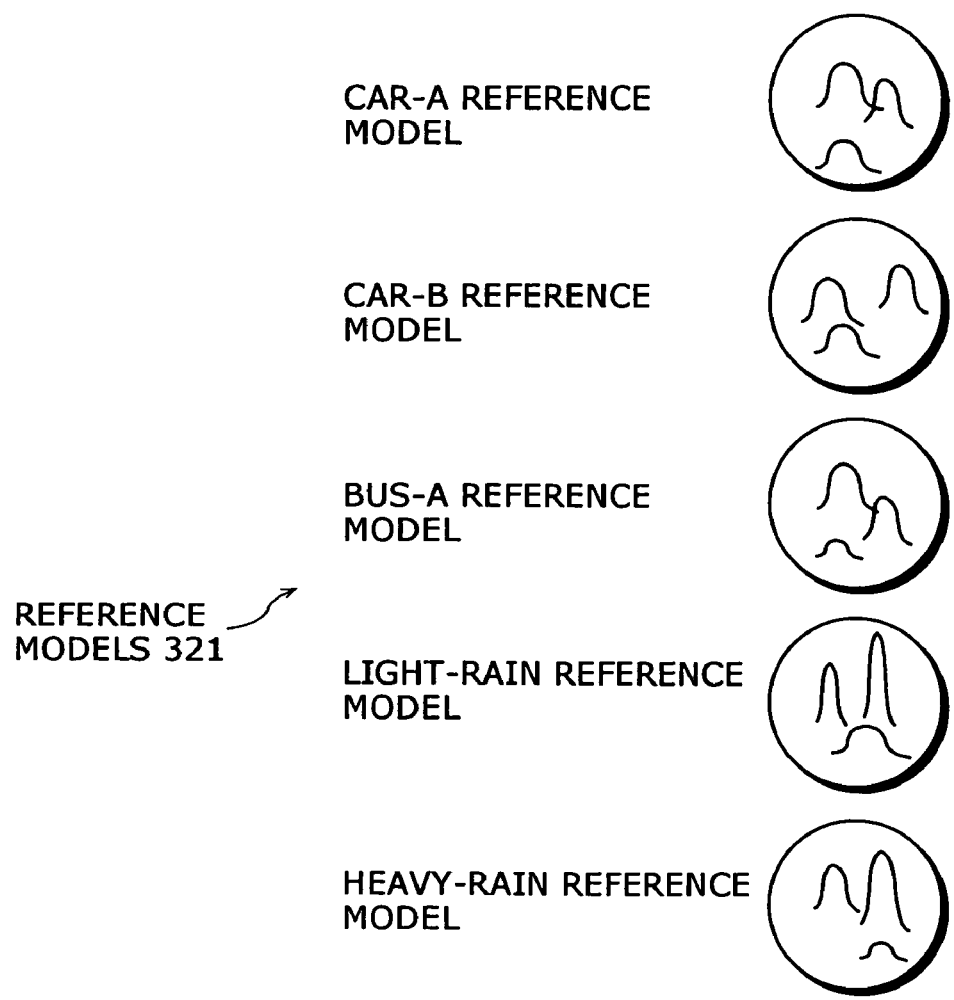
FIG. 15 shows examples of reference models stored in a reference model storing unit shown in FIG. 13.

The reference model 321 is composed of a GMM. FIG. 15 shows examples of the reference models 321. Here, each of the noise reference models is composed of a GMM having three mixture distributions. As the amount of characteristic, a five-dimension (J=5) LPC cepstrum coefficient is used.

Next, the usage information creating unit 304 creates the usage information 324, i.e., the noise type to be identified (step S301). FIG. 16 shows an example of a selection screen of the PDA 301. In this example, car noise has been selected. The reference model selecting unit 305 selects the car-A reference model and the car-B reference model which are acoustically similar to the car noise created as the usage information 324, from among the reference models 321 stored in the reference model storing unit 303 (step S302).

Then, the specification information creating unit 307 creates the specification information 325 on the basis of the specifications of the PDA 301 (step S303). In the present example, the specification information 325 indicating that the CPU power is small is created, on the basis of the specifications of the CPU provided for the PDA 301. The standard model creating unit 306 creates the standard model 322 so as to maximize or locally maximize the probability or likelihood with respect to the reference models 323 selected by the reference model selecting unit 305, on the basis of the created specification information 325 (step S304).

Finally, the noise identifying unit 313 performs noise identification on the noise inputted from the microphone 312 by the user, using the standard model 322 (step S305).

Next, a detailed procedure performed at the step S304 (i.e., the step of creating the standard model) in FIG. 14 is explained. The procedure flow is the same as described with reference to the flowchart shown in FIG. 4. Note that, however, the structure of the standard model to be adopted and specific approximate calculation are different.

First, the standard model structure determining unit 306a determines the structure of the standard model (step S102a in FIG. 4). Here, as the structure of the standard model, the standard model structure determining unit 306a determines that the standard model 322 is made up of a GMM having a single mixture (Mf=1), on the basis of the specification information 325 indicating that the CPU power is small.

Next, the initial standard model creating unit 306b determines initial values of the statistics in order to calculate the standard model (step S102b in FIG. 4). Here, the car-A three-mixture reference model selected as the reference model 323 is integrated into one Gaussian distribution by statistical processing calculation and this integrated one is stored into the statistics storing unit 206c as the initial values of the statistics.

More specifically, the initial standard model creating unit 306b generates an output distribution represented as the above Equation 13.

In the present embodiment, however, $$x=(x_{(1)}, x_{(2)}, \ldots, x_{(J)}) \in R^J \quad \text{(Equation 51)}$$

included in the output distribution represented as the above Equation 13 represents a five-dimensional (J=5) LPC cepstrum coefficient.

The statistics estimating unit 306d estimates the statistics of the standard model stored in the statistics storing unit 306c, using the two reference models 323 selected by the reference model selecting unit 305 (step S102c in FIG. 4).

To be more specific, the statistics estimating unit 306d estimates the statistics of the standard model (i.e., the mixture weighting coefficient represented as the above Equation 16, the mean value represented as the above Equation 17, and the variance represented as the above Equation 18) that locally maximize or maximize the probability (in the present case, the likelihood logP represented as the above Equation 25) of the standard model with respect to the output distribution for each of the two reference models 323 (Ng=2), that is, the output distribution represented as the above Equation 19.

In the present embodiment, however, $$L_{g(i)} \ (i=1,2,\ldots,N_g) \quad \text{(Equation 52)}$$

included in the output distribution represented as the above Equation 19 is three (the number of mixture distributions of each reference model).

More specifically, using the above Equation 26, Equation 27, and Equation 28, the mixture weighting coefficient, the mean value, and the variance of the standard model are respectively calculated.

Here, the second approximating unit 306e of the statistics estimating unit 306d uses the following approximate expression on the assumption that the Gaussian distributions of the standard model will not affect each other.

$$\gamma(x, m) \approx \frac{\omega_{f(m)} f(x; \mu_{f(m)}, \sigma_{f(m)}^2)}{u_{h(m)} h(x; \mu_{h(m)}, \sigma_{h(m)}^2)} \approx 1.0 \quad \text{(Equation 53)}$$

$$(m = 1, 2, \ldots, M_f)$$

Moreover, the second approximating unit 306e approximates $$x \quad \text{(Equation 55)}$$

which is a neighborhood of the Gaussian distribution of the standard model represented as $$\omega_{f(m,p)} f(x; \mu_{f(m,p)}, \sigma_{f(m,p)}^2) \ (m=1,2,\ldots,M_f, p=1,2,\ldots, P_{h(m)}) \quad \text{(Equation 54)}$$

to a space that includes the Gaussian distribution represented as $$g(x; \mu_{g(i,l)}, \sigma_{g(i,l)}^2) \ (i=1,2,\ldots,N_g, l=1,2,\ldots,L_{(i)}) \quad \text{(Equation 56)}$$

of Qg(m,i) reference models having short distribution distances, such as the mean Euclidean distance, the Mahalanobis distance, and the Kullback-Leibler (KL) distance, with respect to the output distribution represented as the above Equation 54. The second approximating unit 306e further approximates the output distributions of the above Qg(m,i) (1≦Qg(m,i)≦Lg(i)) reference vectors having short distribution distances with respect to $$\omega_{f(m,p)} f(x; \mu_{f(m,p)}, \sigma_{f(m,p)}^2) \ (m=1,2,\ldots,M_f, p=1,2,\ldots,P_{h(m)}) \quad \text{(Equation 57)}$$

to the output distribution of the reference vector where the output distribution of the standard model represented as the above Equation 57 that has the shortest distribution distances (neighborhood direction parameter G=1) out of the output distributions represented as $$v_{g(i,l)} g(x; \mu_{g(l)}, \sigma_{g(l)}^2) \ (i=1,2,\ldots,N_g, l=1,2,\ldots,L_{g(i)}) \quad \text{(Equation 58)}$$

Figure 17:
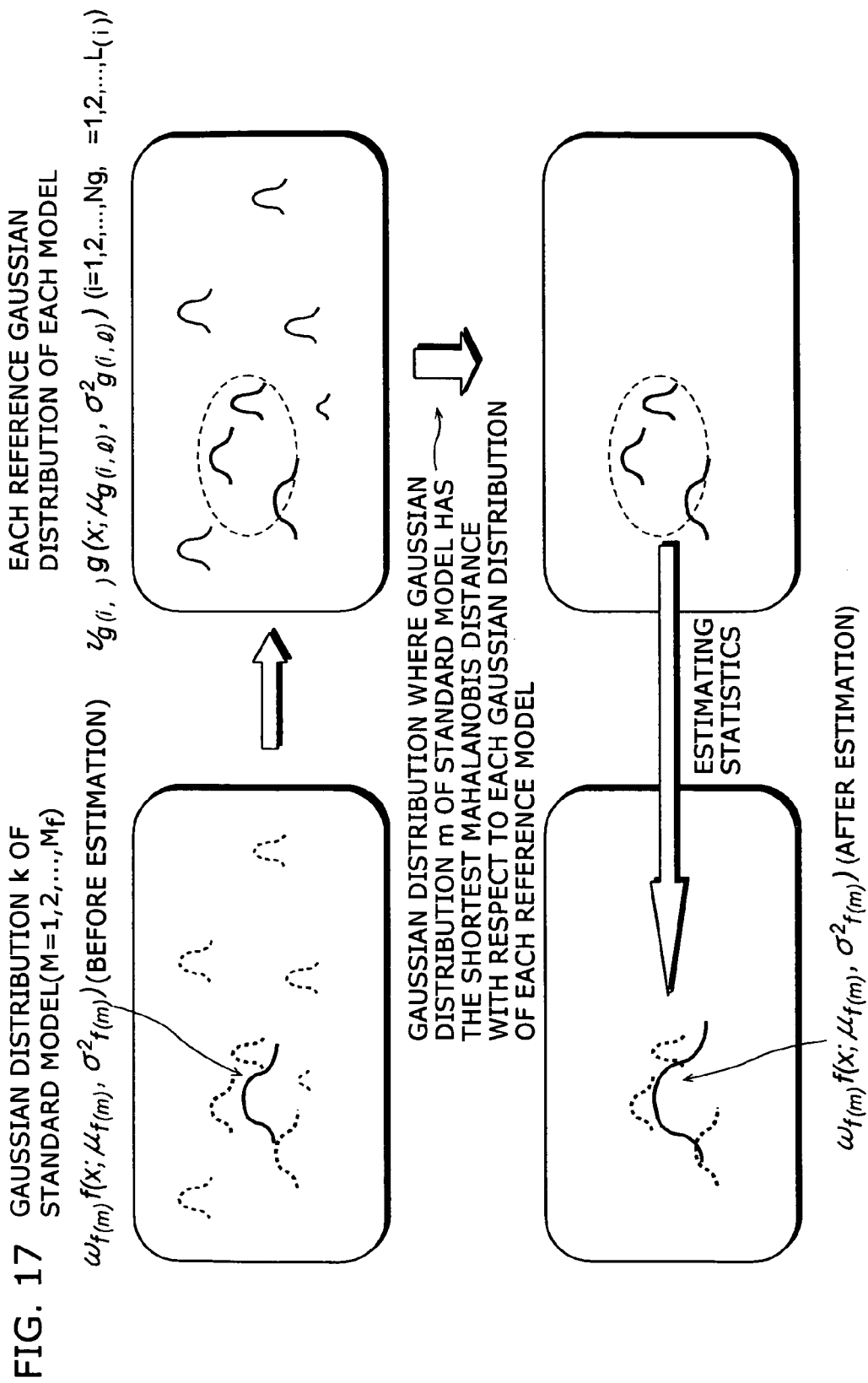
FIG. 17 is a conceptual diagram showing a procedure of statistics estimation executed by a statistics estimating unit shown in FIG. 13.

FIG. 17 is a conceptual diagram showing a procedure of statistic estimation executed by this statistics estimating unit 306d. This diagram shows that the statistic estimation is performed using the Gaussian distributions where the Gaussian distribution m of the standard model has the shortest distribution distances, such as the mean Euclidean distance and Mahalanobis distance, with respect to each Gaussian distribution of each reference model.

Figure 18:
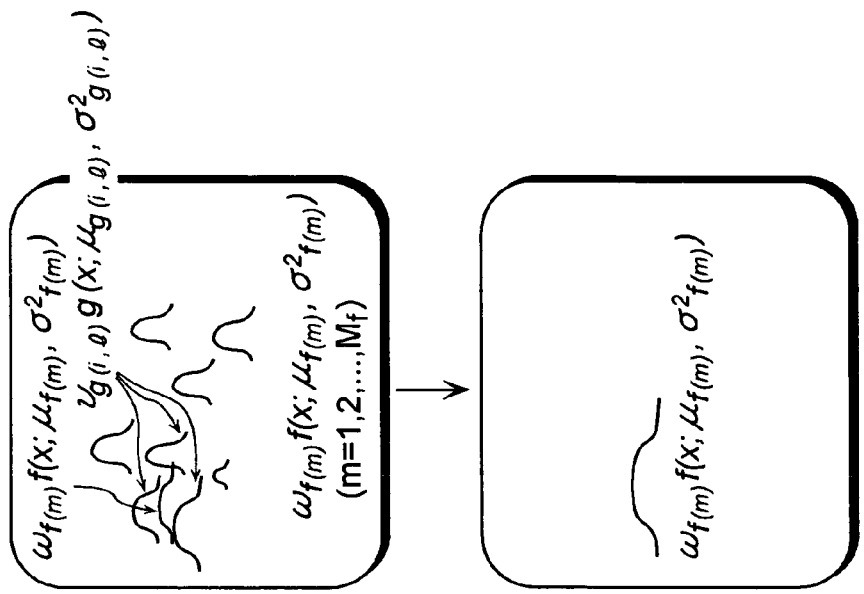
FIG. 18 is a diagram illustrating approximate calculation performed by a second approximating unit shown in FIG. 13.

FIG. 18 is a diagram illustrating approximate calculation performed by the second approximating unit 306e. As shown in this diagram, the second approximating unit 306e uses the approximate expression represented as the above Equation 53 by determining the Gaussian distribution m of the standard model that has the shortest distances with respect to each Gaussian distribution of each reference model.

In summary with consideration given to the approximate expression used by the second approximating unit 306e, a calculation formula used by the statistics estimating unit 306d is as follows. The statistics estimating unit 306d calculates the mixture weighting coefficient, the mean value, and the variance respectively using the following Equation 59, Equation 60 and Equation 61, and then generates the standard model specified by these parameters as the final standard model 322.

$$\omega_{f(m)} = \frac{\sum_{i=1}^{N_g} \sum_{l=1}^{Q_{g(m,i)}} v_{g(i,l)}}{\sum_{k=1}^{M_f} \sum_{i=1}^{N_g} \sum_{l=1}^{Q_{g(m,i)}} v_{g(i,l)}} \quad \text{(Equation 59)}$$

$$(m = 1, 2, \ldots, M_f)$$

(Here, the sum of the denominator and the numerator is the sum related to the Gaussian distributions where the Gaussian distribution m of the standard model has the shortest distribution distances, such as the mean Euclidean distance and the Mahalanobis distance, with respect to each Gaussian distribution of each reference model.)

$$\mu_{f(m,j)} = \frac{\sum_{i=1}^{N_g} \sum_{l=1}^{Q_{g(m,i)}} v_{g(i,l)} \mu_{g(i,l,j)}}{\sum_{i=1}^{N_g} \sum_{l=1}^{Q_{g(m,i)}} v_{g(i,l)}} \quad \text{(Equation 60)}$$

$$(m = 1, 2, \ldots, M_f, j = 1, 2, \ldots, J)$$

(Here, the sum of the denominator and the numerator is the sum related to the Gaussian distributions where the Gaussian distribution m of the standard model has the shortest distribution distances, such as the mean Euclidean distance and the Mahalanobis distance, with respect to each Gaussian distribution of each reference model.)

$$\sigma^2_{f(m,j)} = \frac{\sum_{i=1}^{N_g} \sum_{l=1}^{Q_{g(m,i)}} v_{g(i,l)} (\sigma^2_{g(i,l)} + \mu^2_{g(i,l,j)})}{\sum_{i=1}^{N_g} \sum_{l=1}^{Q_{g(m,i)}} v_{g(i,l)}} - \mu^2_{f(m,j)} \quad \text{(Equation 61)}$$

$$(m = 1, 2, \ldots, M_f, j = 1, 2, \ldots, J)$$

(Here, the sum of the denominator and the numerator is the sum related to the Gaussian distributions where the Gaussian distribution m of the standard model has the shortest distribution distances, such as the mean Euclidean distance and the Mahalanobis distance, with respect to each Gaussian distribution of each reference model.)

However, in the case of $$\sum_{i=1}^{N_g} Q_{g(m,i)} = 0 \quad (m = 1, 2, \ldots, M_f) \quad \text{(Equation 62)}$$

the values of the statistics are determined using one of the following methods:

(the first method) the mixture weighting coefficient, the mean value, the variance are not updated;

(the second method) the mixture weighting coefficient is set at zero, and the mean value and the variance are set at respective predetermined values; and (the third method) the mixture weighting coefficient is set at a predetermined value, and the mean value and the variance are set at the mean value and the variance obtained in a case where the output distributions of the standard model are expressed by a single distribution.

It should be noted that the method to be employed may be different depending on the number of repetitions R, the HMM, or the state of the HMM. In the present example, the first method is employed.

The statistics estimating unit 306d stores the statistics of the standard model estimated in this way into the statistics storing unit 306c. After this, the statistics estimating unit 306d repeats such series of estimating the statistics and storing them into the statistics storing unit 306c, R ($\geq$1) times. Then, the statistics estimating unit 306d outputs the resultant statistics as the statistics of the standard model 322 that is to be eventually generated.

The following is an explanation of a specific example in which the present embodiment is applied to the environmental sound identification performed by the PDA.

First, the reference model preparing unit 302 reads the reference models required for the environmental sound identification from a CD-ROM. In consideration of the environment in which the identification is performed (i.e., the usage information), the user selects the environmental sound to be identified on the screen. For example, the user selects "car" and then selects "warning sound", "baby's voice", "train sound", etc. On the basis of this selection, the reference model selecting unit 305 selects the corresponding reference models from among the reference models stored in the reference model storing unit 303. Using the selected reference models 323 one by one, the standard model creating unit 306 creates a standard model for each.

Following this, the user activates an application program called "easy information provision" (information provision through a situation judgment on the basis of environmental sounds) using the PDA 301. This application is a program which judges the situation on the basis of the environmental sounds and provides appropriate information for the user. When it is started, "precise judgment" and "quick judgment" are displayed on the display screen of the PDA 301. The user selects either of them in response.

On the basis of the resultant selection, the specification information creating unit 307 creates specification information. For example, if "precise judgment" is selected, the specification information creating unit 307 creates specification information having 10 mixture distributions to achieve a higher degree of precision. On the other hand, if "quick judgment" is selected, it creates specification information having a single mixture distribution to perform processing at a higher speed. Note that in a case where cooperative processing can be performed by a plurality of PDAs, the specification information creating unit 307 may judge the currently-available CPU power and create specification information based on this CPU power.

In accordance with such specification information, single-mixture standard models are created for "car", "warning sound", "baby's voice", "train sound", etc. Then, the PDA 301 executes the environmental sound identification using the created standard models and, on the basis of the identification results, displays each set of information on the screen of the PDA. For instance, if a "car" is judged to be near, a road map is displayed, and if "baby's voice" is judged to be heard, advertisements for toy stores are displayed. In this way, the information provision based on the environmental sound identification is realized using the standard models created by the standard model creating apparatus of the present embodiment. It should be noted that the complexity of the standard model can be adjusted in accordance with the specifications of the application.

According to the third embodiment of the present invention as described so far, a standard model is created by calculating statistics of the standard model so as to maximize or locally maximize the probability or likelihood with respect to a plurality of reference models selected on the basis of the usage information. On the account of this, a high-precision standard model more appropriate to a usage situation is provided.

Since a standard model is created on the basis of the specification information, the standard model suitable for an apparatus that uses this standard model is prepared.

It should be noted that the number of processing repetitions performed by the statistics estimating unit 306d may be the number counted until reaching a certain threshold value having the degree of the likelihood represented as the above Equation 25.

Moreover, the GMM making up the standard model 322 may be composed of a Gaussian mixture distribution having a different number of mixture distributions for each noise type.

Furthermore, an identification model is not limited to a noise model. Speakers may be identified, or their ages or the like may be identified.

Also, the standard model 322 may be stored in a storage device, such as a CD-ROM, a DVD-RAM, or a hard disc.

Moreover, instead of reading the reference models 321 from the storage device such as a CD-ROM, the PDA 301 may create the reference models 321 using noise data.

Furthermore, the reference model preparing unit 302 may add a new reference model read from the storage device such as a CD-ROM or update the reference model as necessary, and may also delete an unnecessary reference model from the reference model storing unit 303.

Also, the reference model preparing unit 302 may add a new reference model into the reference model storing unit 303 via a communication channel or update the reference model as necessary.

Moreover, after the standard model creation, the learning may be further performed using data.

Furthermore, the standard model structure determining unit may determine the structure, the number of states, and the like of the standard model.

Also, the neighborhood direction parameter G may be different depending on the object event or the output distribution of the standard model, and may vary with the number of repetitions R.

Fourth Embodiment

Figure 19:
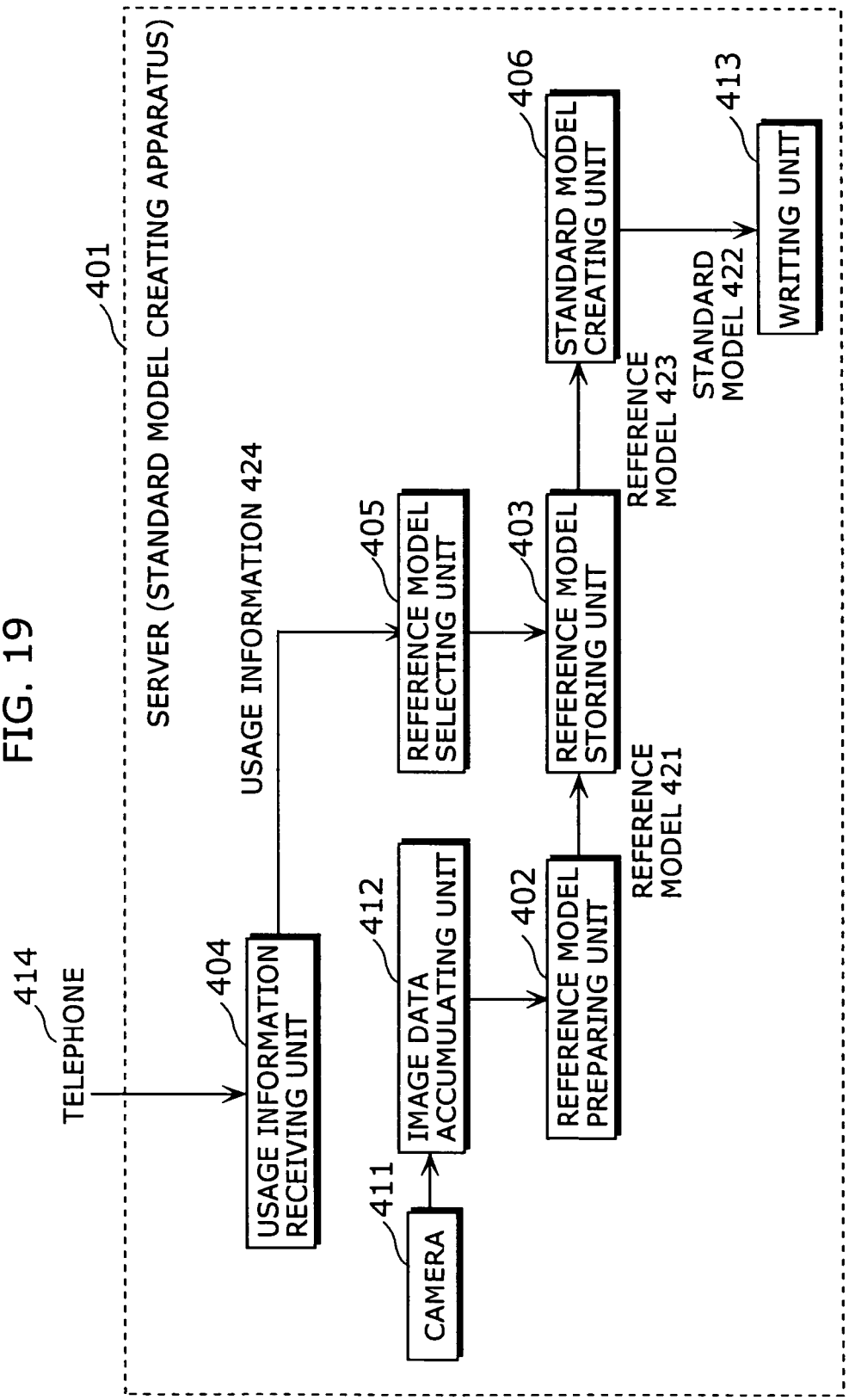
FIG. 19 is a block diagram showing the overall structure of a server related to a standard model creating apparatus of a fourth embodiment of the present invention.

FIG. 19 is a block diagram showing the overall structure of a standard model creating apparatus of the fourth embodiment of the present invention. This diagram shows an example in which the standard model creating apparatus of the present invention is embedded in a server 401 of a computer system. In the present embodiment, an explanation is given as to a case, as an example, where a standard model for face recognition is created.

The server 401 is a computer apparatus or the like used in a communication system. As a standard model creating apparatus for creating a standard model for face recognition that is defined by an output probability of an event, the server 401 is composed of a camera 411, an image data accumulating unit 412, a reference model preparing unit 402, a reference model storing unit 403, a usage information receiving unit 404, a reference model selecting unit 405, a standard model creating unit 406, and a writing unit 413.

Data of face images is collected by the camera 411, and the face image data is accumulated into the image data accumulating unit 412. The reference model preparing unit 402 creates reference models 421 for each speaker using the face image data accumulated in the image data accumulating unit 412, and then stores them into the reference model storing unit 403.

The usage information receiving unit 404 receives information regarding age and gender of a speaker whom the user wishes to be an object of face recognition, as usage information 424 from a telephone 414. On the basis of the usage information 424 received by the usage information receiving unit 404, the reference model selecting unit 405 selects the reference models 423 corresponding to the age and gender of the speaker indicated by the usage information 424, from among the reference models 421 stored in the reference model storing unit 403.

The standard model creating unit 406 is a processing unit for creating a standard model 422 so as. to maximize or locally maximize the probability or likelihood with respect to the reference models 423 related to the face image of the speaker that were selected by the reference model selecting unit 405. The standard model creating unit 406 has the same function as the standard model creating unit 206 in the second embodiment, and has the functions of the first approximating unit 104e in the first embodiment and the second approximating unit 306e in the third embodiment as well. In other words, the standard model creating unit 406 performs calculation which is a combination of three kinds of approximate calculations described in the first to third embodiments.

The writing unit 413 writes the standard model 422 created by the standard creating unit 406 into a storage device such as a CD-ROM.

The following is an explanation of an operation performed by the server 401 structured as described so far.

Figure 20:
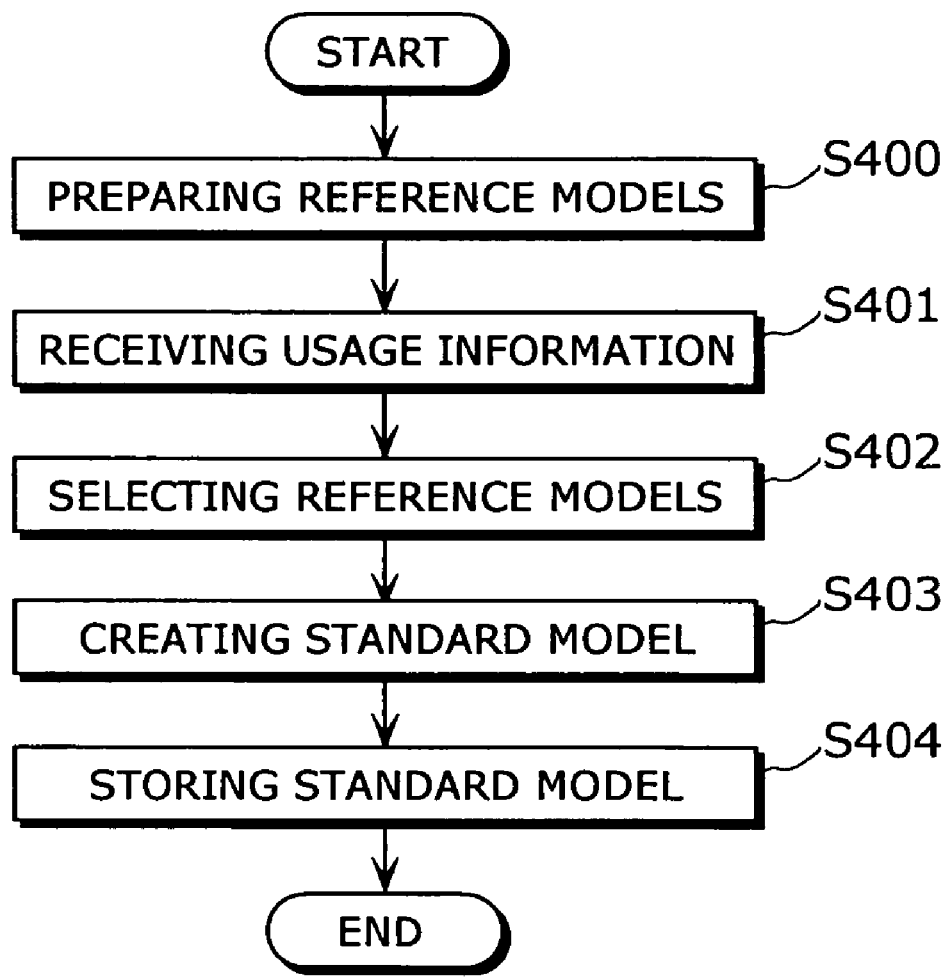
FIG. 20 is a flowchart showing an operational procedure executed by the server.
Figure 21:
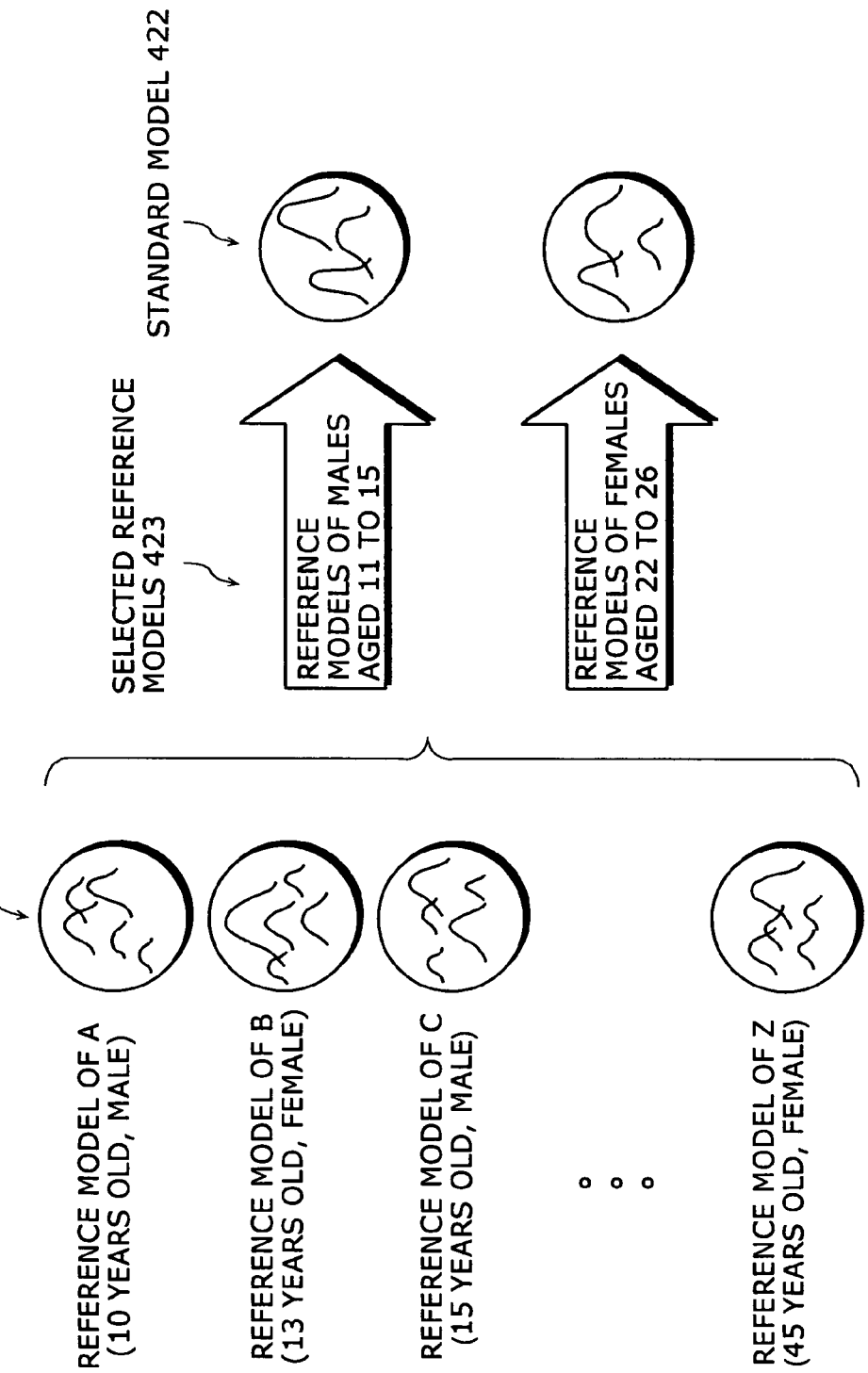
FIG. 21 shows examples of the reference models and standard models in order to explain the operational procedure executed by the server.

FIG. 20 is a flowchart showing an operational procedure executed by the server 401. FIG. 21 shows examples of the reference models and standard models in order to explain the operational procedure executed by the server 401.

First, in advance of the standard model creation, reference models serving as criteria are prepared (step S400 in FIG. 20). To be more specific: the camera 411 collects data of face images of speakers A to Z and accumulates the data into the image data accumulating unit 412; and the reference model preparing unit 402 creates the reference model 421 for each speaker based on the EM algorithm, using the face image data accumulated in the image data accumulating unit 412. Here, the reference model 421 is composed of a GMM.

The reference model storing unit 403 stores the reference models 421 created by the reference model preparing unit 402. In the present example, as shown by the reference models 421 in FIG. 21, each reference model of the speakers A to Z is composed of a GMM having five mixture distributions. As the amount of characteristic, a 100-demensional (J=100) pixel density is used.

Next, the usage information receiving unit 404 receives information regarding age and gender as the usage information 424 from the telephone 414 (step S401 in FIG. 20). In this example, the usage information 424 relates to males aged 11 to 15 and females aged 22 to 26. On the basis of the usage information 424, the reference model selecting unit 405 selects the reference models 423 corresponding to the usage information 424 from among the reference models 421 stored in the reference model storing unit 403 (step S402 in FIG. 20). To be more specific, as shown by the "SELECTED REFERENCE MODELS 423", the reference models of the males aged 11 to 15 and the females aged 22 to 26 are selected here.

Then, the standard model creating unit 406 creates the standard model 422 so as to maximize or locally maximize the probability or likelihood with respect to the reference models 423 of the speakers selected by the reference model selecting unit 405 (step S403 in FIG. 20). As shown by the standard models 422 in FIG. 21, each of the two standard models 422 is composed of a GMM having three mixture distributions in this example.

The method of creating the standard model 422 is basically the same as in the case of the second embodiment. However, the approximate calculation for estimating the statistics of the standard model 422 is specifically performed as follows. The standard model creating unit 406: creates a model using the same approximate calculation as performed by the first approximating unit 104e in the first embodiment via a built-in storage unit or the like; determines this model as initial values to perform the same approximate calculation as performed by the general approximating unit 206e in the second embodiment; and determines the result as initial values to perform the same approximate calculation as performed by the second approximating unit 306e in the third embodiment.

The writing unit 413 writes the two standard models 422 created by the standard model creating unit 406 to a storage device such as a CD-ROM (step S404 in FIG. 20).

The user receives the storage device to which the standard model for the males aged 11 to 15 and the standard model for the females aged 22 to 26 have been written, by mail.

Next, an explanation is given as to a specific example in which the present embodiment is applied to an information providing system that introduces stores and the like on the basis of action prediction. This information providing system is composed of a car navigation apparatus and an information providing server apparatus which are connected to each other via a communication network. The car navigation apparatus has a function for predicting human action (i.e., a destination to go by car, for example) using the standard model previously created as an action prediction model by the standard model creating apparatus 401 of the present embodiment and for providing information associated with the action (i.e., information regarding stores such as restaurants located near the destination, for example).

First, the user requests the server 401, using the car navigation apparatus that is connected to the server 401 via a telephone line 414, to create an action prediction model for the user.

More specifically, the user presses a button of "easy recommendation function" on an item selection screen displayed by the car navigation apparatus. In response to this, a screen for inputting the user's address (usage location), age, gender, hobby, etc. is displayed.

Note that the users will be a father and a mother in the present example. First, personal information of the father is inputted on the screen of the car navigation apparatus in an interactive manner. The address is automatically converted when the user inputs his telephone number. Alternatively, the current location is inputted as the usage location by the user pressing a button of "usage location" while the current location is being displayed on the screen of the car navigation apparatus. In the present example, the address information is described as an address A. As to the age and gender, "50s" and "male" are respectively inputted. As to the hobby, the user marks corresponding items on a displayed check list that is previously prepared. In the present example, the information regarding the father's hobby is described as hobby information A.

Following this, personal information of the mother is also inputted in the same way. The personal information composed of an address B, 40s, female, and hobby information B is created. The input result is as shown by an example of a screen display in FIG. 22.

Finally, the car navigation apparatus transmits the personal information created in this way as the usage information to the server 401, namely the information providing server apparatus, using the accompanying telephone line 414.

Next, the server 401 creates two action prediction models for the father and the mother on the basis of the transmitted personal information (the usage information). Here, the action prediction model is represented by a probability model. Its inputs are a day of the week, a time of day, a current location, etc. while its outputs are respective probabilities that information of a store A, a store B, a store C, a parking lot, etc. will be provided.

A plurality of reference models stored in the reference model storing unit 403 of the server 401 are action prediction models which are formed in accordance with ages, genders, representative addresses, and patterns of hobbies. When using the server 401, the user previously inputs various sets of personal information (i.e., the information regarding the above-mentioned inputs and outputs) using input buttons or the like of the car navigation apparatus instead of using the camera 411, so that the various sets of the personal information are accumulated into the image data accumulating unit 412. On the basis of the personal information accumulated in the image data accumulating unit 412, the reference model preparing unit 402 creates a plurality kinds of typical reference models 421 for each user which are then stored into the reference model storing unit 403.

On the basis of the personal information (i.e., the usage information), the reference model selecting unit 405 selects the corresponding reference models. For example, the reference model selecting unit 405 selects the reference models with the same town address, the similar age, the same gender, and 80% or more of their marked hobby items being the same. The standard model creating unit 406 of the server 401 creates a standard model by integrating the selected reference models. The created standard model is stored by the writing unit 413 into a memory card. In the present example, two standard models corresponding to the father and the mother are stored. The memory card is sent to the user by mail.

The user inserts the received memory card into the car navigation apparatus, and sets users by selecting "father" and "mother" displayed on the screen. Then, using the standard models stored as the action prediction models in the inserted memory card, the car navigation apparatus provides information regarding stores and the like at a necessary timing on the basis of the current day of the week, the current time of day, and the current location. In this way, an information providing system for predicting human action (i.e., a destination to go by car, for example) using the standard model created as an action prediction model by the standard model creating apparatus of the present embodiment and for providing information associated with the action is realized.

As explained so far, according to the fourth embodiment of the present invention, a standard model is created by calculating statistics of the standard model so as to maximize or locally maximize the probability or likelihood with respect to a plurality of reference models selected on the basis of the usage information. On account of this, a high-precision standard model more appropriate to a usage situation is provided.

It should be noted that the GMM making up the standard model 422 may be composed of a Gaussian mixture distribution having a different number of mixture distributions for each speaker.

Also, the reference model preparing unit 402 may create and add a new reference model into the reference model storing unit 403 or update the reference model as necessary, and may also delete an unnecessary reference model from the reference model storing unit 403.

Moreover, after the standard model creation, the learning may be further performed using data.

Furthermore, the standard model structure determining unit may determine the structure, the number of states, and the like of the standard model.

Fifth Embodiment

Figure 23:
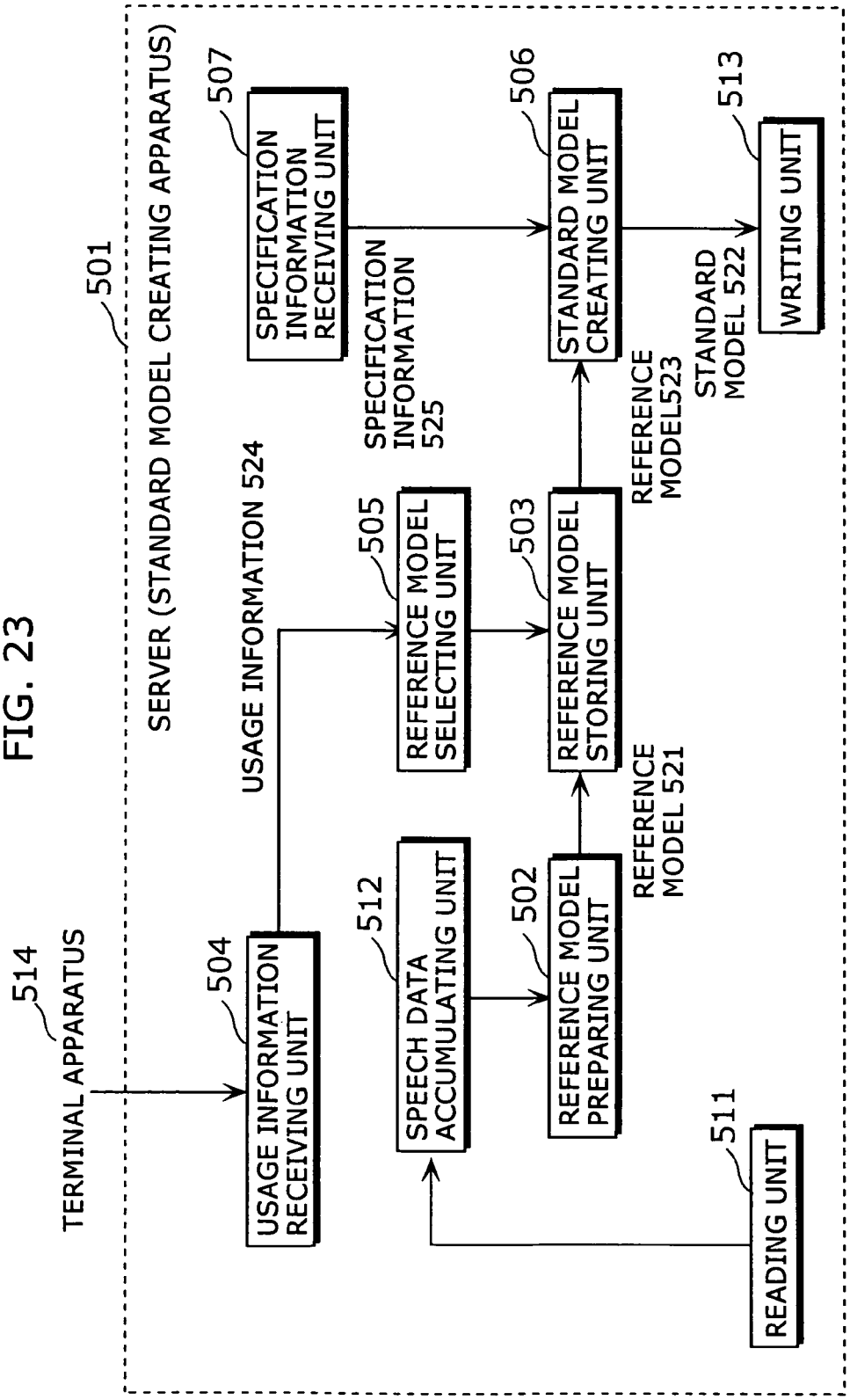
FIG. 23 is a block diagram showing the overall structure of a server related to a standard model creating apparatus of a fifth embodiment of the present invention.

FIG. 23 is a block diagram showing the overall structure of a standard model creating apparatus of the fifth embodiment of the present invention. This diagram shows an example in which the standard model creating apparatus of the present invention is embedded in a server 501 of a computer system. In the present embodiment, an explanation is given as to a case, as an example, where a standard model (adaptive model) for speech recognition is created.

The server 501 is a computer apparatus or the like used in a communication system. As a standard model creating apparatus for creating a standard model for speech recognition that is defined by an output probability of transitions between a group of events and an event or among events, the server 501 is composed of a reading unit 511, a speech data accumulating unit 512, a reference model preparing unit 502, a reference model storing unit 503, a usage information receiving unit 504, a reference model selecting unit 505, a standard model creating unit 506, a specification information receiving unit 507, and a writing unit 513.

The reading unit 511 reads speech data of children, adults, and the elderly written on a storage device such as a CD-ROM, and accumulates the read data into the speech data accumulating unit 512. The reference model preparing unit 502 creates reference models 521 for each speaker using the speech data accumulated in the speech data accumulating unit 512. The reference model storing unit 503 stores the reference models 521 created by the reference model preparing unit 502.

The specification information receiving unit 507 receives specification information 525. The usage information receiving unit 504 receives speech of the user as usage information 524. The reference model selecting unit 505 selects reference models that are acoustically similar to the speech of the user, i.e., the usage information, from among the reference models 521 stored in the reference model storing unit 503.

The standard model creating unit 506 is a processing unit for creating a standard model 522, on the basis of the specification information 525, so as to maximize or locally maximize the probability or likelihood with respect to the reference models 523 of the speaker selected by the reference model selecting unit 505. The standard model creating unit 506 has the same function as the standard model creating unit 104 in the first embodiment. The writing unit 513 writes the standard model 522 created by the standard model creating unit 506 to a storage device, such as a CD-ROM.

Next, an operation performed by the server 501 structured as described so far is explained.

Figure 24:
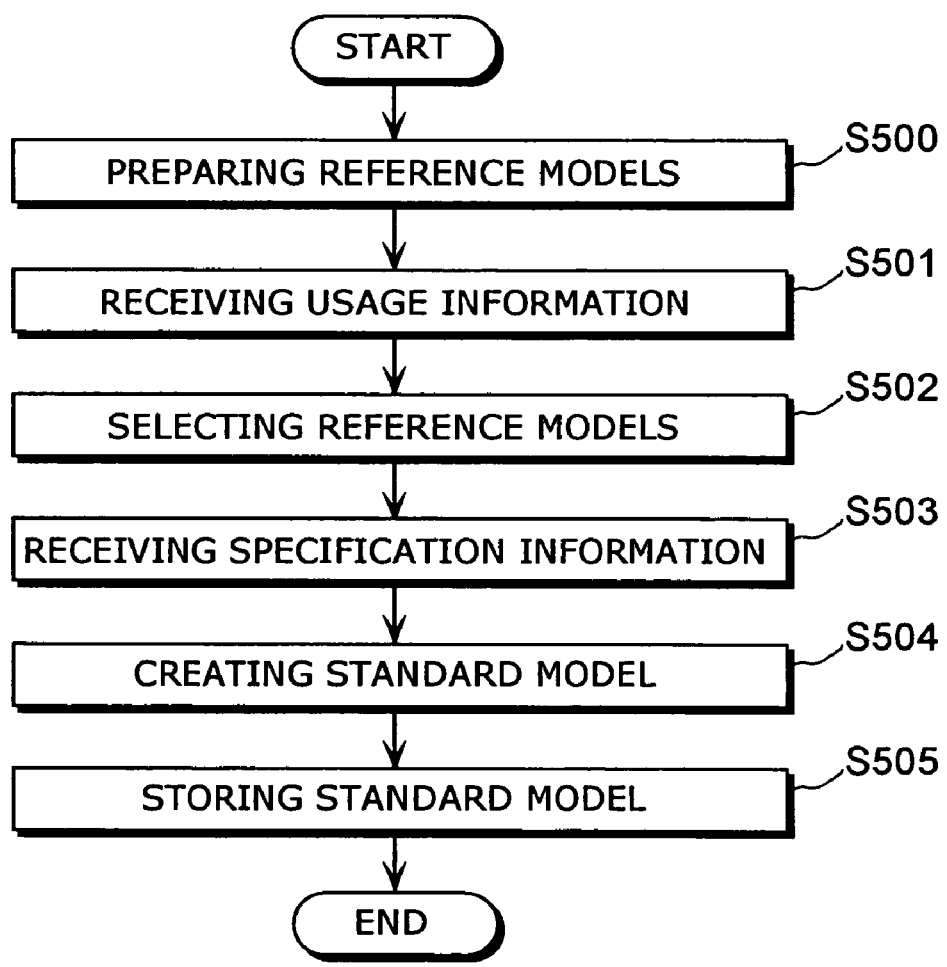
FIG. 24 is a flowchart showing an operational procedure executed by the server.

FIG. 24 is a flowchart showing an operational procedure executed by the server 501. FIG. 25 shows examples of the reference models and standard models in order to explain the operational procedure executed by the server 501.

First, in advance of the standard model creation, reference models serving as criteria are prepared (step S500 in FIG. 24). To be more specific: the reading unit 511 reads the speech data written on the storage device such as a CD-ROM and accumulates the read data into the speech data accumulating unit 512; the reference model preparing unit 502 creates the reference models 521 for each speaker using the speech data accumulated in the speech data accumulating unit 512, according to the Baum-Welch re-estimation method; and the reference model storing unit 503 stores the reference models created by the reference model preparing unit 502.

The reference model 521 is composed of an HMM for each phoneme. In the present example, as shown by the reference models 521 in FIG. 25: the reference model of each child speaker has three states, in each of which an output distribution of the HMM is structured by 128 three Gaussian mixture distributions; the reference model of each adult speaker has three states, in each of which an output distribution of the HMM is structured by 64 Gaussian mixture distributions; and the reference model of each elderly speaker has three states, in each of which an output distribution of the HMM is structured by 16 Gaussian mixture distributions. Note that this is because the speech data of a child is relatively small in amount while the speech data of an adult is large in amount. As the amount of characteristic, a 25-dimensional (J=25) mel-cepstrum coefficient is used.

Next, the usage information receiving unit 504 receives speech of the user as the usage information 524 from a terminal apparatus 514 (step S501 in FIG. 24). The reference model selecting unit 505 selects the reference models 523 which are acoustically similar to the speech of the user, i.e., the usage information 524, from among the reference models 521 stored in the reference model storing unit 503 (step S502 in FIG. 24). To be more specific, as shown by the "SELECTED REFERENCE MODELS 523" in FIG. 25, the reference models of 10 speakers (Ng=10) acoustically similar to the user are selected in the present example.

Then, following a request from the user, the specification information receiving unit 507 receives the specification information 525 from the terminal apparatus 514 (step S503 in FIG. 24). In the present example, the specification information indicating a quick recognition processing is received. On the basis of the specification information 525 received by the specification information receiving unit 507, the standard model creating unit 506 creates a standard model so as to maximize or locally maximize the probability or likelihood with respect to the reference models 523 selected by the reference model selecting unit 505 (step S504 in FIG. 24). More specifically, as shown in FIG. 25, the standard model 522 is composed of a three-state HMM with two mixtures (Mf=2), in accordance with the information, i.e., the specification information 525, indicating the quick recognition processing. The HMM is structured for each phoneme.

The method of creating the standard model 522 is the same as the one employed in the first embodiment.

The writing unit 513 writes the standard model 522 created by the standard model creating unit 506 to a storage device, such as a CD-ROM (step S505 in FIG. 24).

Next, an explanation is given as to a specific example in which the present embodiment is applied to a game which is played using speech recognition that employs a communication network. Here, note that the server 501 is provided with a speech recognizing unit which performs speech recognition using the created standard model. Also note that a PDA is used as the terminal apparatus 514. These are connected via the communication network.

Every time the speech data is received from a CD or a DVD, the reference models are sequentially prepared by the reading unit 511, the speech data accumulating unit 512, and the reference model preparing unit 502 of the server 501.

In the present example, the user activates a game program, "action game", which employs speech recognition, from the PDA (i.e., the terminal apparatus 514). In response to this, "Utter 'action'" is displayed, so the user utters "action". This speech is transmitted as the usage information from the PDA (the terminal apparatus 514) to the server 501. Then, the usage information receiving unit 504 and the reference model selecting unit 505 of the server 501 select the reference models corresponding to the user from among a plurality of reference models stored in the reference model storing unit 503.

Wishing to have a quick reaction, the user sets "quick recognition" on a setting screen of the PDA (the terminal apparatus 514). The setting details are transmitted as the specification information from the PDA (the terminal apparatus 514) to the server 501. On the basis of such specification information and the selected reference models, the standard model creating unit 506 of the server 501 creates a two-mixture standard model.

To play the action game, the user utters commands, such as "Move to the right" and "Move to the left", using a microphone of the PDA. The inputted speech is transmitted to the server 501, and speech recognition is performed using the already-created standard model. The recognition result is transmitted from the server 501 to the PDA (the terminal apparatus 514) where the characters of the action game move according to the transmitted recognition result. In this way, the voice-activated action game is realized by using the standard model created by the standard model creating apparatus of the present embodiment for speech recognition.

Similarly, the present embodiment can be applied to another application, such as a translating system using a communication network. For example, the user activates an application program called "speech translation" from the PDA (the terminal apparatus 514). In response to this, "Utter 'translation'" is displayed and the user utters "translation". This speech is transmitted as the usage information from the PDA (the terminal apparatus 514) to the server 501. Wishing to have precise recognition, the user instructs that "precise recognition should be performed" for the application. This instruction is transmitted as the specification information from the PDA (the terminal apparatus 514) to the server 501. In accordance with the transmitted usage information and specification information, the server 501 creates a 100-mixture standard model, for example.

The user utters "Ohayo Gozaimasu" into the microphone of the PDA (the terminal apparatus 514). The inputted speech is transmitted from the PDA (the terminal apparatus 514) to the server 501. After the server 501 recognizes "Ohayo Gozaimasu", this recognition result is transmitted back to the PDA (the terminal apparatus 514). The PDA (the terminal apparatus 514) translates the recognition result received from the server 501 into English, then displays "GOOD MORNING" as a result. In this way, by using the standard model created by the standard model creating apparatus of the present embodiment for speech recognition, a translating apparatus by voice is realized.

As described so far, according to the fifth embodiment of the present invention, a standard model is created by calculating statistics of the standard model so as to maximize or locally maximize the probability or likelihood with respect to a plurality of reference models selected on the basis of the usage information. On account of this, a high-precision standard model more appropriate to a usage situation is provided.

Also, since the standard model is created on the basis of the specification information, the standard model suitable for an apparatus that uses this standard model is prepared.

Moreover, the reference model preparing unit 502 can prepare a high-precision reference model having an appropriate number of mixture distributions corresponding to the amount of data, and a standard model can be created using the high-precision reference models. On this account, it becomes possible to use a high-precision standard model.

It should be noted that the structure of the standard model 522 is not limited to the one composed of an HMM for each phoneme, and may be composed of a context-dependent HMM.

Also, the HMM making up the standard model 522 may be structured by a Gaussian mixture distribution having a different number of distributions for each state.

Moreover, the speech recognition may be performed by the server 501 using the standard model 522.

Furthermore, the reference model preparing unit 502 may create and add a new reference model into the reference model storing unit 503 or update the reference model as necessary, and may also delete an unnecessary reference model from the reference model storing unit 503.

Also, after the standard model creation, the learning may be further performed using data.

Moreover, the standard model structure determining unit may determine the structure, the number of states, and the like of the standard model.

Sixth Embodiment

Figure 26:
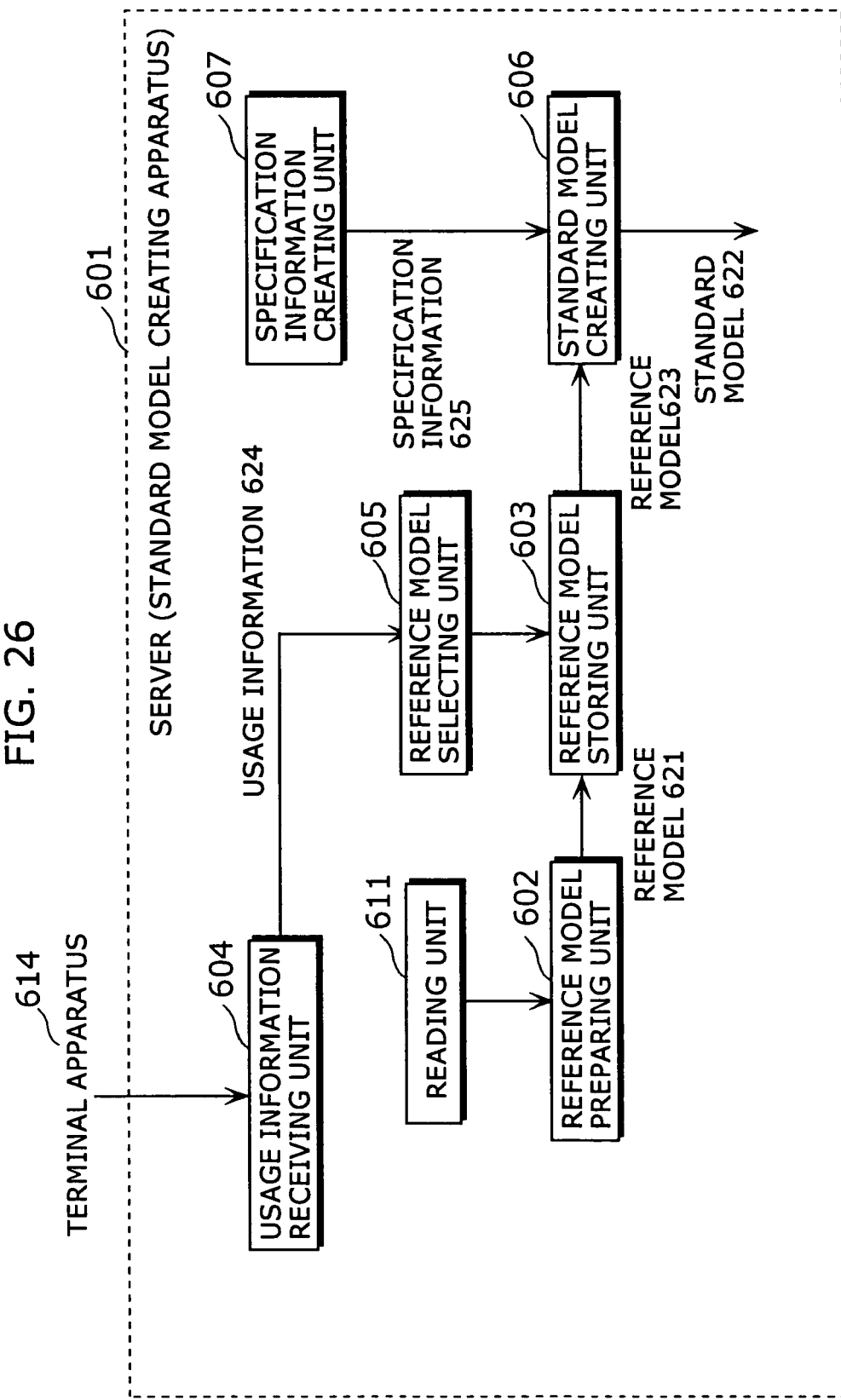
FIG. 26 is a block diagram showing the overall structure of a server related to a standard model creating apparatus of a sixth embodiment of the present invention.

FIG. 26 is a block diagram showing the overall structure of a standard model creating apparatus of the sixth embodiment of the present invention. This diagram shows an example in which the standard model creating apparatus of the present invention is embedded in a server 601 of a computer system. In the present embodiment, an explanation is given as to a case, as an example, where a standard model (preference model) for intention interpretation is created.

The server 601 is a computer apparatus or the like used in a communication system. As a standard model creating apparatus for creating a standard model for intention interpretation that is defined by an output probability of an event, the server 601 is composed of a reading unit 611, a reference model preparing unit 602, a reference model storing unit 603, a usage information receiving unit 604, a reference model selecting unit 605, a standard model creating unit 606, and a specification information creating unit 607.

The reading unit 611 reads preference models of speakers A to Z that are separated by age and written on a storage device such as a CD-ROM. The reference model preparing 602 transmits the read reference models 621 to the reference model storing unit 603. The reference model storing unit 603 then stores the reference models 621.

The specification information creating unit 607 creates specification information 625 in accordance with a CPU power of a popularized computer. The usage information receiving unit 604 receives usage information 624 from a terminal apparatus 614. On the basis of the usage information 624 received by the usage information receiving unit 604, the reference model selecting unit 605 selects reference models 623 corresponding to the usage information 624, from among the reference models 621 stored in the reference model storing unit 603.

The standard model creating unit 606 is a processing unit for creating a standard model 622, on the basis of the specification information 625 created by the specification information creating unit 607, so as to maximize or locally maximize the probability or likelihood with respect to the reference models 623 selected by the reference model selecting unit 605. The standard model creating unit 606 has the same function as the standard model creating unit 206 in the second embodiment and also has the function of the second approximating unit 306e in the third embodiment. In other words, the standard model creating unit 606 performs calculation which is a combination of two kinds of approximate calculations described in the second and third embodiments.

Next, an operation performed by the server 601 structured as described so far is explained.

Figure 27:
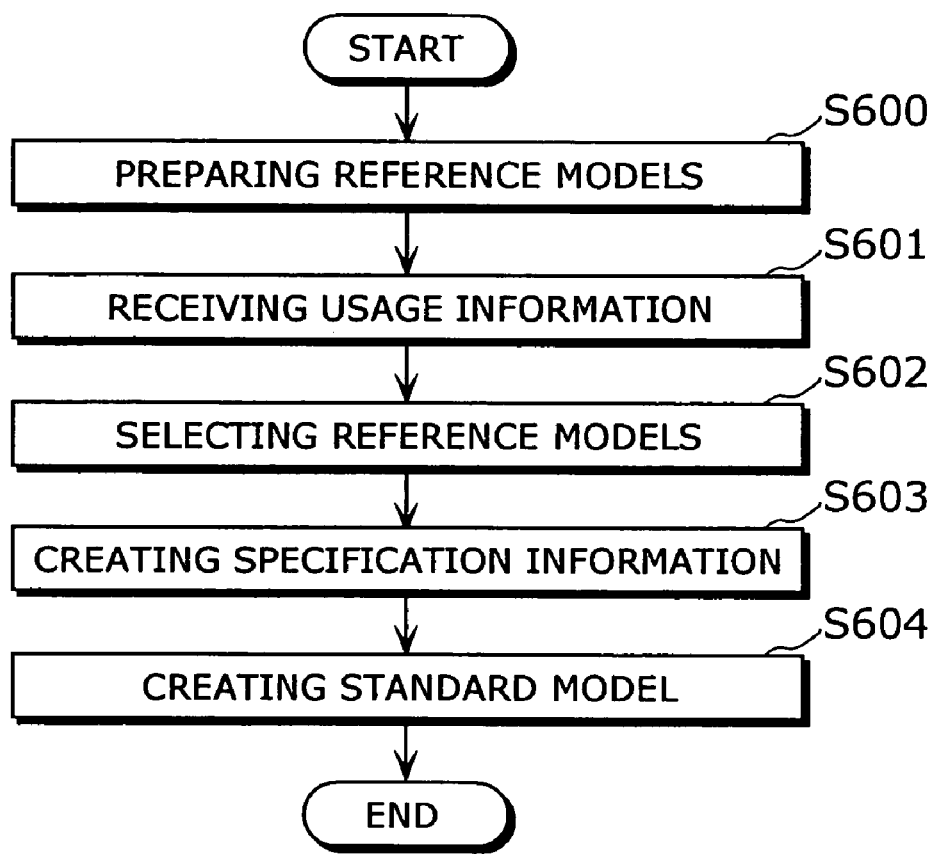
FIG. 27 is a flowchart showing an operational procedure executed by the server.
Figure 28:
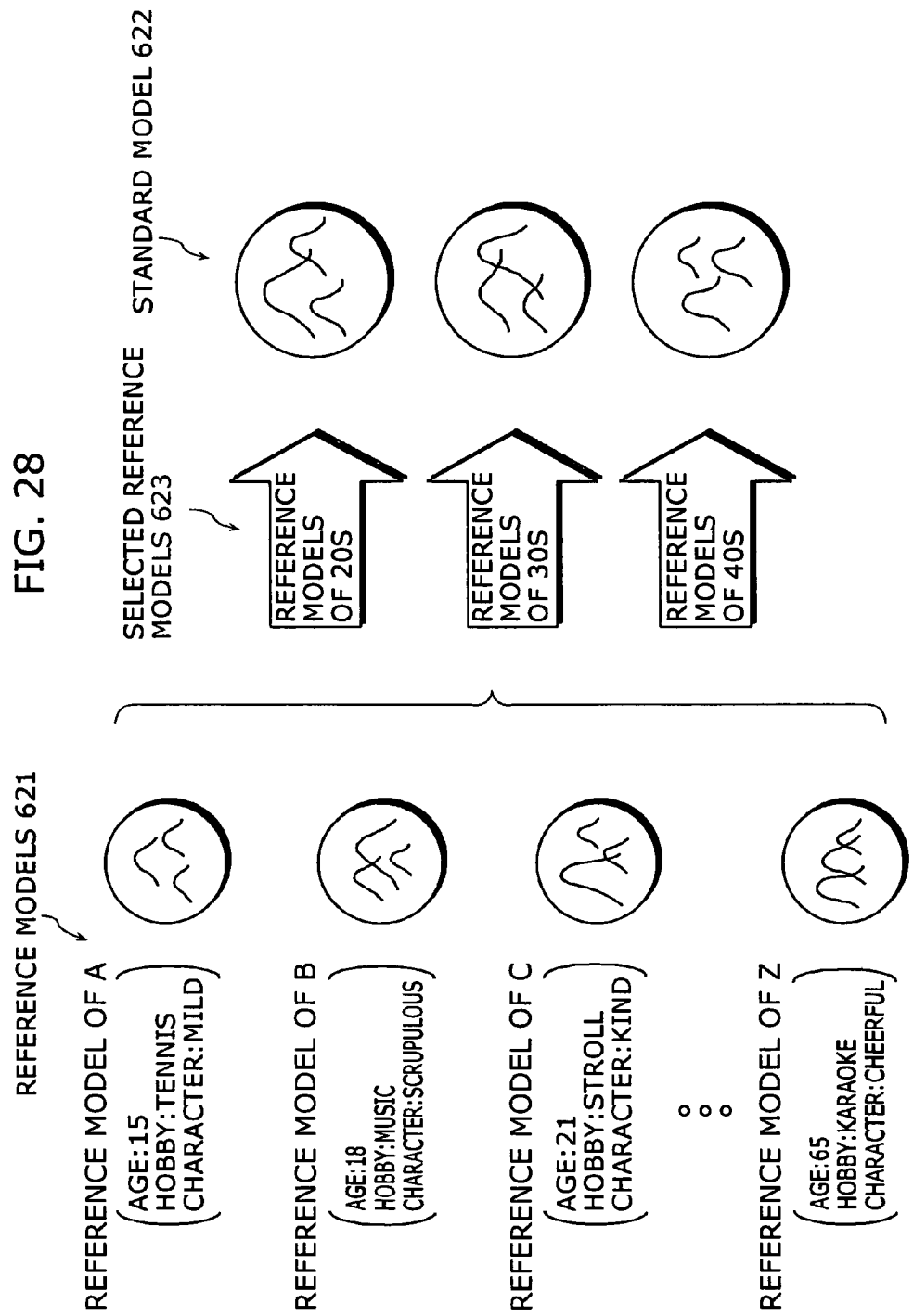
FIG. 28 shows examples of the reference models and standard models in order to explain the operational procedure executed by the server.

FIG. 27 is a flowchart showing an operational procedure executed by the server 601. FIG. 28 shows examples of the reference models and standard models in order to explain the operational procedure executed by the server 601.

First, in advance of the standard model creation, reference models serving as criteria are prepared (step S600 in FIG. 27). To be more specific: the reading unit 611 reads the preference models of the speakers A to Z that are separated by age and written on the storage device such as a CD-ROM; the reference model preparing unit 602 transmits the read reference models 621 to the reference model storing unit 603; and the reference model storing unit 603 stores the reference models 621.

The reference model 621 is composed of a GMM. In the present example, it is composed of a GMM having three mixture distributions as shown by the reference models 621. As learning data, the amount of characteristic in five dimensions (J=5) obtained by quantifying hobbies, personalities, etc. is used. The reference models are prepared before the standard model creation is requested.

Next, the usage information receiving unit 604 receives the usage information 624 relating to the age bracket for which the preference models are to be created (step S601 in FIG. 27). In the present example, the usage information 624 indicates that the preference models in the age brackets for 20s, 30s, and 40s are to be used. As shown by the "SELECTED REFERENCE MODELS 623" in FIG. 28, the reference model selecting unit 605 selects the preference models of the speakers at ages indicated by the usage information 624 received by the usage information receiving unit 604, from among the reference models 621 stored in the reference model storing unit 603 (step S602 in FIG. 27).

Then, the specification information creating unit 607 creates the specification information 625 on the basis of the CPU power and storage capacity of the popularized computer (step S603 in FIG. 27). In the present example, the specification information 625 indicating recognition processing at a normal speed is created.

On the basis of the specification information 625 created by the specification information creating unit 607, the standard model creating unit 606 creates the standard model 622 so as to maximize or locally maximize the probability or likelihood with respect to the reference models of the speakers selected by the reference model selecting unit 605 (step S604 in FIG. 27). In the present example, as shown in FIG. 28, the standard model 622 is composed of a GMM having three mixture distributions (Mf=3) on the basis of the specification information that indicates the recognition processing at a normal speed.

The method of creating the standard model 622 is basically the same as the one employed in the second embodiment. However, the approximate calculation for estimating the statistics of the standard model 622 is specifically performed as follows. The standard model creating unit 606: performs the same approximate calculation as performed by the general approximating unit 206e in the second embodiment via a built-in storage unit or the like; determines the result as initial values; and performs the same approximate calculation as performed by the second approximating unit 306e in the third embodiment.

The following is an explanation of a specific example in which the present embodiment is applied to an information searching apparatus. For a reference model used in this example, an input is a search keyword while an output is a probability of using a search rule A, a search rule B, or the like. Depending on the search rule to be used, the search result to be displayed will be different. Note that a reference model prepared by the reference model storing unit 603 of the server 601 is a model of a speaker who has typical characteristics.

First, the user inputs the usage information using a remote control (the terminal apparatus 614) included with the server 601. The usage information shows age, personality, gender, hobby, and so on. It may show information to discriminate predetermined groups of "children", "actors", "high-school students" and the like.

Next, the user selects a use apparatus from among "car navigation", "cellular phone", "personal computer", "television", etc. displayed on a selection screen. The specification information creating unit 607 of the server 601 creates the specification information on the basis of a CPU power and a storage capacity of the use apparatus. In the present example, suppose that the "television" is selected and the specification information 625 is created to indicate that the CPU power and the storage capacity are small. On the basis of the specification information 625, the standard model creating unit 606 creates a three-mixture standard model that operates even by the small CPU power. The created standard model is written to a memory card, which is then inserted into the television by the user.

The user inputs a search keyword to search for a recommended program, using an EPG displayed on the television. In response to this, the television determines the search rule corresponding to the search keyword using the standard model recorded in the memory card, searches for the program following the search rule, and displays the programs that fit the user's preference. In this way, a convenient searching apparatus is realized using the standard model created by the standard model creating apparatus of the present embodiment.

As described so far, according to the sixth embodiment, a standard model is created by calculating the statistics of the standard model so as to maximize or locally maximize the probability or likelihood with respect to a plurality of reference models selected on the basis of the usage information. Thus, a high-precision standard model more appropriate to a usage situation is provided.

Also, since the standard model is created on the basis of the specification information, the standard model suitable for an apparatus that uses this standard model is prepared.

Moreover, a GMM making up the standard model 622 may be composed of a Gaussian mixture distribution having a different number of distributions for each speaker.

Furthermore, the reference model preparing unit 602 may read a new reference model from a storage device such as a CD-ROM and add the new reference model into the reference model storing unit 603 or update the reference model as necessary. The reference model preparing unit 602 may also delete an unnecessary reference model from the reference model storing unit 603.

Also, a GMM making up the reference model or the standard model may express part of the Bayesian net.

Moreover, after the standard model creation, the learning may be further performed using data.

Furthermore, the standard model structure determining unit may determine the HMM structure, such as a monophone-based, triphone-based, or state-tying structure, and may also determine the number of states and the like.

Seventh Embodiment

Figure 29:
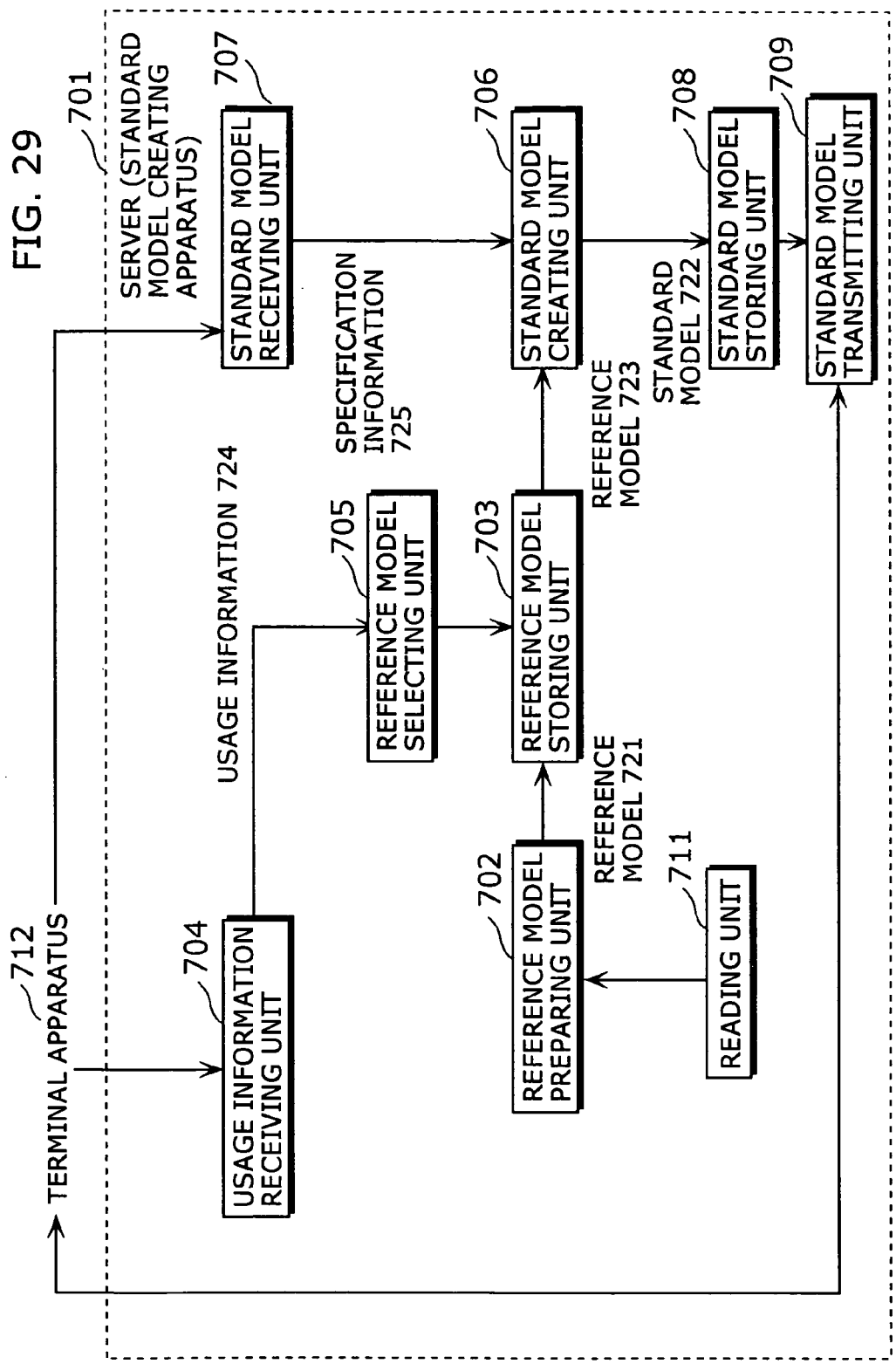
FIG. 29 is a block diagram showing the overall structure of a server related to a standard model creating apparatus of a seventh embodiment of the present invention.

FIG. 29 is a block diagram showing the overall structure of a standard model creating apparatus of the seventh embodiment of the present invention. This diagram shows an example in which the standard model creating apparatus of the present invention is embedded in a server 701 of a computer system. In the present embodiment, an explanation is given as to a case, as an example, where a standard model (adaptive model) for speech recognition is created.

The server 701 is a computer apparatus or the like used in a communication system. As a standard model creating apparatus for creating a standard model for speech recognition that is defined by an output probability of transitions between a group of events and an event or among events, the server 701 is composed of a reading unit 711, a reference model preparing unit 702, a reference model storing unit 703, a usage information receiving unit 704, a reference model selecting unit 705, a standard model creating unit 706, a specification information receiving unit 707, a standard model storing unit 708, and a standard model transmitting unit 709.

The reading unit 711 reads reference models for speech recognition which are separated by a combination of speaker, noise, and tone of voice, from a storage device such as a CD-ROM. The reference model preparing unit 702 transmits these read reference models to the reference model storing unit 703. The reference model storing unit 703 stores the transmitted reference models 721.

The specification information receiving unit 707 receives specification information 725 from a terminal apparatus 712. The usage information receiving unit 704 receives speech of the user uttered in noise as usage information 724 from the terminal apparatus 712. The reference model selecting unit 705 selects reference models 723 which are separated by a combination of speaker, noise, and tone of voice and are acoustically similar to the speech of the user, i.e., the usage information 724, from among the reference models 721 stored in the reference model storing unit 703.

The standard model creating unit 706 is a processing unit for creating a standard model 722, on the basis of the specification information 725 received by the specification information receiving unit 707, so as to maximize or locally maximize the probability or likelihood with respect to the reference models 723 selected by the reference model selecting unit 705. The standard model creating unit 706 has the same function as the standard model creating unit 206 in the second embodiment. The standard model storing unit 708 stores one or more standard models based on the specification information 725. The standard model transmitting unit 709 receives a signal from the terminal apparatus 712 of the user requesting for the specification information and the standard model, and transmits the standard model corresponding to the specification information to the terminal apparatus 712.

Next, an explanation is given as to an operation of the server 701 structured as described so far.

Figure 30:
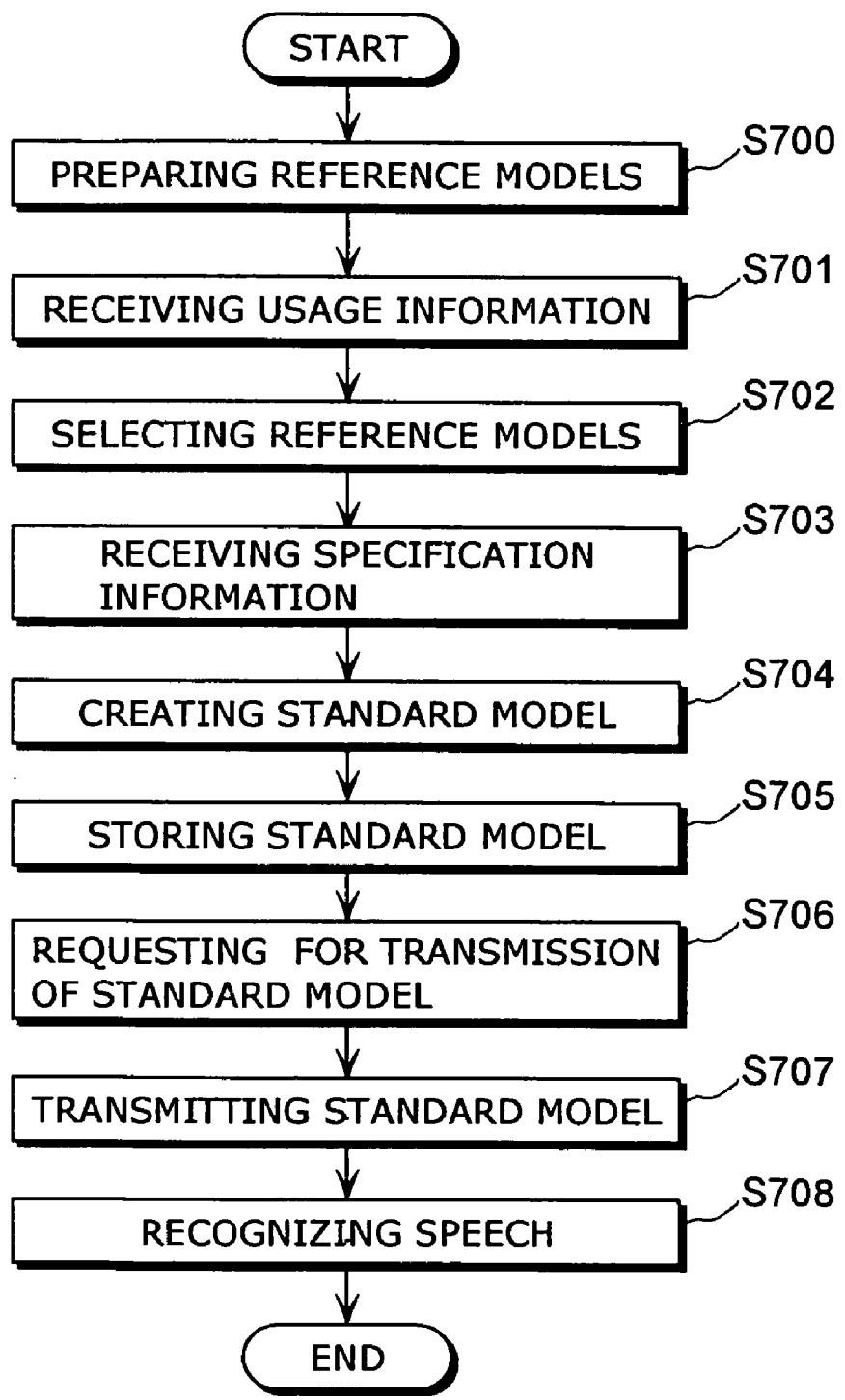
FIG. 30 is a flowchart showing an operational procedure executed by the server.

FIG. 30 is a flowchart showing an operational procedure executed by the server 701. FIG. 31 shows examples of the reference models and standard model in order to explain the operational procedure executed by the server.

First, in advance of the standard model creation, reference models serving as criteria are prepared (step S700 in FIG. 30). To be more specific: the reading unit 711 reads reference models for speech recognition which are separated by a combination of speaker, noise, and tone of voice, from the storage device such as a CD-ROM; the reference model preparing unit 702 transmits these read reference models to the reference model storing unit 703; and the reference model storing unit 703 stores the transmitted reference models 721. Here, the reference model 721 is composed of an HMM for each phoneme, for each combination of speaker, noise, and tone of voice. As shown by the reference models 721 in FIG. 31, each reference model has three states, in each of which an output distribution of the HMM is structured by 128 Gaussian mixture distributions. As the amount of characteristic, a 25-dimensional (J=25) mel-cepstrum coefficient is used.

Next, the usage information receiving unit 704 transmits the speech of the user A uttered in noise as the usage information 724 to the terminal apparatus 712 (step S701 in FIG. 30). The reference model selecting unit 705 selects the reference models 723 which are acoustically similar to the speech of the user A, i.e., the usage information 724, from among the reference models 721 stored in the reference model storing unit 703 (step S702 in FIG. 30). More specifically, as shown by the "SELECTED REFERENCE MODELS 723" in FIG. 31, the reference models of 100 speakers (Ng=100) acoustically similar to the user A are selected.

Then, the specification information receiving unit 707 receives the specification information 725 from the terminal apparatus 712 in response to the request from the user A (step S703 in FIG. 30). In the present embodiment, the specification information 725 indicating the recognition with a high degree of precision is received. The standard model creating unit 706 creates the standard model 722, on the basis of the specification information 725, so as to maximize or locally maximize the probability or likelihood with respect to the reference models 723 selected by the reference model selecting unit 705 (step S704 in FIG. 30). To be more specific, as shown in FIG. 31, the standard model 722 is composed of an HMM having three states, in each of which the number of mixtures is 64 (Mf=64), on the basis of the specification information 725 indicating the recognition with a high degree of precision. The HMM is composed for each phoneme.

The method of creating the standard model is the same as the one employed in the second embodiment.

The standard model storing unit 708 stores one or more standard models 722 based on the specification information 725. In the present example, a 16-mixture HMM standard model created for the user B has been already stored and a 64-mixture HMM for the user A is to be newly stored.

The user A transmits specification information indicating the user A and noise type, and also transmits a signal requesting for a standard model, from the terminal apparatus 712 to the standard model transmitting unit 709 of the server 701 (step S706 in FIG. 30). On receiving the specification information and the signal requesting for the standard model transmitted from the user A, the standard model transmitting unit 709 transmits the standard model corresponding to the specification information to the terminal apparatus 712 (step S707 in FIG. 30). Here, the standard model 722 created earlier is transmitted to the terminal apparatus 712.

The user A performs the speech recognition using the standard model 722 received by the terminal apparatus 712 (step S708 in FIG. 30).

The following is an explanation of a specific example in which the present embodiment is applied to a speech recognition system that is composed of a car navigation apparatus (i.e., the terminal apparatus 712) and a server apparatus (i.e., the server 701, namely, the standard model creating apparatus) connected to each other via a communication network.

First, the user selects a button used for "obtaining one's own speech model" on a screen of the car navigation apparatus (the terminal apparatus 712). In response to this, a message saying "Input your name" is displayed, and the user inputs his/her name through a button operation. Next, a message saying "Utter 'audio'" is displayed, and the user utters "audio" into a microphone attached to the car navigation apparatus. These sets of information (the name of the user and the speech in noise) are transmitted as the usage information from the car navigation apparatus (the terminal apparatus 712) to the server 701.

Similarly, the user selects a button indicating "speech recognition with a high degree of precision" on the screen of the car navigation apparatus (the terminal apparatus 712). In response to this, this selection information is transmitted as the specification information from the car navigation apparatus (the terminal apparatus 712) to the server 701.

On the basis of these sets of usage information and specification information, the server 701 creates a standard model for speech recognition appropriate to the user, and stores the created standard model in association with the user's name into the standard model storing unit 708.

Next time the car navigation apparatus (the terminal apparatus 712) is activated, the message saying "Input your name" is displayed and the user inputs his/her name. Then, the name is transmitted to the server 701, and the corresponding standard model stored in the standard model storing unit 722 is transmitted from the server 701 to the terminal apparatus 712 by the standard model transmitting unit 709. The terminal apparatus 712 that has downloaded the standard model corresponding to the name (of the user) from the server 701 performs the speech recognition for the user using this standard model and performs a destination setting by voice, etc. In this way, it becomes possible to control the car navigation apparatus by voice using the standard model created by the standard model creating apparatus of the present embodiment to perform the speech recognition.

As described so far, according to the seventh embodiment of the present invention, a standard model is created by calculating the statistics of the standard model so as to maximize or locally maximize the probability or likelihood with respect to a plurality of reference models selected on the basis of the usage information. On the account of this, a high-precision standard model appropriate to a usage situation is provided.

Since a standard model is created on the basis of the specification information, the standard model suitable for an apparatus that uses this standard model is prepared.

Also, since the standard model storing unit 708 can store a plurality of standard models, a standard model can be quickly provided as necessary.

Moreover, since the standard model transmitting unit 709 transmits the standard model to the terminal apparatus 712, the terminal apparatus 712 can easily use the standard model created by the server 701 even if the terminal apparatus 712 and the server 701 are located in separate places.

It should be noted that the structure of the standard model 722 is not limited to the one composed of an HMM for each phoneme, and may be composed of a context-dependent HMM.

Also, the HMM making up the standard model 722 may be structured by a Gaussian mixture distribution which has a different number of mixtures for each state.

Moreover, the server 701 may perform the speech recognition using the standard model 722, and send the recognition result to the terminal apparatus 712.

Furthermore, the reference model preparing unit 702 may create and add a new reference model to the reference model storing unit 703 or update the reference model as necessary, and may also delete an unnecessary reference model from the reference model storing unit 703.

Also, the reference model preparing unit 702 may add a new reference model into the reference model storing unit 703 via a communication channel or update the reference model as necessary.

Moreover, after the standard model creation, the learning may be further performed using data.

Furthermore, the standard model structure determining unit may determine the HMM structure, such as a monophone-based, triphone-based, or state-tying structure, and may also determine the number of states and the like.

Eighth Embodiment

Figure 32:
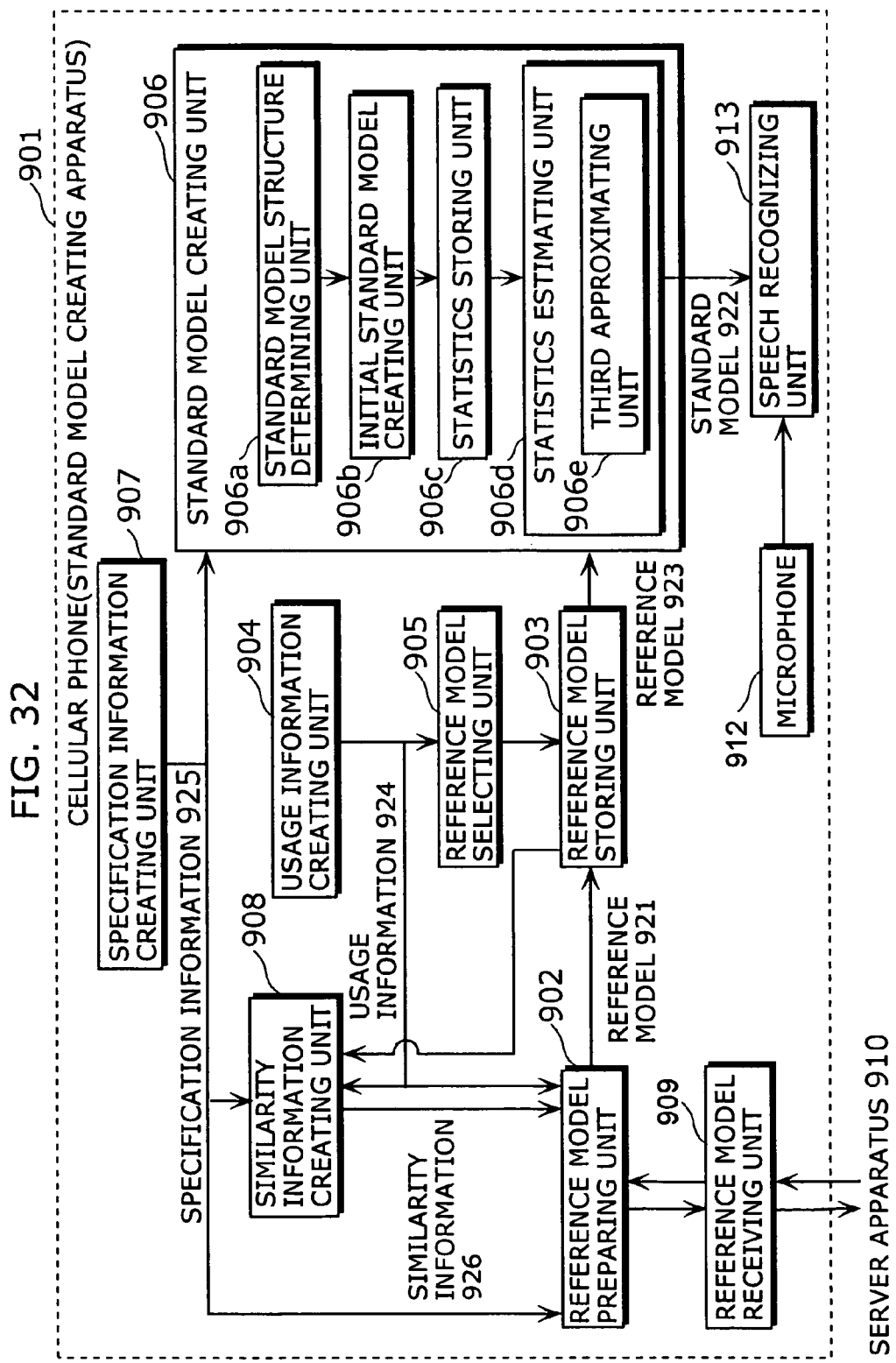
FIG. 32 is a block diagram showing the overall structure of a standard model creating apparatus of an eighth embodiment of the present invention.

FIG. 32 is a block diagram showing the overall structure of a standard model creating apparatus of the eighth embodiment of the present invention. This diagram shows an example in which the standard model creating apparatus of the present invention is embedded in a cellular phone 901. In the present embodiment, an explanation is given as to a case, as an example, where a standard model for speech recognition is created.

The cellular phone 901 is a portable information terminal. As a standard model creating apparatus for creating a standard model for speech recognition that is defined by a hidden Markov model expressed by an output probability of transitions between a group of events and an event or among events, the cellular phone 901 is composed of a reference model receiving unit 909, a reference model preparing unit 902, a reference model storing unit 903, a usage information creating unit 904, a reference model selecting unit 905, a similarity information creating unit 908, a standard model creating unit 906, a specification information creating unit 907, a microphone 912, and a speech recognizing unit 913.

The usage information creating unit 904 creates usage information 924 using a screen and keys of the cellular phone 901.

The specification information creating unit 907 creates specification information 925 in accordance with the specifications of the cellular phone 901. Here, the specification information refers to information regarding specifications of a standard model to be created and, in the present example, it refers to information regarding the processing capacity of a CPU provided for the cellular phone 901.

The similarity information creating unit 908 creates similarity information 926 on the basis of the usage information 924, the specification information 925, and the reference models 921 stored in the reference model storing unit 903, and transmits the similarity information 926 to the reference model preparing unit 902.

The reference model preparing unit 902 determines whether or not to prepare the reference models, on the basis of the similarity information 926. If determining to prepare the reference models, the reference model preparing unit 902 transmits the usage information 924 and the specification information 925 to the reference model receiving unit 909.

The reference model receiving unit 909 receives the reference models corresponding to the usage information 924 and the specification information 925 from the server apparatus 910, and transmits them to the reference model preparing unit 902.

The reference model preparing unit 902 stores the reference models transmitted from the reference model receiving unit 909 into the reference model storing unit 903.

The reference model selecting unit 905 selects the reference models 923 corresponding to the usage information 924, from among the reference models 921 stored in the reference model storing unit 903.

The standard model creating unit 906 is a processing unit for creating a standard model 922, on the basis of the specification information 925 created by the specification information creating unit, so as to maximize or locally maximize the probability or likelihood with respect to the reference models 923 selected by the reference model selecting unit 905. The standard model creating unit 906 is composed of: a standard model structure determining unit 906a for determining the structure (the number of mixture distributions of a Gaussian distribution) of a standard model; an initial standard model creating unit 906b for creating an initial standard model by determining initial values of statistics used for calculating the standard model; a statistics storing unit 906c for storing the determined initial standard model; and a statistics estimating unit 906d for calculating the statistics so as to maximize or locally maximize the probability or likelihood with respect to the reference models 923 selected by the reference model selecting unit 905, using the approximate calculation or the like performed by a third approximating unit 906e on the initial standard model stored in the statistics storing unit 906c (that is to say, the statistics estimating unit 906d generates a final standard model).

The speech recognizing unit 913 recognizes the user's speech inputted from the microphone 901 using the standard model 922 created by the standard model creating unit 906.

The following is an explanation of an operation performed by the cellular phone 901 structured as described so far.

Figure 33:
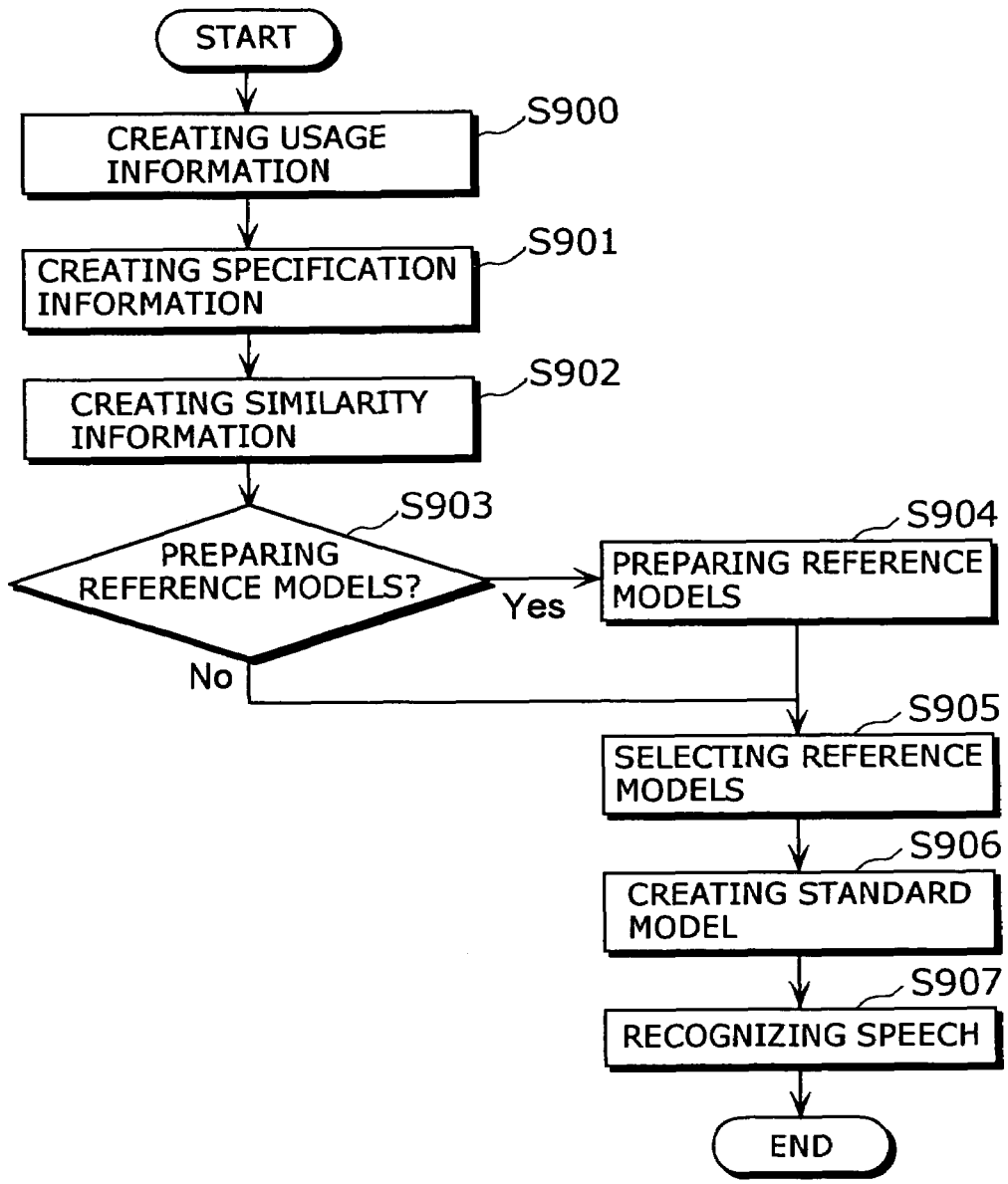
FIG. 33 is a flowchart showing an operational procedure executed by a cellular phone 901.

FIG. 33 is a flowchart showing an operational procedure executed by the cellular phone 901.

Figure 34:
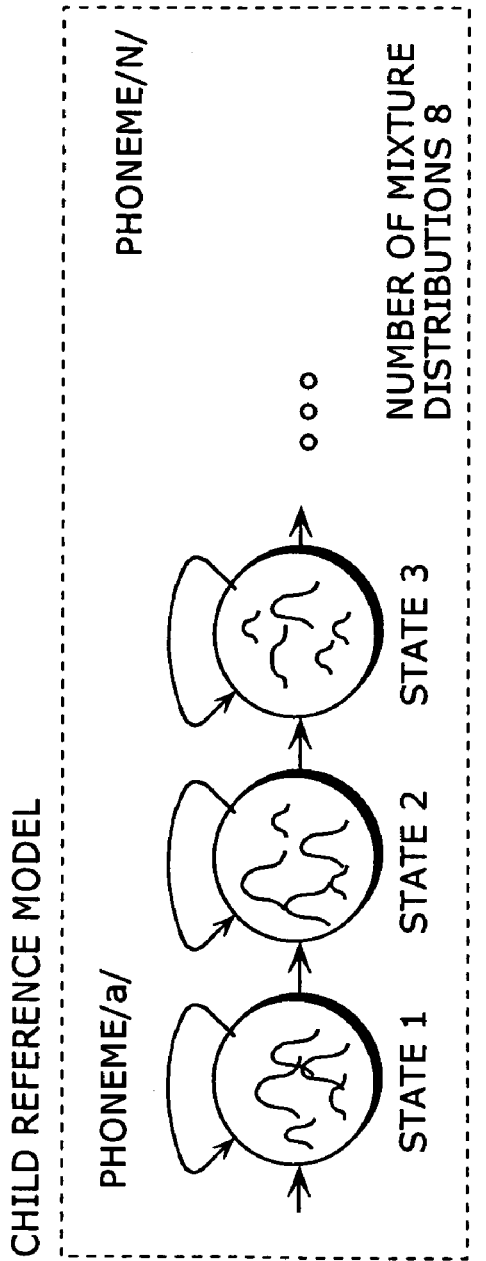
FIG. 34 shows examples of the reference models stored in a reference model storing unit.

Suppose that child models are stored as the reference models 921 in the reference model storing unit 903. The reference model 921 is composed of an HMM for each phoneme. FIG. 34 shows examples of the reference models. Here, a conceptual drawing of the child reference models is shown. Each of these reference models has three states, in each of which an output distribution of the HMM is structured by a Gaussian mixture distribution having 16 mixture distributions. As the amount of characteristic, a total of 25-dimensional (J=25) characteristic summing up a 12-dimensional (J=12) mel-cepsturm coefficient, a 12-dimensional delta mel-cepstrum, and a delta power is used.

Figure 36B:
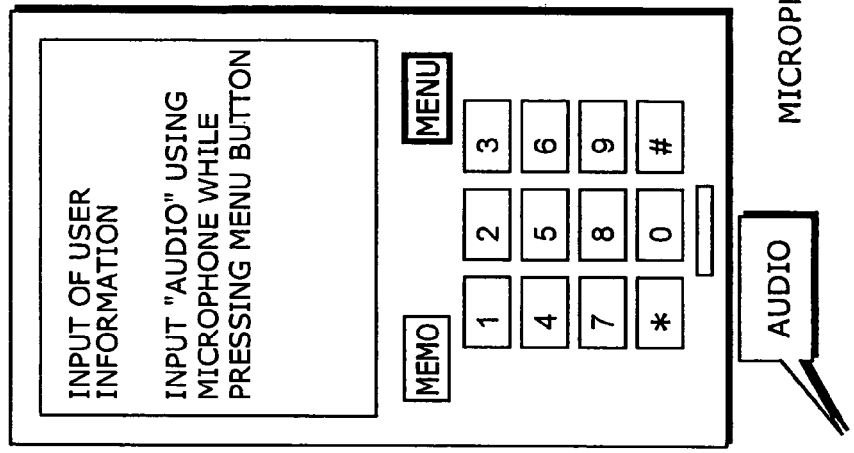
FIG. 36 shows examples of a screen displayed when usage information is to be created.
Figure 36A:
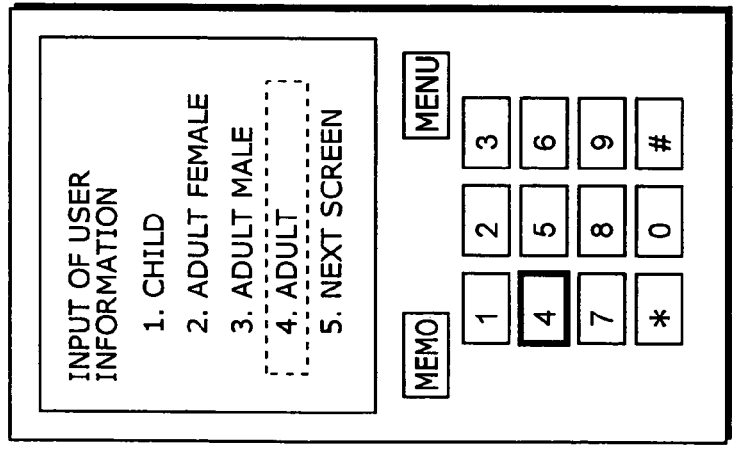

First, the usage information creating unit 904 creates a category to which the user belongs, as the usage information 924 (step S900). FIG. 36 shows examples showing how to create the usage information 924. FIG. 36A shows an example of a selection screen of the cellular phone 901. In this diagram, a button "4: ADULT" has been pressed, and this selection means that the cellular phone 901 is to be used by an adult female and an adult male. Another example is shown in FIG. 36B. In this diagram, speech is inputted while the "MENU" button is being pressed. The speech of the user is converted into the amount of characteristic so that "speech data of the user" is created as the usage information 924.

Meanwhile, the specification information creating unit 907 creates the specification information 925 on the basis of the specifications of the cellular phone 901 (step S901). In the present example, the specification information 925 indicating "16 mixture distributions" is created in accordance with the memory capacity of the cellular phone 901.

Next, the similarity information creating unit 908 creates the similarity information 926 on the basis of the usage information 924, the specification information 925, and the reference models 921 stored in the reference model storing unit 903 (step S902). Then, the similarity information 926 is transmitted to the reference model preparing unit 902. In the present example, the reference models existing in the reference model storing unit 903 are only the child reference models with three mixture distributions (see FIG. 34). Thus, the reference models corresponding to the usage information 924 indicating "adult" (corresponding to FIG. 36A) and the specification information 925 indicating "16 mixture distributions" are not stored in the reference model storing unit 903. As such, the similarity information 926 indicating that "no similar reference models exist" is created and transmitted to the reference model preparing unit 902. In the other example, the usage information 924 is the "speech data of the user" (corresponding to FIG. 36B). The speech data of the user is inputted to the child reference models stored in the reference model storing unit 903 so that the similarity information 926 is created. Here, the likelihood with respect to the child reference models is equal to or below a predetermined threshold and, therefore, the similarity information 926 indicating that "no similar reference models exist" is created and transmitted to the reference model preparing unit 902.

Figure 37B:
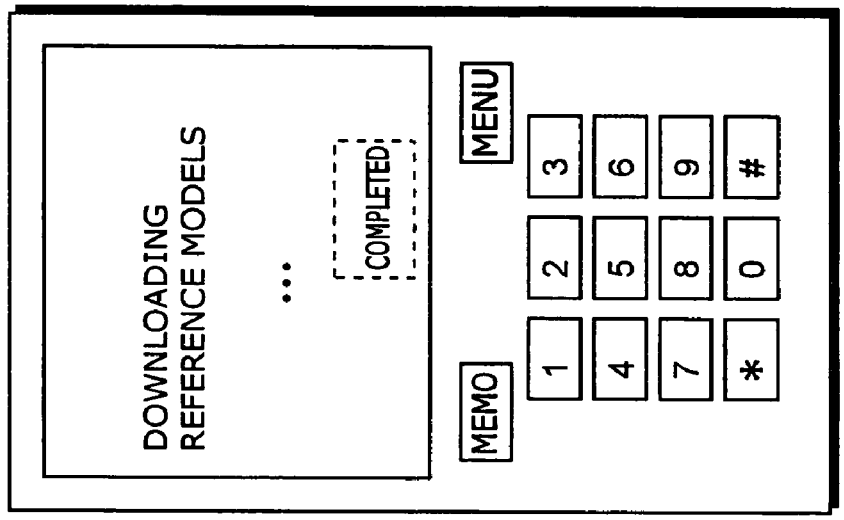
FIG. 37 shows examples of a screen displayed when reference models are to be prepared.
Figure 37A:
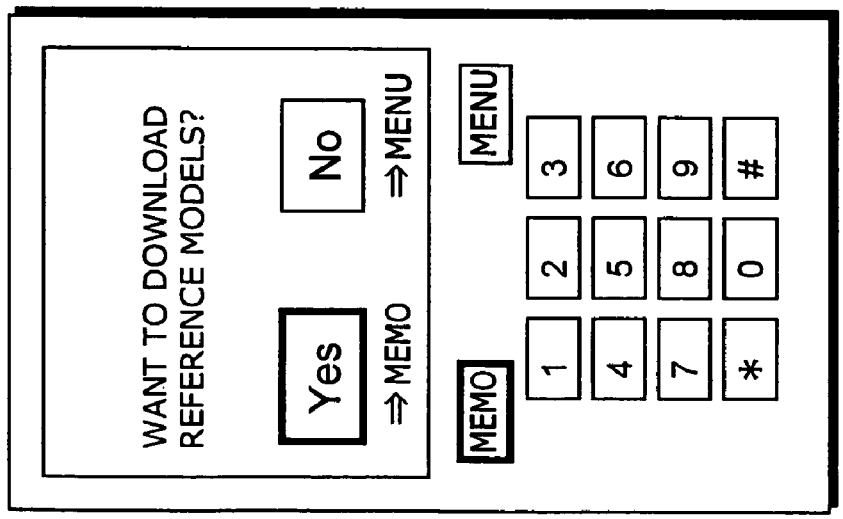

Following this, the reference model preparing unit 902 determines whether or not to prepare the reference models, on the basis of the similarity information 926 (step S903). Since "no similar reference models exist", the user is prompted to prepare the reference models as shown by an example of a screen display of the cellular phone 901 in FIG. 37A. If the user presses the "MEMO" button to request for the preparation of the reference models, the reference model preparing unit 902 determines that the reference models are to be prepared and transmits the usage information 924 and the specification information 925 to the reference model receiving unit 909. In the other example, "no similar reference models exist" and, therefore, the reference model preparing unit 902 automatically determines that the reference models are to be prepared and transmits the usage information 924 and the specification information 925 to the reference model receiving unit 909. An example of a screen displayed by the cellular phone 901 in this case is shown in FIG. 37B.

In response to this, the reference model receiving unit 909 receives the reference models corresponding to the usage information 924 and the specification information 925 from the server apparatus 910, and then transmits them to the reference model preparing unit 902. In the present example, corresponding to the usage information 924 indicating "adult" (corresponding to FIG. 36A) and the specification information 925 indicating "16 mixture distributions", the reference model receiving unit 909 receives two reference models, "an adult female model having 16 mixture distributions" and "an adult male model having 16 mixture distributions", from the server apparatus 910.

Figure 35:
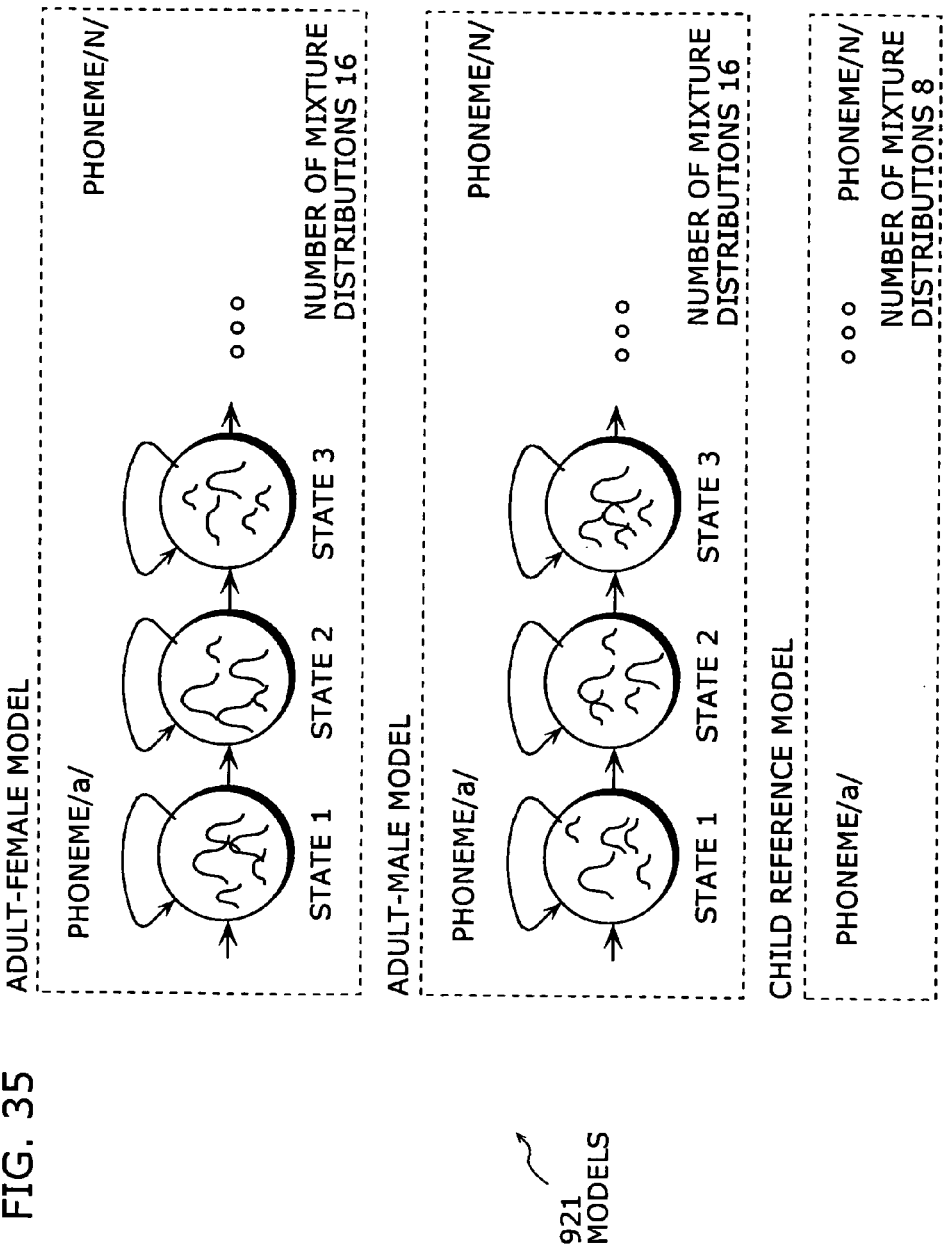
FIG. 35 shows examples of reference models newly stored in the reference model storing unit.

Then, the reference model preparing unit 902 prepares the reference models by storing the reference models transmitted from the reference model receiving unit 909 into the reference model storing unit 903 (step S904). FIG. 35 shows examples of the reference models. Here, the conceptual drawings of the reference models of an adult male, an adult female, and a child are shown.

Next, the reference model selecting unit 905 selects the two reference models, "an adult female model having 16 mixture distributions" and "an adult male model having 16 mixture distributions", which belong to the same category corresponding to the usage information 924 indicating "adult", from among the reference models 921 stored in the reference model storing unit 903 (step S905). In the other example, the reference model selecting unit 905 selects two reference models, "an adult female model having 16 mixture distributions" and "an adult male model having 16 mixture distributions", which are acoustically similar (i.e., the likelihood is high) to the "speech data of the user" indicated by the usage information 924, from among the reference models 921 stored in the reference model storing unit 903.

Following this, the standard model creating unit 906 creates a standard model, on the basis of the created specification information 925, so as to maximize or locally maximize the probability or likelihood with respect to the reference models 923 selected by the reference model selecting unit 905 (step S906).

Finally, the speech recognizing unit 913 recognizes the user's speech inputted from the microphone 912, in accordance with the standard model created by the standard model creating unit 906 (step S907).

The following is an explanation of a detailed procedure performed at S906 (i.e., the step of creating a standard model) in FIG. 33. The procedure flow is the same as described with reference to the flowchart shown in FIG. 4. Note that, however, the structure of the standard model to be adopted and specific approximate calculation are different.

First, the standard model structure determining unit 906a determines the structure of the standard model (step S102a in FIG. 4). Here, as the structure of the standard model, the standard model structure determining unit 906a determines that the standard model is made up of an HMM for each phoneme and has three states in each of which the number of mixtures in an output distribution is 16 (Mf=16), on the basis of the specification information 925 indicating "16 mixture distributions".

Next, the initial standard model creating unit 906b determines initial values of the statistics in order to calculate the standard model (step S102b in FIG. 4). In the present example, the selected reference model 923, "an adult female model having 16 mixture distributions", is stored as the initial values of the statistics into the statistics storing unit 906c. In the other example, the selected reference model 923, "an adult male model having 16 mixture distributions", is stored as the initial values of the statistics into the statistics storing unit 906c. To be more specific, the initial standard model creating unit 906b creates an output distribution represented as the above Equation 13.

Then, the statistics estimating unit 906d estimates the statistics of the standard model stored in the statistics storing unit 906c, using the two reference models 923 selected by the reference model selecting unit 905 (step S102c in FIG. 4). More specifically, the statistics estimating unit 906d estimates the statistics of the standard model (i.e., the mixture weighting coefficient represented as the above Equation 16, the mean value represented as the above Equation 17, and the variance represented as the above Equation 18) that locally maximize or maximize the probability (in the present case, the likelihood logP represented as the above Equation 25) of the standard model with respect to an output distribution for each of the two reference models 923 (Ng=2), that is, the output distribution represented as the above Equation 19. Note that, however, a solution to Equation 21 in the output distribution represented as the above Equation 19 is 16 (which is the number of mixture distributions for each reference model) in the present embodiment.

More specifically, using the above Equation 26, Equation 27, and Equation 28, the mixture weighting coefficient, the mean value, and the variance of the standard model are respectively calculated.

Here, the third approximating unit 906e of the statistics estimating unit 906d uses the approximate expression represented as Equation 53, on the assumption that the Gaussian distributions of the standard model will not affect each other. If it is the first time out of the number of repetitions R, Equation 55 representing the neighborhood of the Gaussian distributions of the standard model represented as Equation 54 is approximated to a space that includes the Gaussian distributions of the two reference models 923 represented as Equation 56, the two respectively having the shortest and secondly shortest distribution distances (neighborhood direction parameter G=2), such as the Mahalanobis distance and the Kullback-Leibler (KL) distance, obtained with respect to the output distribution represented as the above Equation 54. On the other hand, if it is the second or greater numbered time out of repetitions R, Equation 55 representing the neighborhood of the Gaussian distributions of the standard model represented as Equation 54 is approximated to a space that includes the Gaussian distributions of the reference model 923 represented as Equation 56, the model having the shortest distribution distances (neighborhood direction parameter G=1), such as the Mahalanobis distance and the Kullback-Leibler (KL) distance, obtained with respect to the output distribution represented as the above Equation 54.

In summary with consideration given to the approximate expression used by the third approximating unit 906e, a calculation formula used by the statistics estimating unit 906d is as follows. To be more specific, the statistics estimating unit 906d calculates the mixture weighting coefficient, the mean value, and the variance respectively using the above Equation 59, Equation 60 and Equation 61, and then generates the standard model specified by these parameters as the final standard model 922. Note that the second method in the third embodiment, i.e., where the weighting coefficient is set at zero, the mean value is set at zero, and the variance is set at one, is employed. Also note that the value of the neighborhood direction parameter G varies in accordance with the number of repetitions. Depending on the value of the neighborhood direction parameter G, the method may be determined among the first to third methods described in the third embodiment.

The statistics estimating unit 906d stores the statistics of the standard model estimated in this way into the statistics storing unit 906c. After this, the statistics estimating unit 906d repeats such series of estimating the statistics and storing them into the statistics storing unit 906c, R ($\geq 1$) times. Then, the statistics estimating unit 206d outputs the resultant statistics as the statistics of the standard model 922 that is to be eventually generated.

Figure 38:
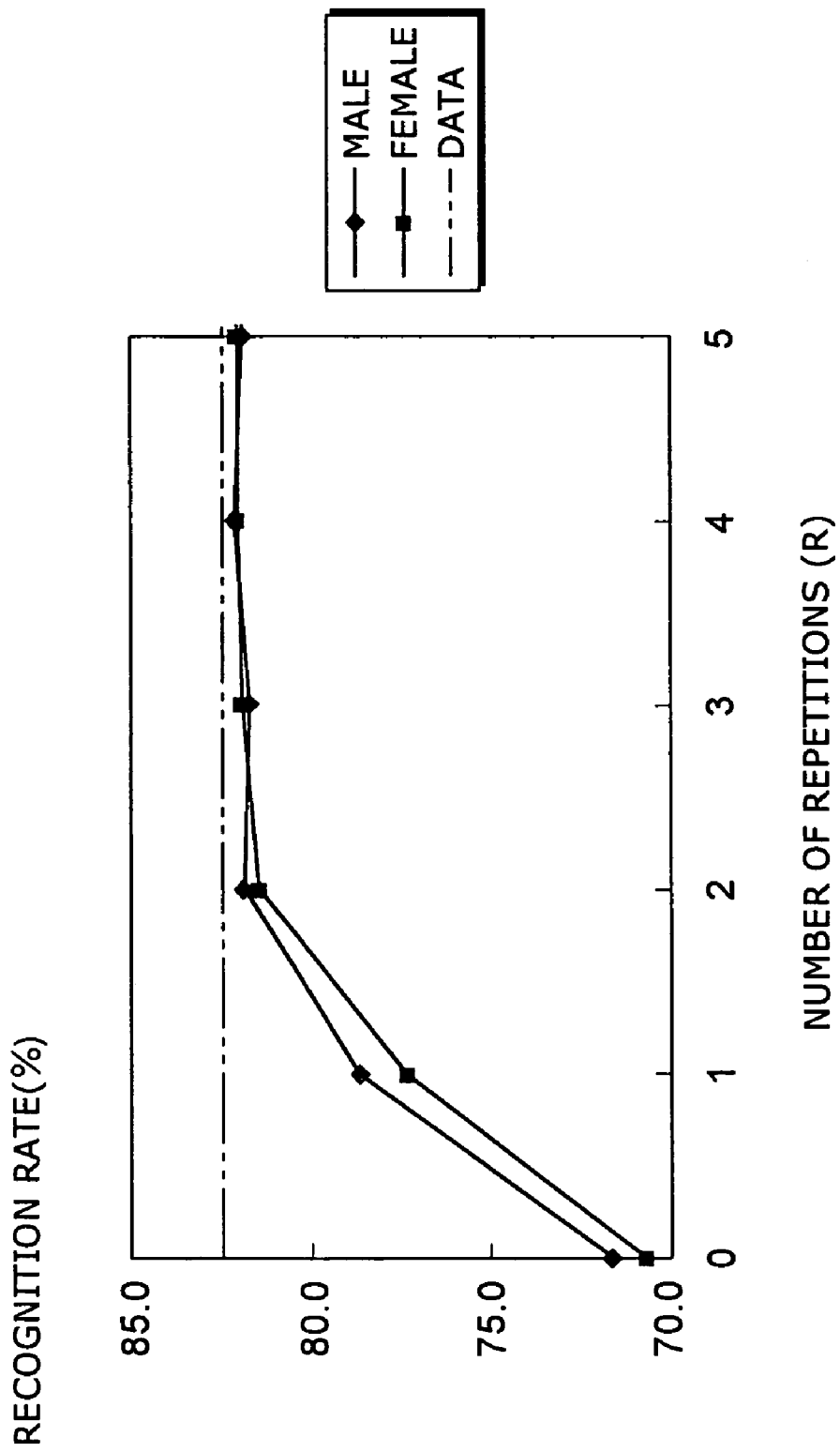
FIG. 38 is a graph showing a result of a recognition experiment performed using a standard model which is created using a third approximating unit.

FIG. 38 shows a result of a recognition experiment performed using the standard model 922 which was created using the third approximating unit 906c. The vertical axis indicates a recognition rate (%) for adults (males and females) while the horizontal axis indicates the number of repetitions R. For the case where the number of repetitions R is zero, the shown result was obtained by the recognition which was performed using an initial model created by the initial standard model creating unit 906b before learning. For the case where the number of repetitions R is one, the neighborhood direction parameter G was set to two. For the cases where the number of repetitions R is two to five, the neighborhood direction parameter G was set to one.

A graph of "DATA" shows the result obtained by the learning based on the speech data for a few days. Graphs of "FEMALE" and "MALE" show the results obtained respectively when an adult female model and an adult male model were used as the initial models. The learning period of time using the reference models of the present invention was of the order of several tens of seconds. This experimental result shows that a high-precision standard model can be created in a short period of time.

Figure 39:
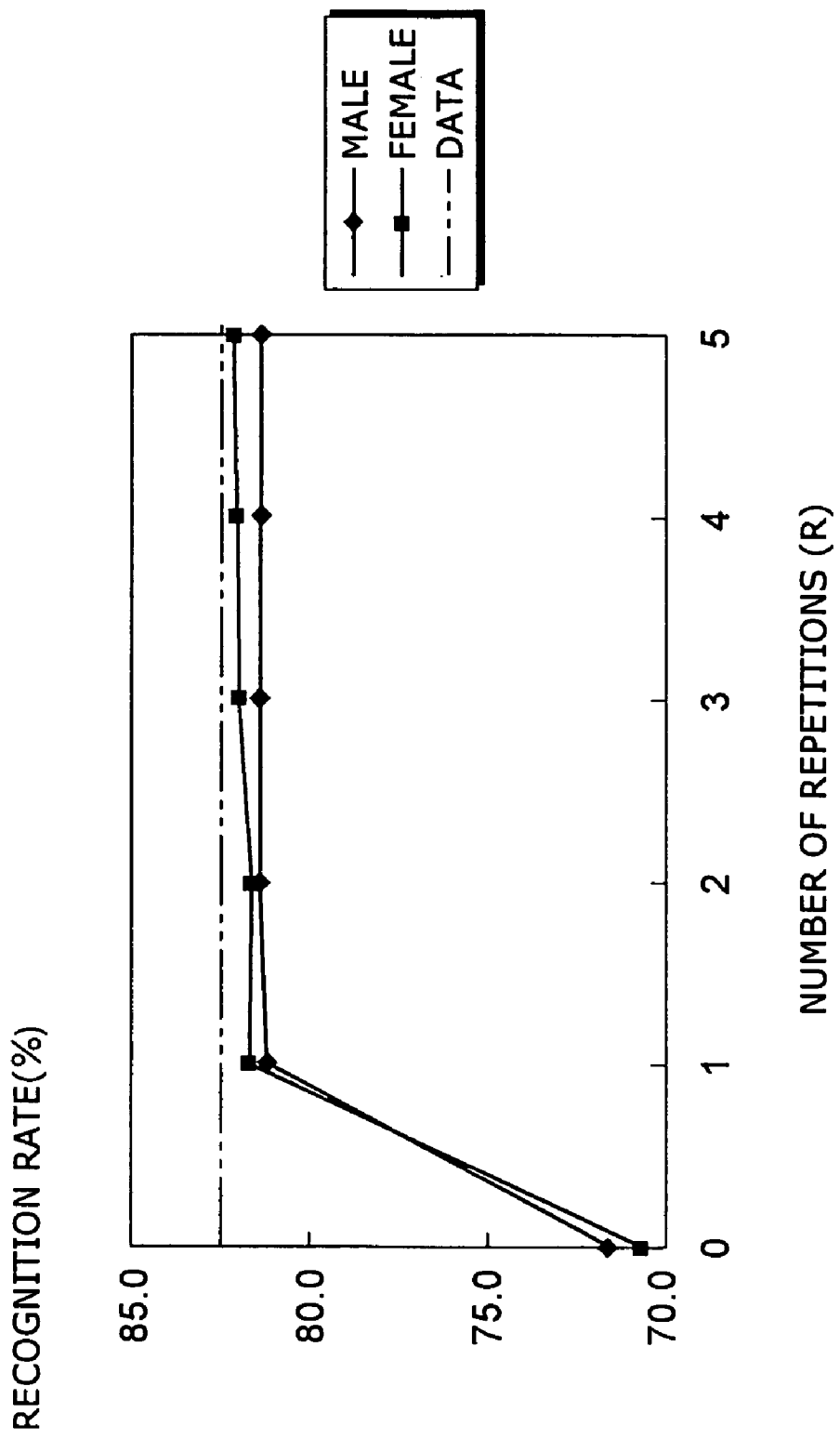
FIG. 39 is a graph showing a result of a recognition experiment performed using a standard model created by a second approximating unit of the third embodiment.

Here, for reference purposes, FIG. 39 shows a recognition rate obtained using the standard model created by the second approximating unit 306*e* in the third embodiment. This case is different from the case using the third approximating unit 906*e* in the present embodiment in that the neighborhood direction parameter G is one, regardless of the number of repetitions R. This experimental result shows that an excellent result can be obtained by selecting the adult female model as the initial model, and also shows that the precision is slightly declined when the adult male model is selected as the initial model. With consideration given to the result shown in FIG. 38 as well, a high-precision standard model can be created using the third approximating unit 906*e* without relying on the initial model.

As described so far, according to the eighth embodiment of the present invention, a reference model is prepared on the basis of the similarity information. On account of this, a reference model appropriate to the usage information and the specification information can be prepared at a necessary timing. Moreover, since the neighborhood direction parameter varies in accordance with the number of repetitions R, a high-precision standard model can be provided regardless of the initial model.

It should be noted that the number of processing repetitions performed by the statistics estimating unit 906*d* may be the number counted until reaching a certain threshold value having the degree of the likelihood represented as the above Equation 25.

Also, noted that the structure of the standard model 922 is not limited to the one composed of an HMM for each phoneme, and may be composed of a context-dependent HMM.

Moreover, the standard model creating unit 906 may create a model with respect to an output probability of an event in some of states of some of phonemes.

Furthermore, the HMM making up the standard model 922 may be structured by a different number of states for each phoneme, or by a different number of Gaussian mixture distributions for each state.

Also, after the standard model creation, the learning may be further performed using speech data.

Moreover, the standard model structure determining unit may determine the HMM structure, such as a monophone-based, triphone-based, or state-tying structure, and may also determine the number of states and the like.

Ninth Embodiment

Figure 40:
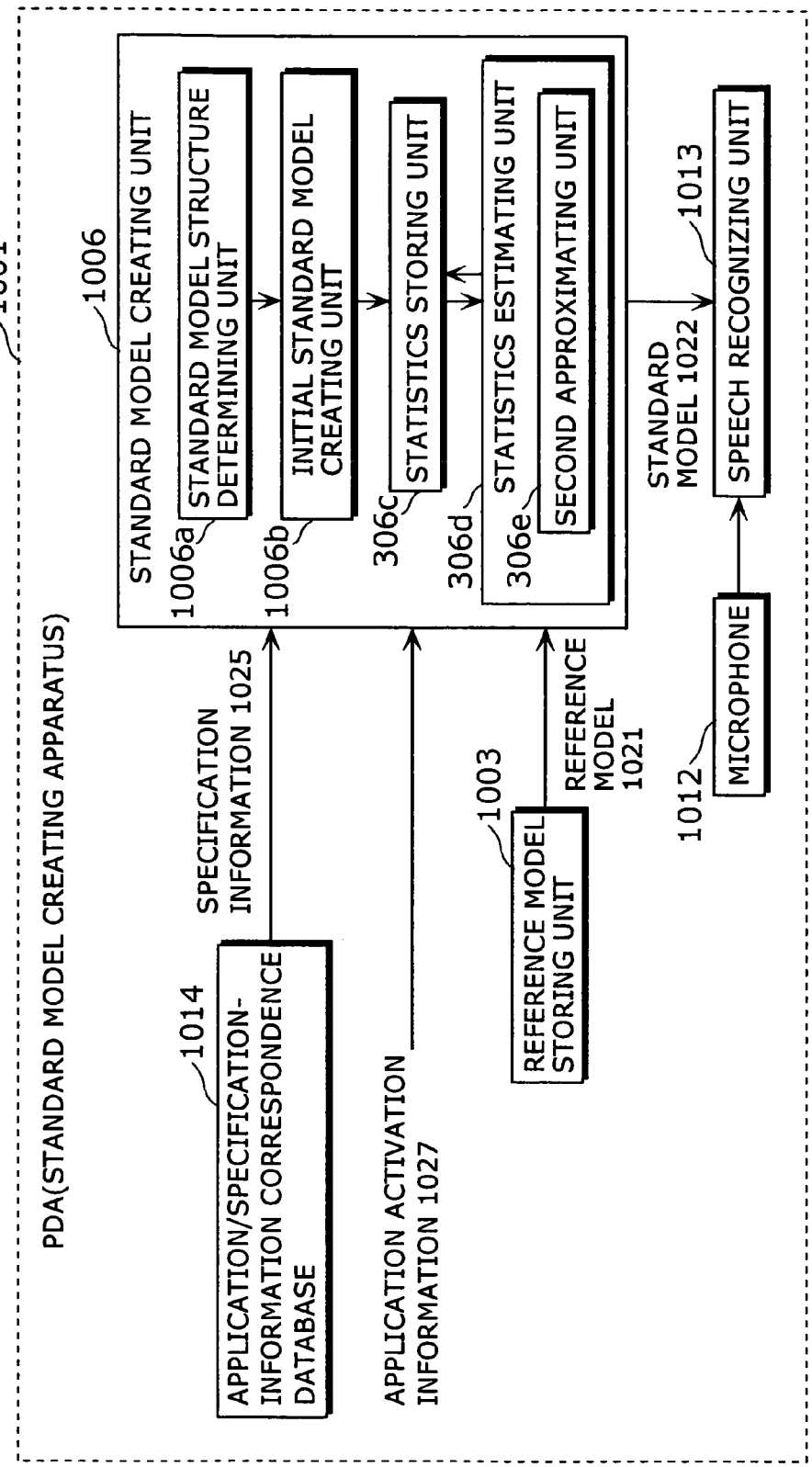
FIG. 40 is a block diagram showing the overall structure of a standard model creating apparatus of a ninth embodiment of the present invention.

FIG. 40 is a block diagram showing the overall structure of a standard model creating apparatus of the ninth embodiment of the present invention. This diagram shows an example in which the standard model creating apparatus of the present invention is embedded in a PDA (Personal Digital Assistant) 1001. In the present embodiment, an explanation is given as to a case, as an example, where a standard model for speech recognition is created.

The PDA 1001 is a portable information terminal. As a standard model creating apparatus for creating a standard model for speech recognition that is defined by a hidden Markov model expressed by an output probability of transitions between a group of events and an event or among events, the PDA 1001 is composed of a reference model storing unit 1003, a standard model creating unit 1006, an application/specification-information correspondence database 1014, a microphone 1012, and a speech recognizing unit 1013. The standard model creating unit 1006 is provided with a standard model structure determining unit 1006*a*, an initial standard model creating unit 1006*b*, a statistics storing unit 306*c*, and a statistics estimating unit 306*d*.

The standard model creating unit 1006 obtains specification information 1025 using the application/specification-information correspondence database 1014, on the basis of application activation information 1027 (an ID number of the activated application, in the present example) which has been transmitted. FIG. 41 shows an example of data of the application/specification-information correspondence database 1014. In the application/specification-information correspondence database 1014, specification information (the number of mixture distributions, in the present example) corresponding to an application (ID number or name) is stored.

The standard model creating unit 1006 is a processing unit for creating a standard model 1022, on the basis of the obtained specification information 1025, so as to maximize or locally maximize the probability or likelihood with respect to one reference model 1021 stored in the reference model storing unit 1003. The standard model creating unit 1006 has the function of the second approximating unit 306*e* in the third embodiment.

The speech recognizing unit 1013 recognizes speech of the user inputted from the microphone 1012 using the standard model 1022 created by the standard model creating unit 1006.

Next, an operation performed by the PDA 1001 structured as described so far is explained.

Figure 42:
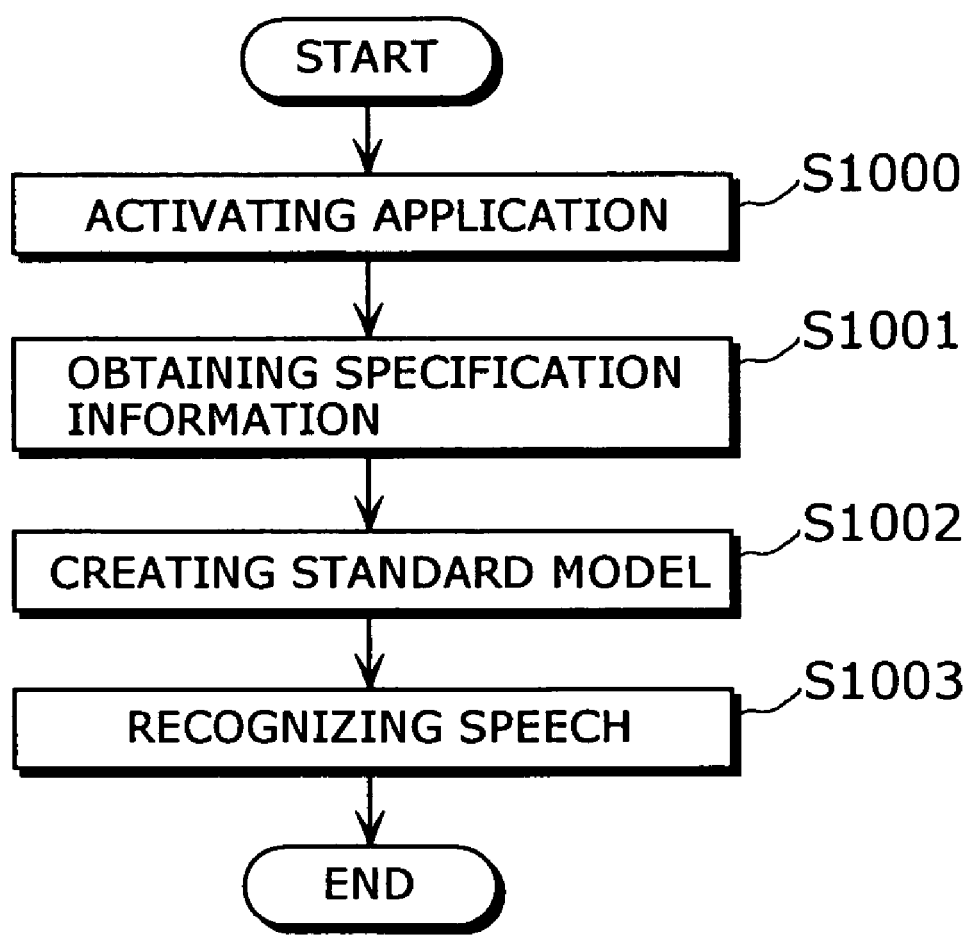
FIG. 42 is a flowchart of an operational procedure executed by a PDA 1001.

FIG. 42 is a flowchart of an operational procedure executed by the PDA 1001.

Figure 43:
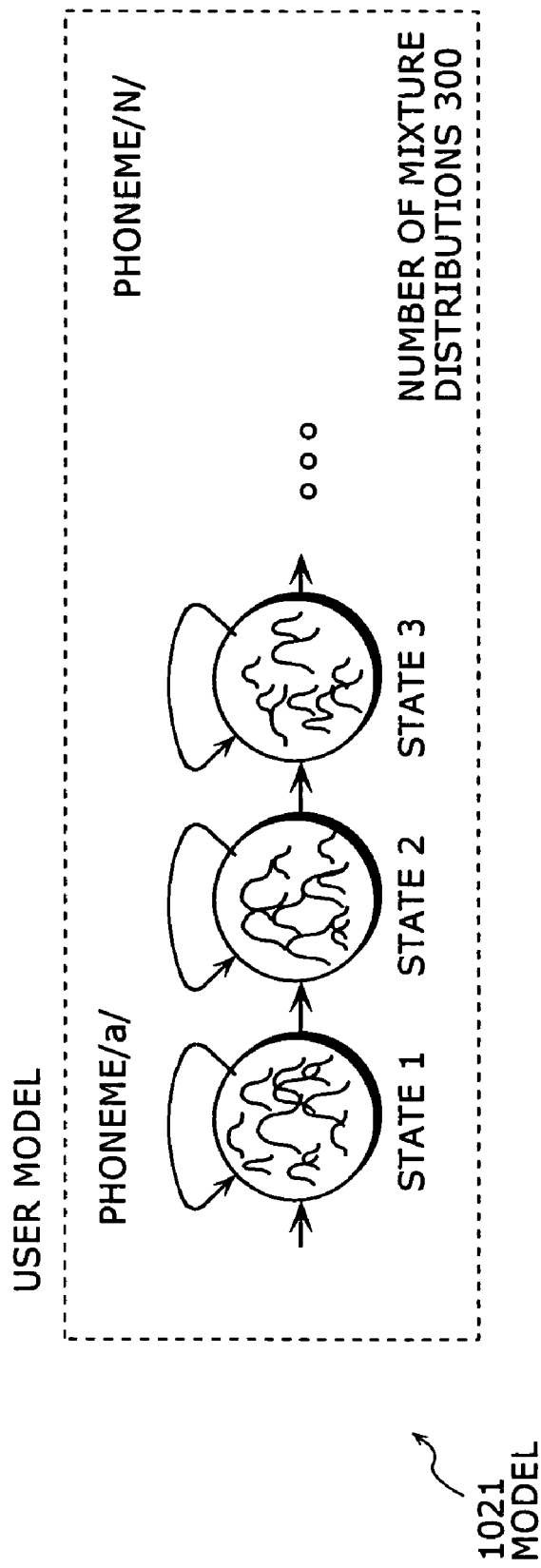
FIG. 43 shows an example of a reference model stored in a reference model storing unit.

Here, note that a single user reference model having many mixture distributions is stored in advance as the reference model 1021 in the reference model storing unit 1003. The reference model 1021 is composed of an HMM for each phoneme. FIG. 43 shows an example of the reference model 1021. This reference model has three states, in each of which an output distribution of the HMM is structured by a Gaussian mixture distribution having 300 mixture distributions. As the amount of characteristic, a total of 25-dimensional characteristic (J=25) summing up a 12-dimensional (J=12) mel-cepsturm coefficient, a 12-dimensional delta mel-cepstrum, and a delta power is used.

First, the user activates an application called "stock market", for example (step S1000).

In response to this, the standard model creating unit 1006 receives the ID "3" of the activated application, as the application activation information (step S1001). Then, the standard model creating unit 1006 creates a standard model 1022 on the basis that "the number of mixture distributions is 126" as indicated by the specification information 1025 corresponding to the ID "3", using the application/specification-information correspondence database 1014 (step S1002). To be more specific, the standard model 1022 is made up of a context-dependent HMM having three states, each of which has 126 mixture distributions (Mf=126).

Next, the standard model creating unit 1006 receives the specification information 1025 (step S1001), and creates the standard model on the basis of the specification information 1025 (step S1002).

Finally, the speech recognizing unit 1013 recognizes the speech of the user inputted from the microphone 1012, in accordance with the standard model 1022 created by the standard model creating unit 1006 (step S1003).

Next, a detailed procedure performed at the step S1002 (i.e., the step of creating the standard model) in FIG. 42 is explained. The procedure flow is the same as described with reference to the flowchart shown in FIG. 4. Note that, however, the structure of the standard model to be adopted and specific approximate calculation are different.

First, after receiving the application ID "3" as the application activation information 1027, the standard model structure determining unit 1006a determines that the standard model is made up of a context-dependent HMM having three states in each of which the number of mixture distributions is 126 (Mf=126), by reference to the specification information 1025 (indicating "the number of mixture distributions is 126") corresponding to the ID "3" using the application/specification-information correspondence database 1014 (step S102a in FIG. 4).

On the basis of the structure of the standard model determined by the standard model structure determining unit 1006a, the initial standard model creating unit 1006b determines initial values of statistics used for calculating the standard model (step S102b in FIG. 4). In the present example, values obtained by clustering, which will be described later, according to the k-means method and the method using the Mahalanobis' generalized distance are stored as the initial values of the statistics into the statistics storing unit 306c.

The statistics estimating unit 306d estimates the statistics of the standard model stored in the statistics storing unit 306c, using the reference model 1021 stored in the reference model storing unit 1003 (step S102c in FIG. 4). Note that this estimation processing performed by the statistics estimating unit 306d is the same as in the third embodiment.

Figure 44:
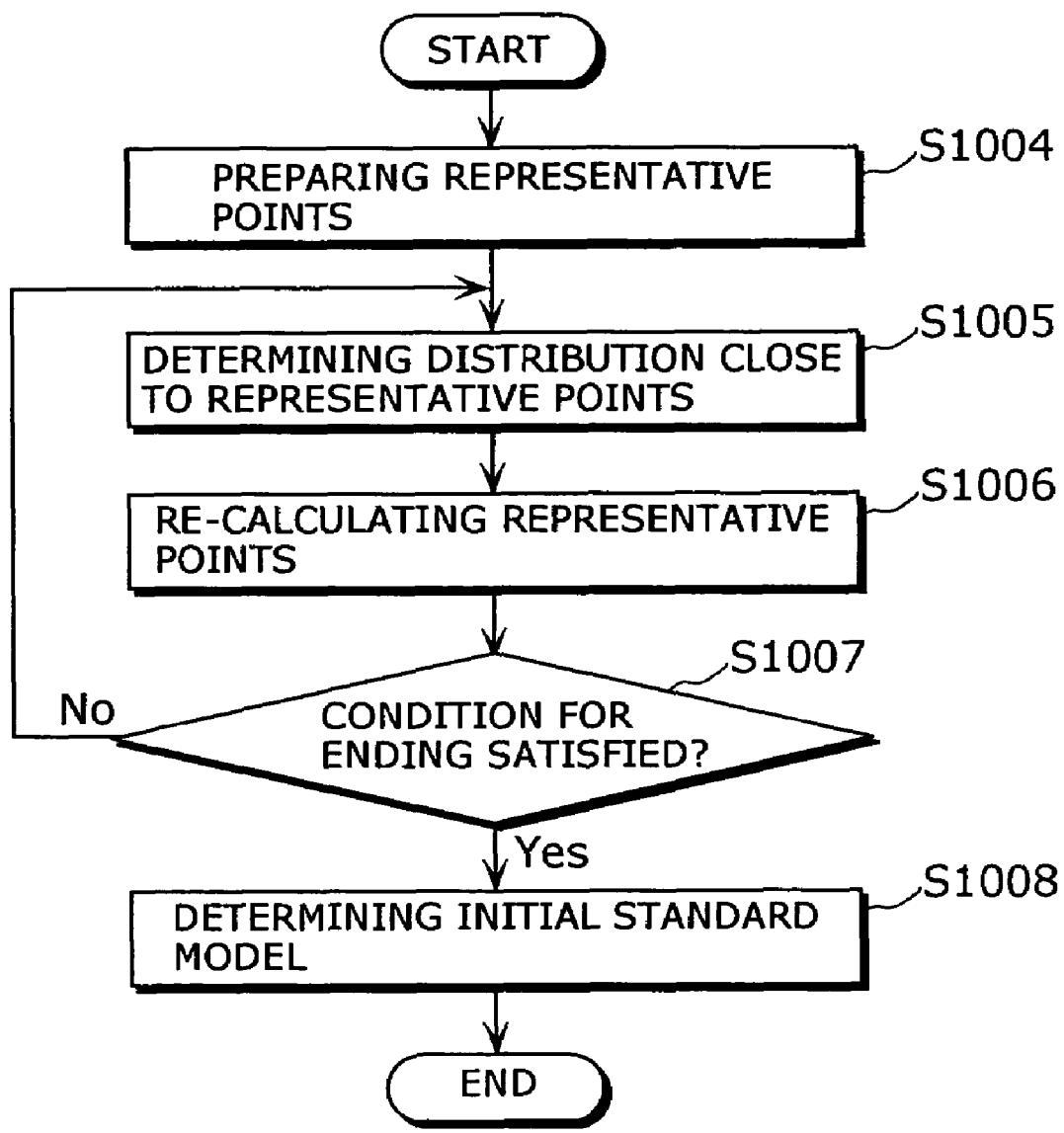
FIG. 44 shows a flowchart showing a method of determining initial values by a clustering performed by an initial standard model creating unit.

The following is an explanation of the method used by the initial standard model creating unit 1006b to determine the initial values. That is, the clustering according to the k-means method and the method using the Mahalanobis' generalized distance is explained. FIG. 44 shows a flowchart for the clustering. FIG. 45 to FIG. 48 show conceptual drawings of the clustering.

First, at the step S1004 in FIG. 44, representative points of 126 mixture distributions of the standard model are prepared (see FIG. 45). In the present example, 126 output distributions are selected from among 300 output distributions of the reference model, and the mean values of the selected distributions are determined as the representative points.

Figure 46:
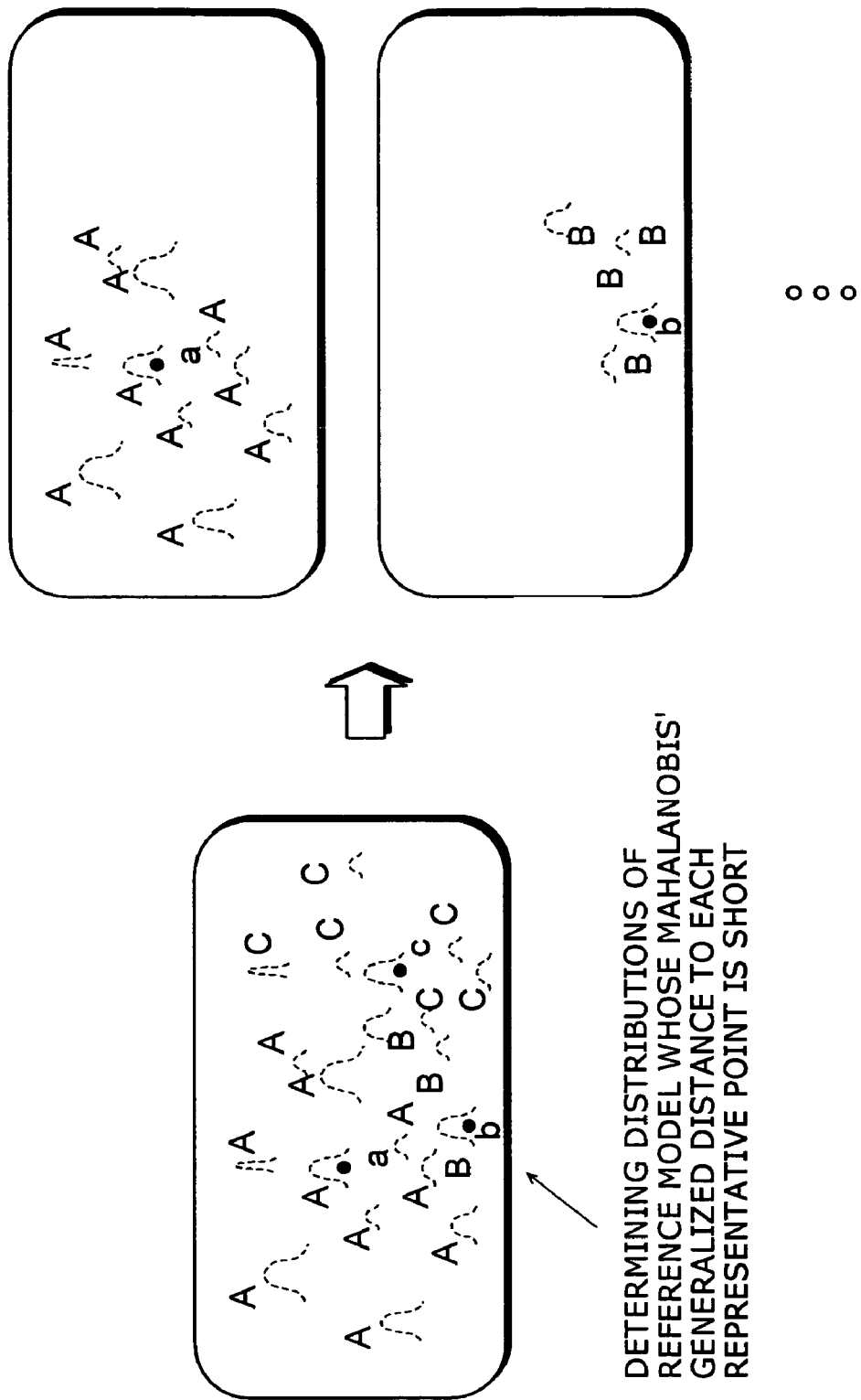
FIG. 46 shows a specific example of step S1005 in FIG. 44.
Figure 47:
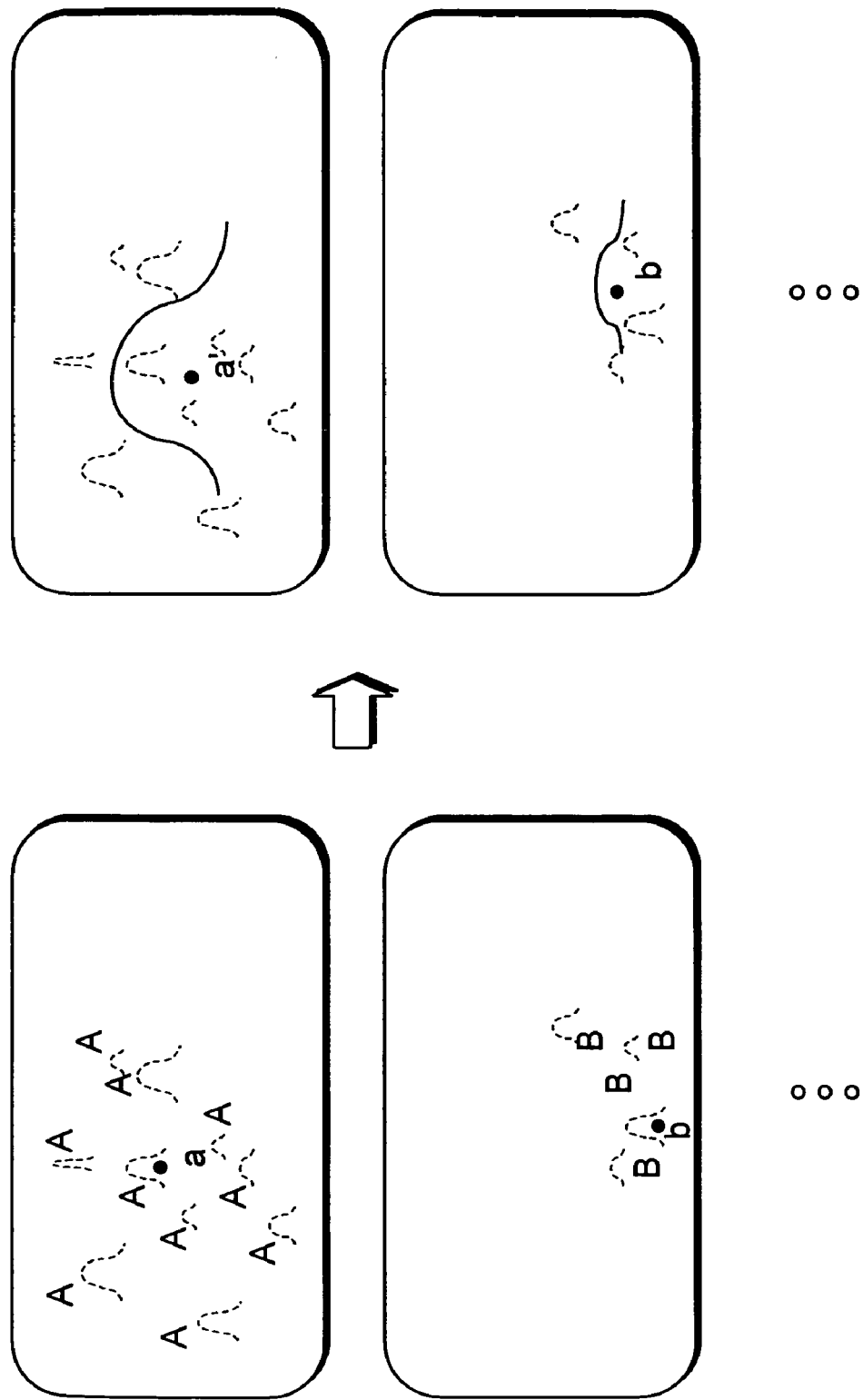
FIG. 47 shows a specific example of step S1006 in FIG. 44.
Figure 48:
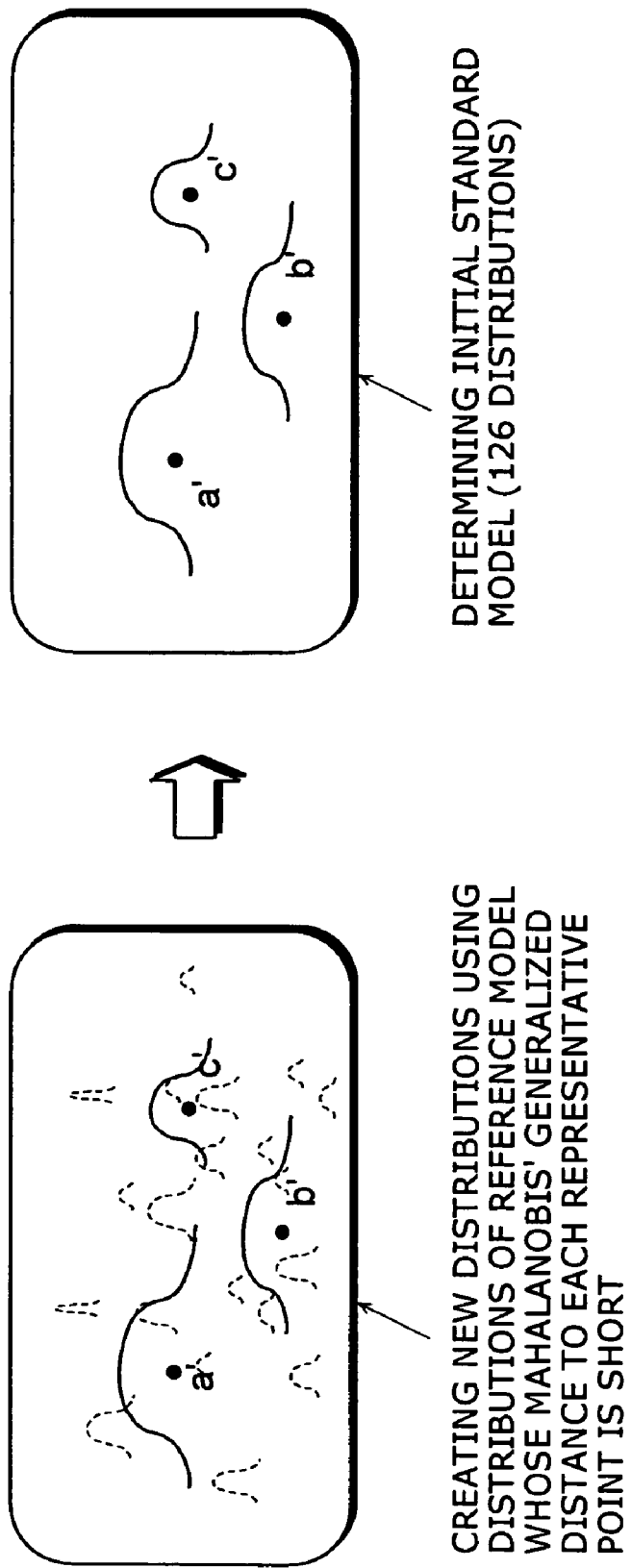
FIG. 48 shows a specific example of step S1008 in FIG. 44.

Next, at the step S1005 in FIG. 44, an output vector of the reference model, whose Mahalanobis' generalized distance to each representative point is short, is determined (see FIG. 46). Then, at the step S1006 in FIG. 44, the nearest distributions determined at the step S1005 are expressed as a single Gaussian distribution, and their mean values are determined as new representative points (see FIG. 47).

Following this, at the step S1007 in FIG. 44, whether or not the clustering operation is to be ended is determined. In the present example, the operation is ended if a rate of change in the Mahalanobis' generalized distance between each representative point and the distribution of the reference vector (i.e., a difference between a distance with a current representative point and a distance with a previous representative point) becomes equal to or below a threshold. If the condition for the ending is not satisfied, the processing returns to the step S1005 in FIG. 44, and the same operation is repeated from the determination of the near distributions.

Meanwhile, if the condition for the ending is satisfied, the processing proceeds to the step S1008 in FIG. 44 where the initial values of the statistics are determined and stored into the statistics storing unit 306c. In this way, the initial values are determined through the clustering.

As described so far, according to the ninth embodiment of the present invention, a standard model appropriate to the specification information can be automatically obtained in association with the application.

Note that the standard model 1022 may be made up of an HMM for each phoneme.

Also, the standard model creating unit 1006 may create a model with respect to an output probability of an event in some of states of some of phonemes.

Moreover, the HMM making up the standard model 1022 may be structured by a different number of states for each phoneme, or by a different number of Gaussian mixture distributions for each state.

Furthermore, after the standard model creation, the learning may be further performed using speech data.

Also, the standard model structure determining unit may determine the HMM structure, such as a monophone-based, triphone-based, or state-tying structure, and may also determine the number of states and the like.

Tenth Embodiment

Figure 49:
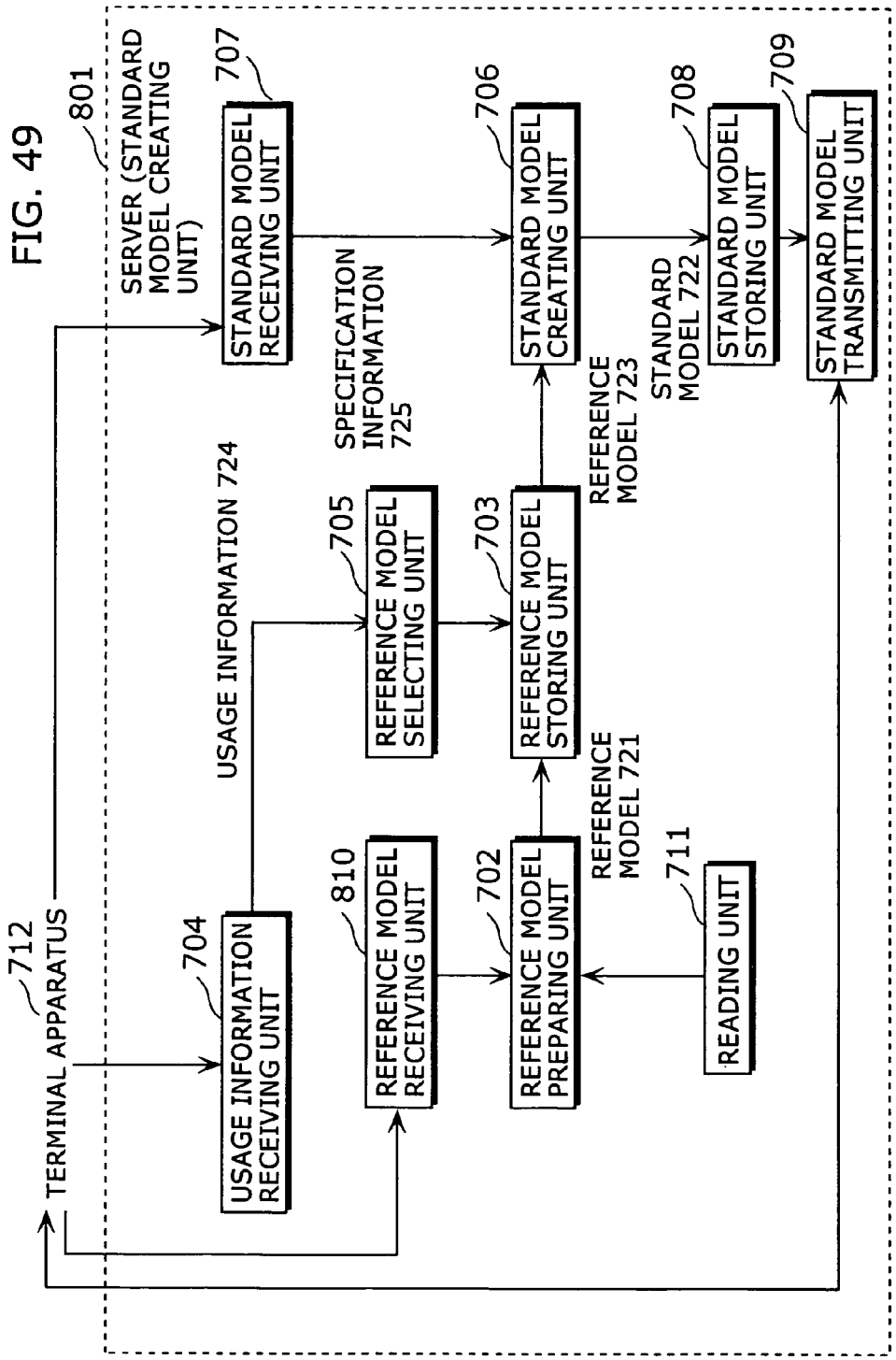
FIG. 49 is a block diagram showing the overall structure of a server related to a standard model creating apparatus of a tenth embodiment of the present invention.

FIG. 49 is a block diagram showing the overall structure of a standard model creating apparatus of the tenth embodiment of the present invention. This diagram shows an example in which the standard model creating apparatus of the present invention is embedded in a server 801 of a computer system. In the present embodiment, an explanation is given as to a case, as an example, where a standard model (adaptive model) for speech recognition is created.

The server 801 is a computer apparatus or the like used in a communication system. As a standard model creating apparatus for creating a standard model for speech recognition that is defined by an output probability of transitions between a group of events and an event or among events, the server 801 is composed of a reading unit 711, a reference model preparing unit 702, a reference model storing unit 703, a usage information receiving unit 704, a reference model selecting unit 705, a standard model creating unit 706, a specification information receiving unit 707, a standard model storing unit 708, a standard model transmitting unit 709, and a reference model receiving unit 810.

The reading unit 711 reads reference models for speech recognition separated by a combination of speaker, noise, and tone of voice, from a storage device such as a CD-ROM. The reference model preparing unit 702 transmits these read reference models to the reference model storing unit 703. The reference model storing unit 703 stores the transmitted reference models 721. The reference model preparing unit 702 transmits the reference models for speech recognition which were transmitted from a terminal apparatus 712 to the reference model receiving unit 810, to the reference model storing unit 703. The reference model storing unit 703 stores the transmitted reference models 721.

The specification information receiving unit 707 receives specification information 725 from the terminal apparatus 712. The usage information receiving unit 704 receives speech of the user uttered in noise, as usage information 724, from the terminal apparatus 712. The reference model selecting unit 705 selects reference models 723 which are separated by a combination of speaker, noise, and tone of voice and are acoustically similar to the speech of the user, i.e., the usage information 724 received by the usage information receiving unit 704, from among the reference models 721 stored in the reference model storing unit 703.

The standard model creating unit 706 is a processing unit for creating a standard model 722, on the basis of the specification information 725, so as to maximize or locally maximize the probability or likelihood with respect to the reference models 723 selected by the reference model selecting unit 705. The standard model creating unit 706 has the same function as the standard model creating unit 206 in the second embodiment. The standard model storing unit 708 stores one or more standard models based on the specification information 725. The standard model transmitting unit 709 receives a signal from the terminal apparatus 712 of the user requesting for the specification information and the standard model, and then transmits the standard model corresponding to the specification information to the terminal apparatus 712.

Next, an explanation is given as to an operation of the server 801 structured as described so far.

Figure 50:
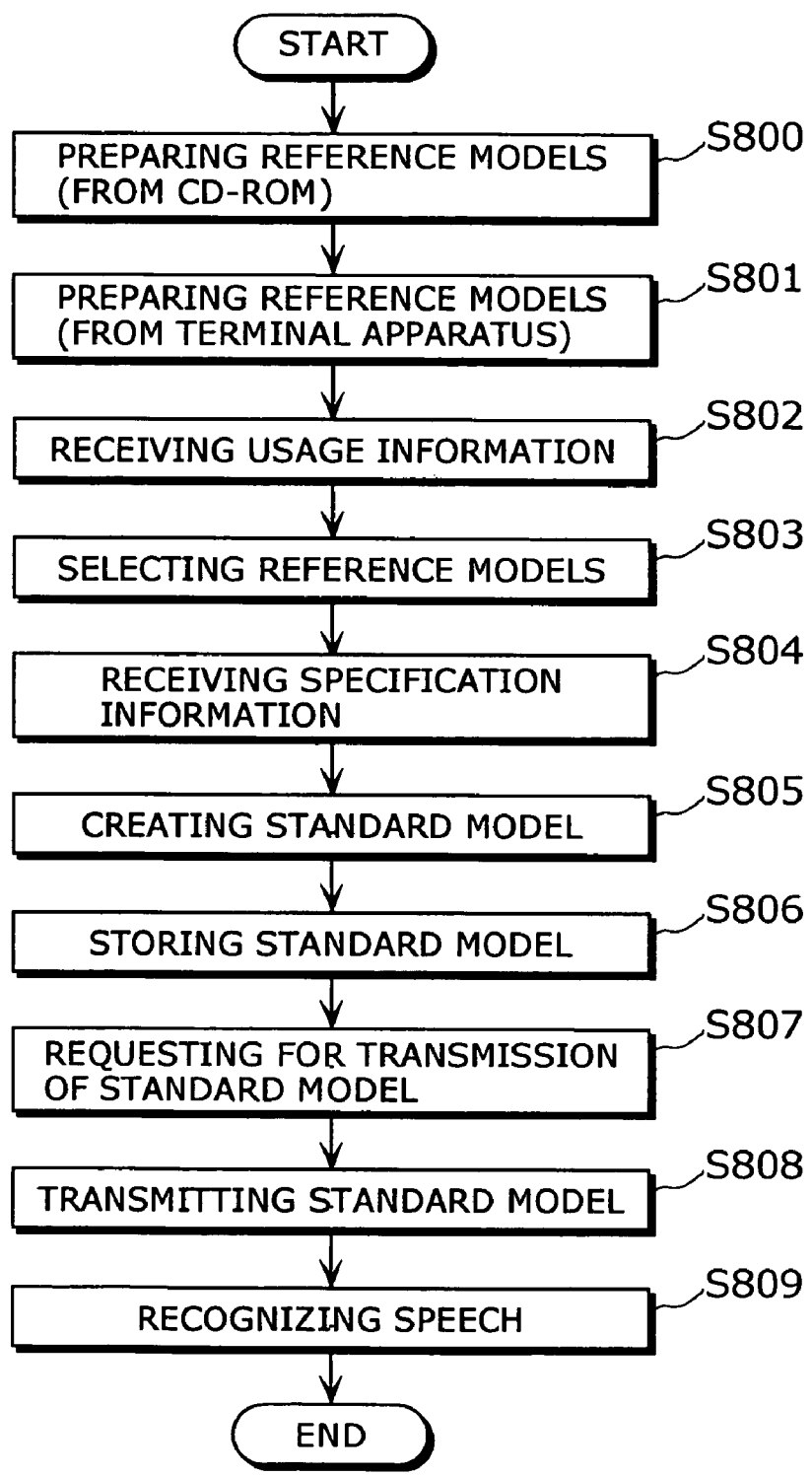
FIG. 50 is a flowchart showing an operational procedure executed by the server.

FIG. 50 is a flowchart showing an operational procedure executed by the server 801. It should be noted that examples of the reference models and standard models for explaining the operational procedure executed by this server 801 are the same as shown in FIG. 31 in the seventh embodiment.

First, in advance of the standard model creation, reference models serving as criteria are prepared (steps S800 and S801 in FIG. 50). To be more specific: the reading unit 711 reads reference models for speech recognition which are separated by a combination of speaker, noise, and tone of voice, from the storage device such as a CD-ROM; the reference model preparing unit 702 transmits these read reference models to the reference model storing unit 703; and the reference model storing unit 703 stores the transmitted reference models 721 (step S800 in FIG. 50). Here, the reference model 721 is composed of an HMM for each phoneme, for each combination of speaker, noise, and tone of voice. The reference model preparing unit 702 transmits the reference models for speech recognition which were transmitted from the terminal apparatus 712 to the reference model receiving unit 810, to the reference model storing unit 703. These reference models are appropriate to the user and the terminal apparatus 712. The reference model storing unit 703 stores the transmitted reference models 721 (step S801 in FIG. 50). As shown by the reference models 721 in FIG. 31, each reference model has three states, in each of which an output distribution of the HMM is structured by a Gaussian mixture distribution having 128 mixture distributions. As the amount of characteristic, a 25-dimensional (J=25) mel-cepstrum coefficient is used.

The procedure for creating the standard model 722 using these reference models 721 and for transmitting the standard model 722 to the terminal apparatus 712 (steps S802 to S809 in FIG. 50) is the same as the procedure described in the seventh embodiment (steps S701 to S708 in FIG. 30).

In this way, the user's own models stored in the terminal apparatus 712 can be uploaded to the server and can be used as sources for creating a standard model. Hence, for example, the server 801 can integrate the uploaded reference models with the already-stored other reference models, so as to create a high-precision standard model that has a larger number of mixtures. Also, the standard model can be downloaded to the terminal apparatus 712 for use. Accordingly, a simplified adaptive function is provided for the terminal apparatus 712 and a simplified adaptive model is uploaded, so that a standard model with a higher degree of precision can be created.

Figure 51:
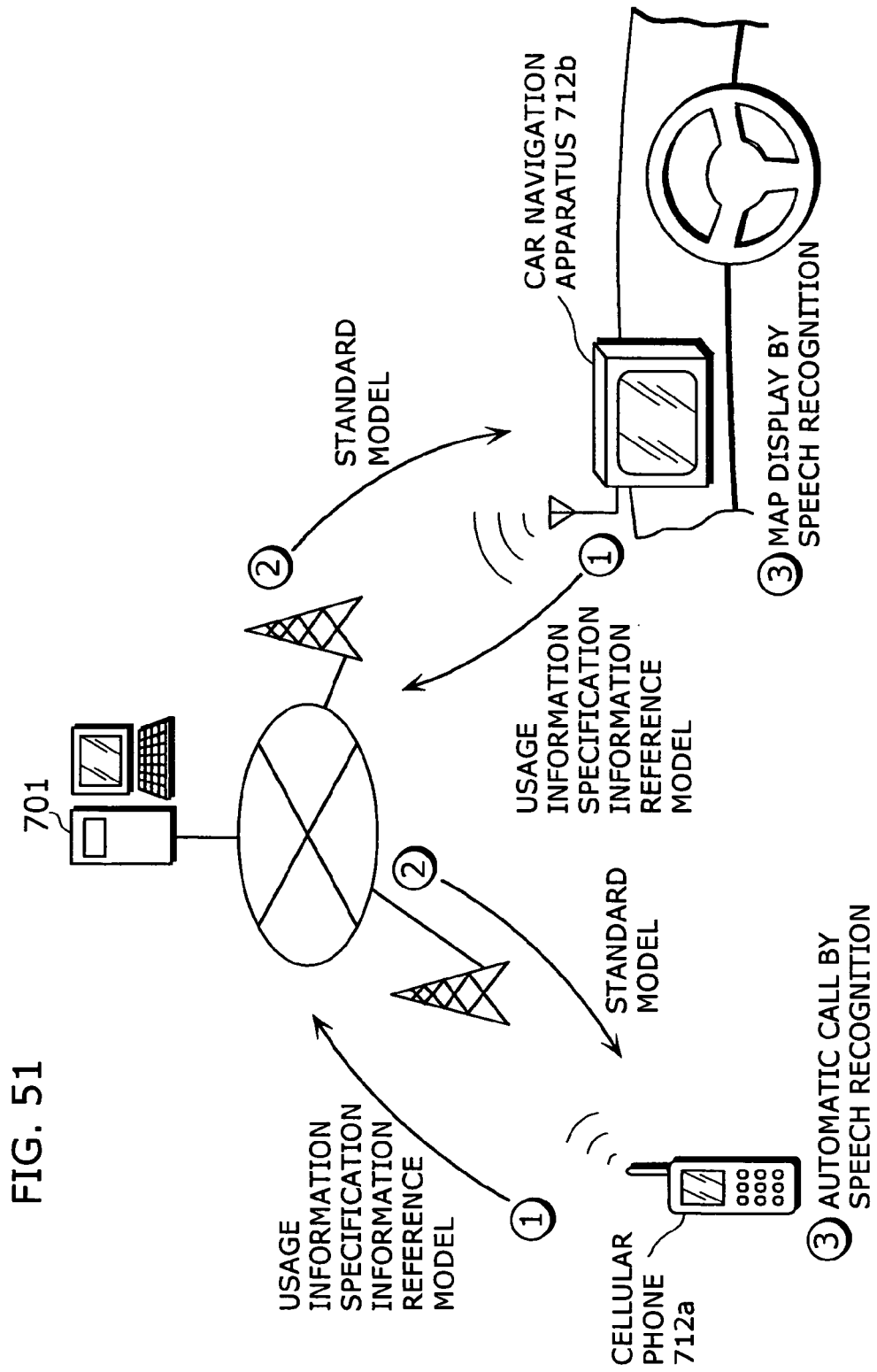
FIG. 51 shows an example of a system to which the standard model creating apparatus of the present invention is specifically applied.

FIG. 51 shows an example of a system to which the standard model creating apparatus of the present embodiment is specifically applied. This diagram shows the server 701 and the terminal apparatus 712 (a cellular phone 712*a* and a car navigation apparatus 712*b*) which communicate with each other via the Internet, wireless communication, or the like.

For the cellular phone 712*a*, for instance, the user's speech is usage information; specification information indicates that the system is used by a cellular phone (meaning that the processing capacity of a CPU is low); and previously-stored sample models are reference models. The cellular phone 712*a* requests for the standard model creation by transmitting the usage information, the specification information, and the reference models to the server 701. When the server 701 creates a standard model in response to this request, the cellular phone 712*a* downloads the standard model and then recognizes the speech of the user using the standard model. If the speech of the user matches with a name in an internal address book, for example, a telephone number associated with the name is automatically called.

For the car navigation apparatus 712*b*, the user's speech is usage information; specification information indicates that the system is used by a car navigation apparatus (meaning that the processing capacity of a CPU is normal); and previously-stored sample models are reference models. The car navigation apparatus 712*b* requests for the standard model creation by transmitting the usage information, the specification information, and the reference models to the server 701. When the server 701 creates a standard model in response to this request, the car navigation apparatus 712*b* downloads the standard model and then recognizes the speech of the user using the standard model. If the speech of the user matches with an internally-stored place name, for example, a map showing the directions from a current position to a destination position denoted by the place name is automatically displayed on a screen.

In this way, each of the cellular phone 712*a* and the car navigation apparatus 712*b* requests the server 701 to create the standard model suitable for itself. By doing so, each of them does not need to include a circuit and a processing program required for the standard model creation and, at the same time, can obtain standard models used for various recognition objects at necessary timings.

As described so far, according to the tenth embodiment of the present invention, a standard model can be created using the reference models received by the reference model receiving unit 810. Hence, a high-precision standard model can be provided. To be more specific, variations in the reference models stored by the server 801 can be increased by adding reference models through uploading them from the terminal apparatus 712. If another person uses them, a standard model with a higher degree of precision will be provided.

Moreover, since a standard model is created on the basis of the specification information, the standard model suitable for an apparatus that uses this standard model is prepared.

It should be noted that the reference model receiving unit 810 may receive the reference models from a terminal apparatus other than the terminal apparatus 712.

Furthermore, the application shown in FIG. 51 is not limited to the present embodiment and can be employed to the other embodiments. More specifically, each standard model created in the first to ninth embodiments can be distributed to different electronic apparatuses via various kinds of recording media or communications, so that these electronic apparatuses can perform speech recognition, image recognition, intension interpretation, and the like with a high degree of precision. Also, the standard model creating apparatus described in the above embodiments can be provided in the various kinds of electronic apparatuses. Thus, a stand-alone electronic apparatus provided with a recognition/authentication function including speech recognition, image recognition, intension interpretation, etc. can be realized.

The standard model creating apparatus of the present invention has been explained in accordance with the embodiments. However, the present invention is not limited to these embodiments.

For example, the approximate calculation for the statistics of the standard model that is performed in the first to tenth embodiments is not limited to the one described in each embodiment. At least one of the four types of approximate calculations respectively described in the first to fourth embodiments may be used. To be more specific, any one of the four types of approximate calculations may be used. Alternatively, a combination of two or more types of approximate calculations may be used.

The general approximating unit 206e of the statistics estimating unit 206d calculates the mixture weighting coefficient, the mean value, and the variance of the standard model using the approximate expressions represented as Equation 45, Equation 46, and Equation 47 in the second embodiment. Instead of these approximate expressions, the following approximate expressions represented as Equation 63, Equation 64, and Equation 65 may be used for the calculations.

$$\omega_{f(m)} \approx \frac{\sum_{i=1}^{N_g} \int_{-\infty}^{\infty} \left\{ \sum_{l=1}^{L_{g(i)}} \gamma(\mu_{g(i,l)}, m) v_{g(i,l)} g(x; \mu_{g(i,l)}, \sigma^2_{g(i,l)}) \right\} dx}{\sum_{k=1}^{M_f} \sum_{i=1}^{N_g} \int_{-\infty}^{\infty} \left\{ \sum_{l=1}^{L_{g(i)}} \gamma(\mu_{g(i,l)}, k) v_{g(i,l)} g(x; \mu_{g(i,l)}, \sigma^2_{g(i,l)}) \right\} dx}$$ (Equation 63)

$(m = 1, 2, \ldots, M_f)$ $$\mu_{f(m,j)} \approx \frac{\sum_{i=1}^{N_g} \int_{-\infty}^{\infty} x_{(j)} \left\{ \sum_{l=1}^{L_{g(i)}} \gamma(\mu_{g(i,l)}, m) v_{g(i,l)} g(x; \mu_{g(i,l)}, \sigma^2_{g(i,l)}) \right\} dx}{\sum_{i=1}^{N_g} \int_{-\infty}^{\infty} \left\{ \sum_{l=1}^{L_{g(i)}} \gamma(\mu_{g(i,l)}, m) v_{g(i,l)} g(x; \mu_{g(i,l)}, \sigma^2_{g(i,l)}) \right\} dx}$$ (Equation 64)

$(m = 1, 2, \ldots, M_f, j = 1, 2, \ldots, J)$ $$\sigma^2_{f(m,j)} \approx \frac{\sum_{i=1}^{N_g} \int_{-\infty}^{\infty} (x_{(j)} - \mu_{f(m,j)})^2 \left\{ \sum_{l=1}^{L_{g(i)}} \gamma(\mu_{g(i,j)}, m) v_{g(i,j)} g(x; \mu_{g(i,l)}, \sigma^2_{g(i,j)}) \right\} dx}{\sum_{i=1}^{N_g} \int_{-\infty}^{\infty} \left\{ \sum_{l=1}^{L_{g(i)}} \gamma(\mu_{g(i,l)}, m) v_{g(i,l)} g(x; \mu_{g(i,j)}, \sigma^2_{g(i,l)}) \right\} dx}$$ (Equation 65)

$(m = 1, 2, \ldots, M_f, j = 1, 2, \ldots, J)$

The present inventors verified that a high recognition performance could be obtained using the standard model created according to these approximate expressions. For example, in a case where each number of mixtures of a reference model and a standard model was 16, the recognition result: was 82.2% before adaptation; improved to 85.0% by the method using the sufficient statistics described in the above-mentioned nonpatent literature; and further improved to 85.5% by the method using the above approximate expressions. It can be understood that a recognition performance with a higher degree of precision could be obtained, in comparison with the case of the method using the sufficient statistics. Moreover, in a case where the number of mixtures of the reference model is 64 and the number of mixtures of the standard model is 16, a high recognition rate of 85.7% could be obtained as the recognition result by the method using the above approximate expressions.

For the creation of an initial standard model by the initial standard model creating unit, a correspondence table among class ID, initial standard model, and reference model as shown in FIG. 52 may be prepared in advance, so that an initial standard model can be determined in accordance with this table. The following is an explanation of a method for determining an initial standard model using such a correspondence table among class ID, initial standard model, and reference model. Note that the class ID is used for identifying a type of object for recognition that is performed using the standard model, and corresponds to a type of the standard model.

In the correspondence table among class ID, initial standard model, and reference model shown in FIG. 52, one class ID corresponds to a plurality of reference models having certain properties in common, and a pre-created initial standard model having the same properties as these reference models corresponds to them. As shown in this table, a class ID 8A and an initial standard model 8A correspond to reference models 8AA to 8AZ, and a class ID 64Z and an initial standard model 64Z correspond to reference models 64ZA to 64ZZ. The standard model creating unit can produce a high-precision standard model by using the initial standard model having the same properties as the reference models which are to be used.

Figure 53:
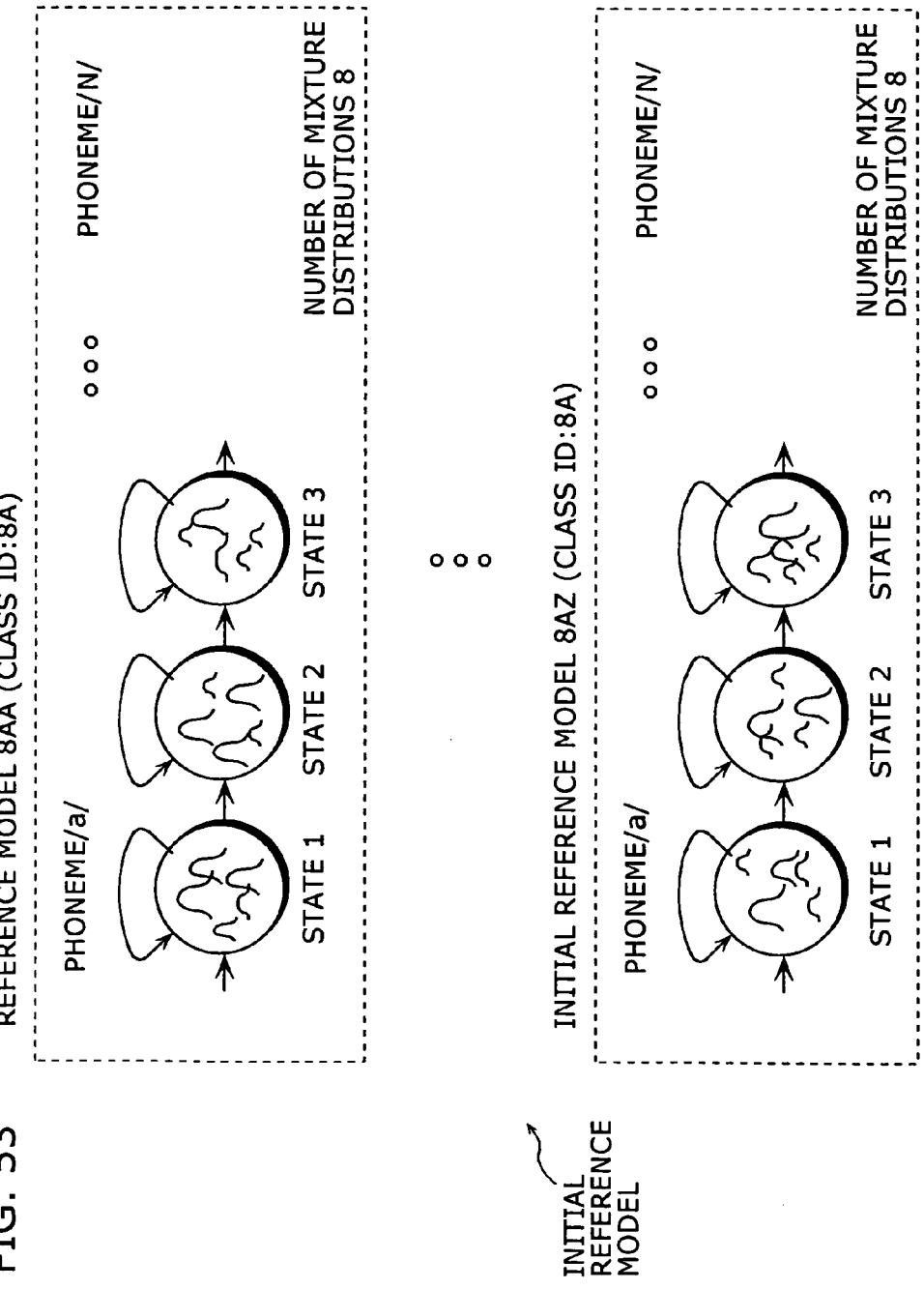
FIG. 53 shows examples of reference models 8AA to 8AZ in the correspondence table among class ID, initial standard model, and reference model shown in FIG. 52.
Figure 55:
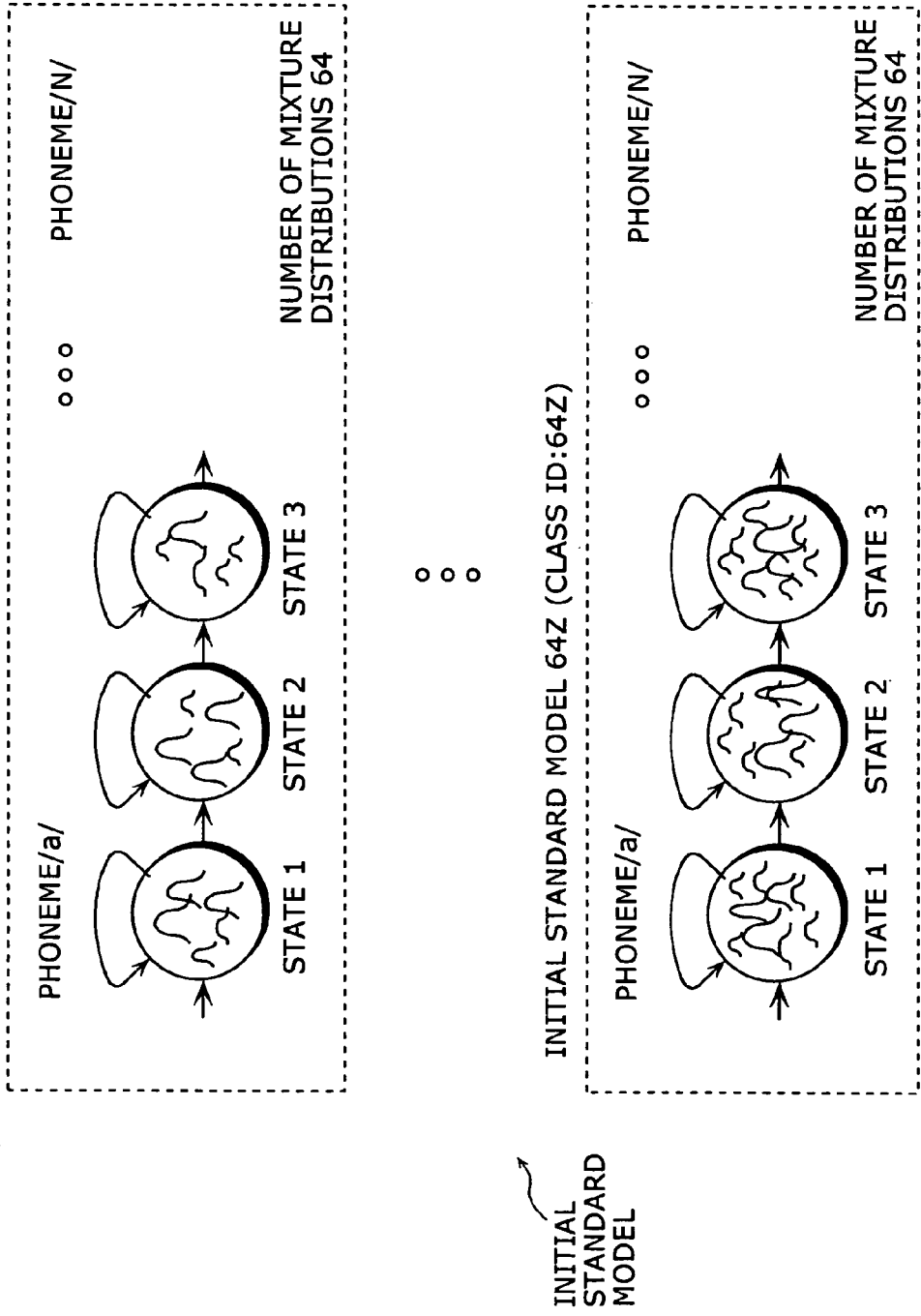
FIG. 55 shows examples of initial standard models 8A to 64Z in the correspondence table among class ID, initial standard model, and reference model shown in FIG. 52.

Here, an explanation is given as to suffixes, such as 8A and 8AA, attached to the class ID, the initial standard model, and the reference models. The first symbol "8" or the like refers to the number of mixture distributions. The second symbol "A" or the like refers to a major classification. For example, in a case where speech recognition is performed in a noisy environment, this symbol indicates a type of noise environment (for example, "A" denotes a household noise environment and "B" denotes an on-train noise environment). The third symbol "A" or the like refers to a minor classification. For example, it denotes an attribute of a person who is an object of speech recognition ("A" denoting a schoolchild in a lower grade and "B" denoting a schoolchild in a higher grade, for instance). Hence, in the correspondence table among class ID, initial standard model, and reference model in FIG. 52: the reference models 8AA to 8AZ are models having 8 mixture distributions as shown in FIG. 53; the reference models 64ZA to 64ZZ are models having 64 mixture distributions as shown in FIG. 54; and the initial standard models 8A to 64Z are models having 8 to 16 mixture distributions as shown in FIG. 55.

Figure 56:
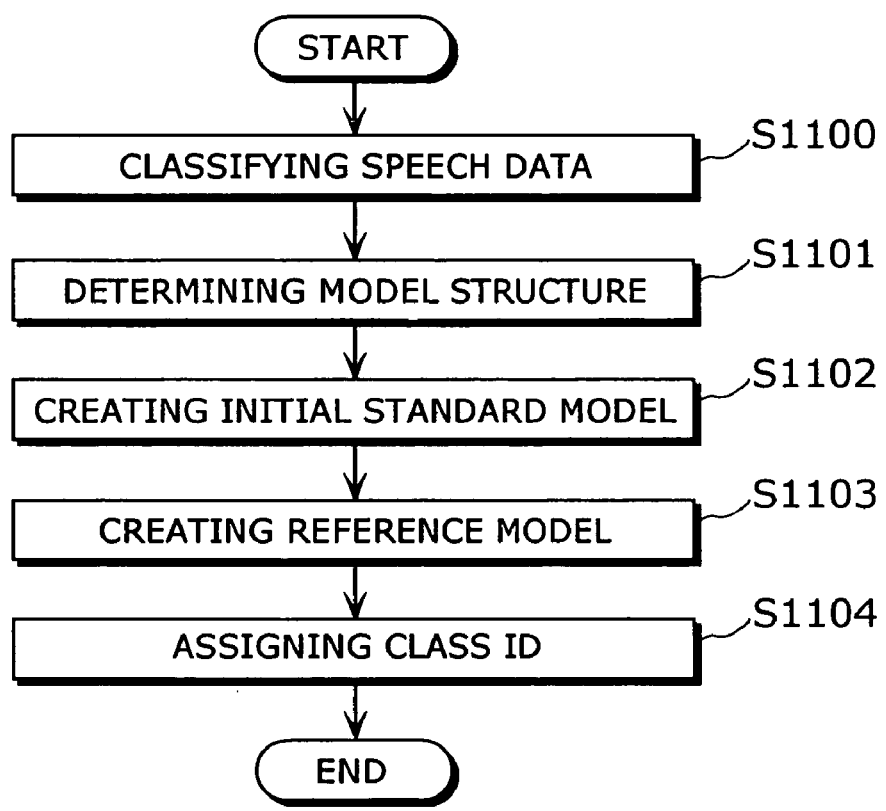
FIG. 56 is a flowchart showing a method for creating the correspondence table among class ID, initial standard model, and reference model.

Next, a method for creating such a correspondence table among class ID, initial standard model, and reference model is explained. FIG. 56 is a flowchart showing the procedure, and FIG. 57 to FIG. 60 respectively show specific examples of the steps. In the present embodiment, speech recognition is performed in a noisy environment as an example, and an explanation is given as to the procedure not only for creating the table, but also for newly creating a class ID, an initial standard model, and a reference model.

Figure 57:
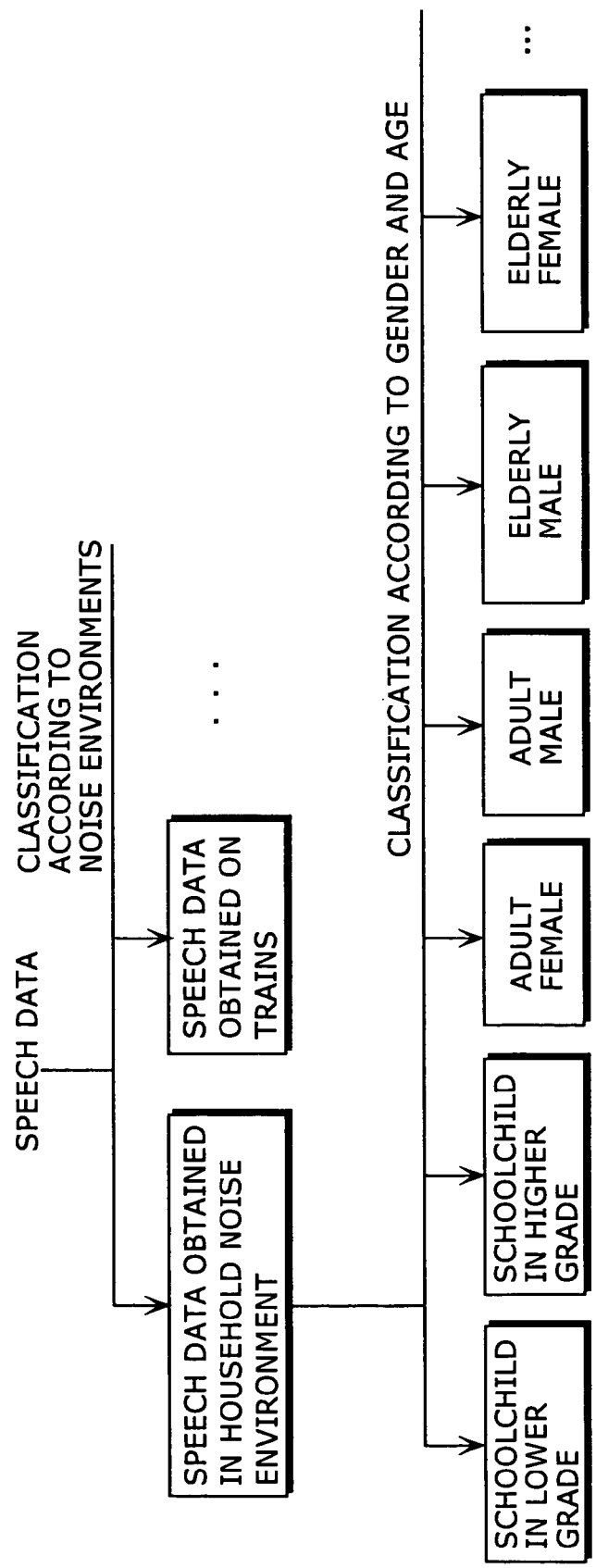
FIG. 57 shows a specific example of the step S1100 in FIG. 56.

First, speech data is classified into groups so that each group has acoustically similar speech data (step S1100 in FIG. 56). For example, the speech data is classified according to noise environments which are to be used as usage information, as shown in FIG. 57. The classification is as follows. An environment A (speech data obtained in the household noise environment) include voices of a schoolchild in a lower grade, a schoolchild in a higher grade, and an adult female that were recorded in the household noise environment. An environment B (speech data obtained on trains) include voices of a schoolchild in a lower grade, a schoolchild in a higher grade, and an adult female that were recorded on trains. It should be noted that the classification may be made according to usage information, such as: gender of a speaker; age of a speaker; vocal texture like laughing voice or angry voice; tone of voice like the tone of reading out something or the tone of conversation; or language like English or Chinese.

Next, a model structure of one or more reference models to be prepared is determined on the basis of the specification information or the like (step S1101 in FIG. 56). To be more specific, as the numbers of mixtures, 8, 16, 32, and 64 are determined to become objects. It should be noted that the method for determining the model structure is not limited to determining the number of mixture distributions, and the number of states of the HMM or the type of the HMM structure, such as a monophone-based or triphone-based structure, may be determined.

Figure 58:
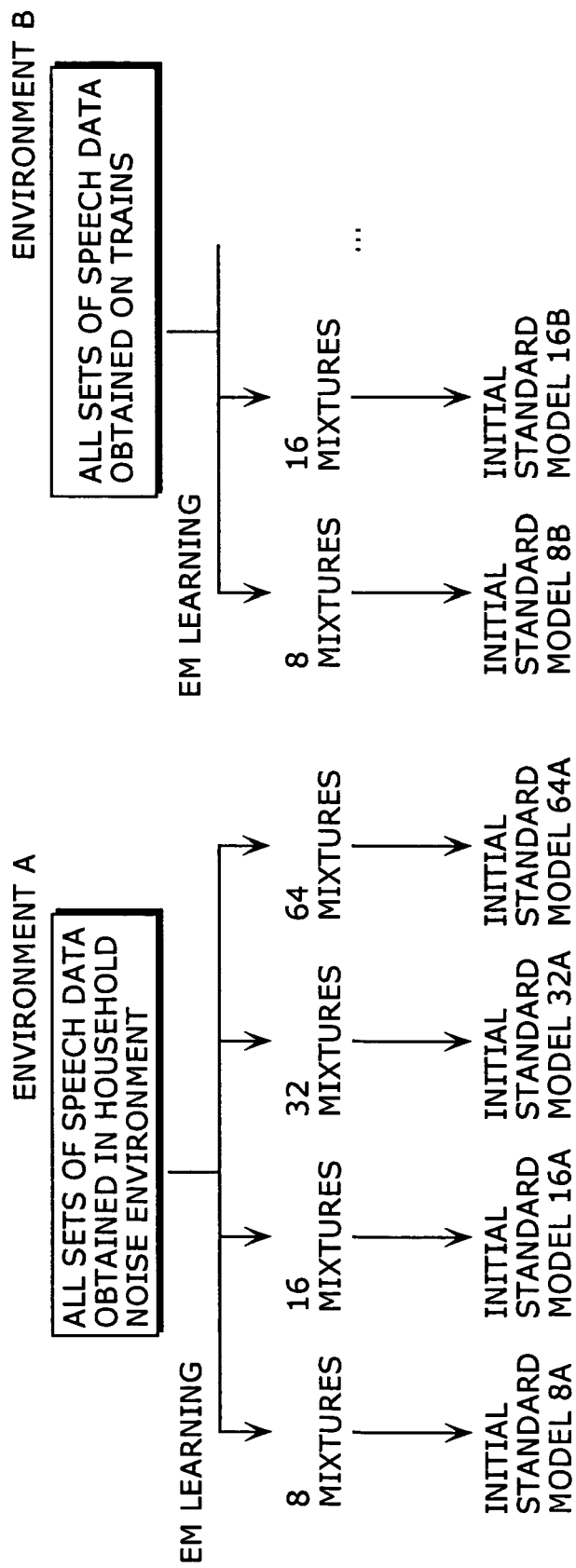
FIG. 58 shows a specific example of the step S1102 in FIG. 56.

Following this, an initial standard model is created (step S1102 in FIG. 56). More specifically, the initial standard model is created for each model structure determined in step S1101 for each classification (the environment A, the environment B, . . . ) of the speech data (step S1100). For example, as shown in FIG. 58, an initial standard model 8A, which is an 8-mixture initial standard model, is created by learning based on the speech data (of a schoolchild in a lower grade, a schoolchild in a higher grade, an adult male, an adult female, etc.) obtained in the household noise environment (i.e., the environment A), according to the Baum-Welch algorithm or the like.

Next, a reference model is created (step S1103 in FIG. 56). Briefly, the reference model is created using the initial standard model created in the above-stated step S1102. To be more specific, the reference model is learned using an initial standard model that has the same number of mixture distributions and has been learned based on the same noise environment as the speech data to be learned. For example, as shown in FIG. 59, a reference model 8AA has 8 mixture distributions and is learned based on the speech data of the schoolchild in the lower grade that was obtained in the household noise environment. As initial values used for learning, an initial model that has been learned based on the speech data (including voices of a schoolchild in a lower grade, a schoolchild in a higher grade, an adult female, and an adult male) obtained in the same noise environment, i.e., the household noise environment, is used. As a learning method, the Baum-Welch algorithm is used.

Finally, class IDs are assigned (step S1104 in FIG. 56). For example, by assigning one class ID for each noise environment, a correspondence table among class ID, initial standard model, and reference model shown in FIG. 60 is formed. That is to say, an "initial standard model with a class ID" and a "reference model with a class ID" are created.

It should be noted that such a correspondence table among class ID, initial standard model, and reference model does not need to be previously stored as a completed table in a terminal (i.e., the standard model creating apparatus). As shown in FIG. 61, the terminal (the standard model creating apparatus) may complete the table by communicating with the other apparatus (i.e., the server). In other words, the standard model creating apparatus (the terminal) can obtain the "initial standard model with a class ID" and the "reference model with a class ID" via a communication network or the like. As a matter of course, the terminal does not necessarily obtain the "initial standard model with a class ID" and the "reference model with a class ID" and may store them prior to shipment.

As shown in FIG. 61, the terminal can obtain the "initial standard model with a class ID" and the "reference model with a class ID" according to the following method. A first method may be applied to a case where the terminal stores the "initial standard model with a class ID" (such as the one complying with the way of assigning a class ID previously defined by the standard consortium or the like). In this case, the terminal downloads the "initial standard model with a class ID" (such as the one complying with the way of assigning a class ID previously defined by the standard consortium or the like) from one or more servers. Note that the terminal may store the "reference model with a class ID" prior to shipment.

A second method may be applied to a case where the terminal does not store the "initial standard model with a class ID". In this case, the terminal downloads the "initial standard model with a class ID" from the server (a server 1 in FIG. 61). Next, the server downloads the "initial standard model with a class ID" from one or more servers (a server 2 in FIG. 61). It is possible to add or change the definition of class ID on an as-needed basis. This saves a memory of the terminal as well.

A third method may be applied to a case where the terminal stores the "correspondence table among class ID, initial standard model, and reference model" that specifies a correspondence of a class ID with an initial standard model and a reference model. In this case, the terminal uploads the "correspondence table" to a server (a server 3 in FIG. 61) that does not store the "correspondence table". In accordance with the transmitted "correspondence table", the server prepares the "reference model with a class ID". The terminal downloads the prepared "reference model with a class ID".

Figure 62:
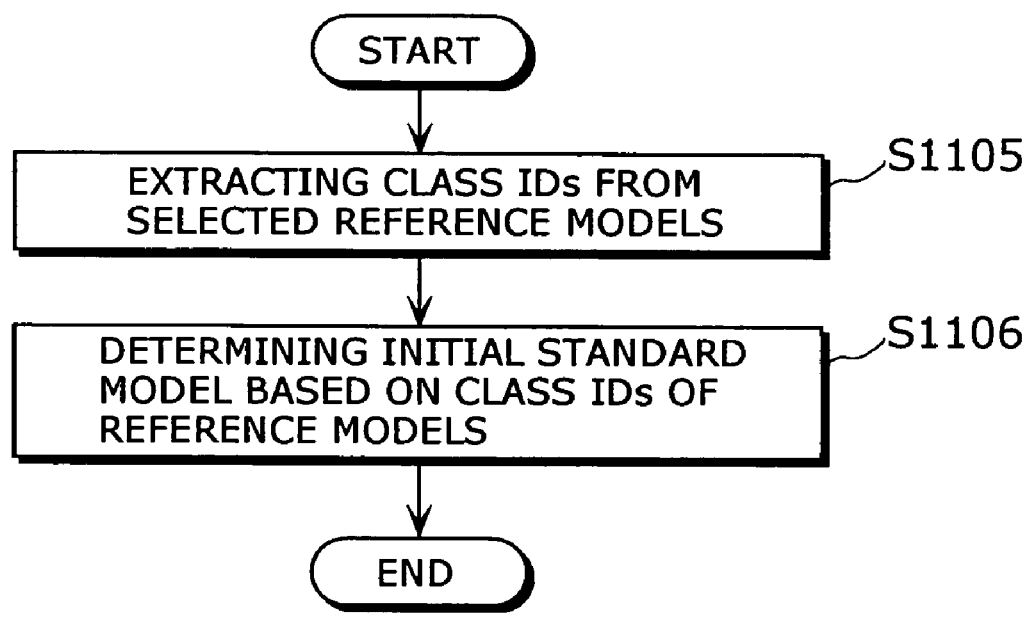
FIG. 62 is a flowchart showing a method for determining an initial standard model using a correspondence table among class ID, initial standard model, and reference model.
Figure 64:
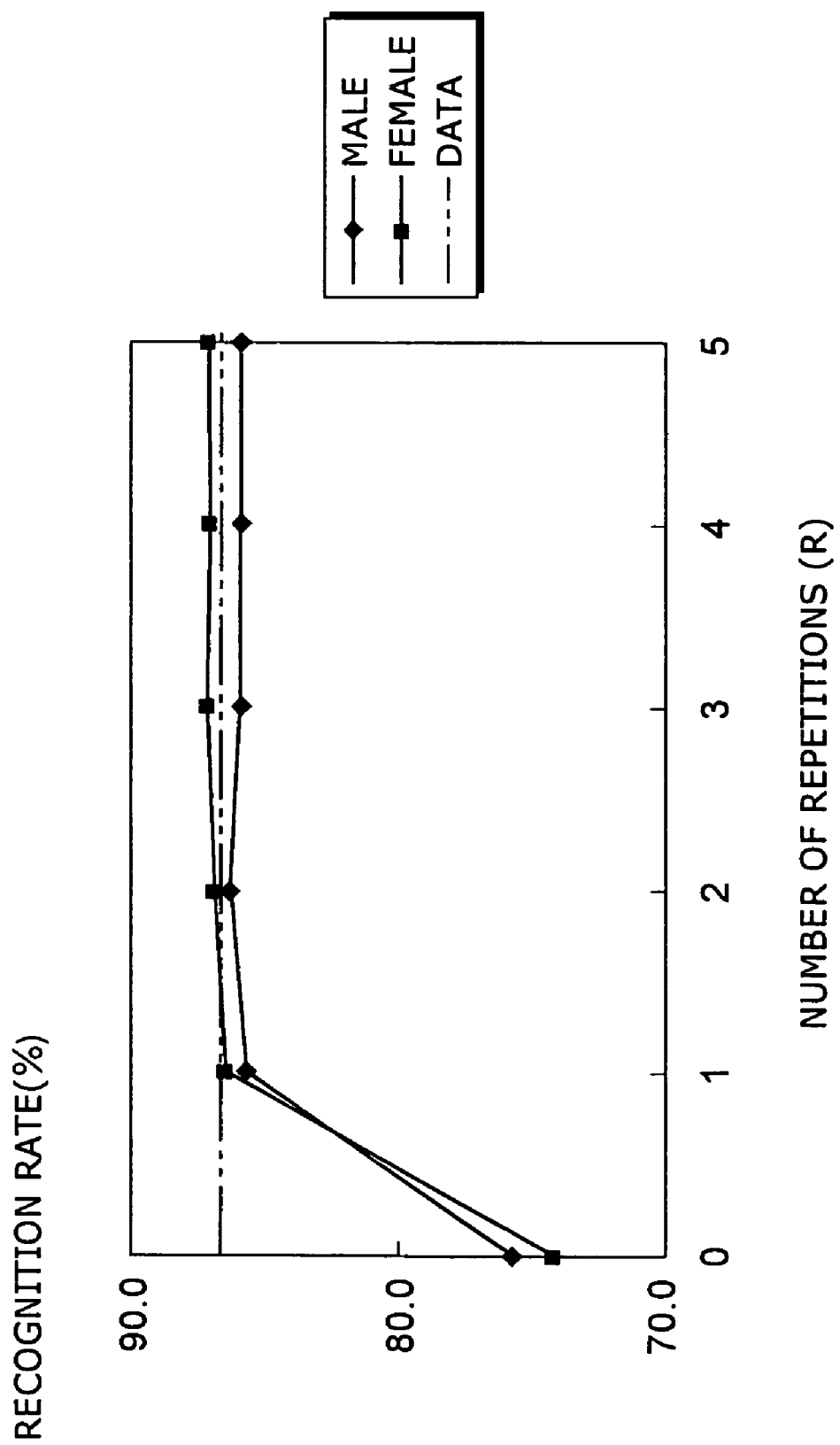
FIG. 64 a graph showing a result of a recognition experiment performed using a standard model which is created using a third approximating unit.

Next, an explanation is given as to a method used by the initial standard model creating unit to determine an initial standard model using such a correspondence table among class ID, initial standard model, and reference model. FIG. 62 is a flowchart showing the procedure. FIG. 63 and FIG. 64 show specific examples of the steps.

First, class IDs are extracted from reference models which are to be used for creating a standard model (step S1105 in FIG. 62). For example, corresponding class IDs are respectively extracted from the selected reference models in accordance with a table shown in FIG. 63. In the present example, as the extracted class IDs, there are one 8A, three 16As, one 16B, and one 64B.

Next, an initial standard model to be used for creating a standard model is determined using the extracted class IDs (step S1106 in FIG. 62). Specifically, the initial standard model is determined according to the following procedure.

(1) Attention is focused on the class IDs (16A and 16B) extracted from the reference models having the same class ID (16*) as the number of mixture distributions (16 mixtures) of a standard model to be created. An initial standard model corresponding to the class ID which has been extracted most is determined as a final initial standard model. For example, in a case where the standard model is made up of 16 mixtures, since three 16A and one 16B are extracted as the class IDs related to the 16- mixture, an initial standard model whose class ID is 16A is to be adopted.

(2) Attention is focused on a class ID (8A) extracted from the reference model having the same class ID (8*) as the number of mixture distributions (8 mixtures) of a standard model to be created. An initial standard model having the same class ID is determined as a final initial standard model. For example, in a case where the standard model is made up of 8 mixtures, since one 8A is extracted as the class ID related to the 8-mixture, an initial standard model whose class ID is 8A is to be adopted.

(3) Attention is focused on a class ID extracted from the reference model having the same class ID (32*) as the number of mixture distributions (32 mixtures) of a standard model to be created. If there is not, attention is paid to the specification information and clustering is performed using the initial standard models (8A and 16A) having the class ID (*A) that has been extracted most, so as to form 32 mixtures. The resultant model is determined as a final initial standard model (see FIG. 44). For example, in a case where the standard model is made up of 32 mixtures, since no class IDs related to the 32-mixture are extracted, an initial standard model having 32 mixtures through the clustering performed using the class ID (16A) which has been extracted most is to be adopted.

Note that the specification information (the number of mixture distributions, etc.) of the standard model to be created may not be focused first, and attention may be paid to the usage information (the type of noise, etc.) so that initial values will be determined.

FIG. 64 shows a result of a recognition experiment performed using a standard model having 64 mixture distributions that was created using the third approximating unit. The vertical axis indicates a recognition rate (%) for adults (males and females) while the horizontal axis indicates the number of repetitions R. For the case where the number of repetitions R is zero, the shown result was obtained by the recognition executed using an initial model created by the initial standard model creating unit before the learning was performed. For the cases where the number of repetitions R is one to five, the neighborhood direction parameter G was set at one.

A graph of "DATA" shows the result obtained by the learning based on the speech data for a few days. Graphs of "FEMALE" and "MALE" show the results obtained respectively when an adult female model and an adult male model were used as the initial models. The learning period of time using the reference models of the present invention was of the order of several tens of seconds. This experimental result shows that a high-precision standard model could be created when the adult-female reference model was determined as an initial standard model, as compared with the result obtained from the learning based on the speech data.

This result also shows that a problem of ending up with a local solution due to the learning based on the speech data can be solved if the speech data is divided and the divided sets of speech data are integrated after each set is precisely learned as a reference model (by comparison in the degree of recognition precision with the case of the learning based on the speech data).

As to the speech data of children that is hard to record, the learning can be precisely performed using the reference models having the small number of mixture distributions corresponding to the number of sets of the data. As to the speech data of adults that can be recorded sufficiently, the learning can be precisely performed using the reference models having the large number of mixture distributions. After this, through integration according to the present invention, it can be expected that a standard model with an extremely high degree of precision will be created.

Note that the recognition experiment in the case of the 16-mixture standard model (see FIG. 39) shows that the method of the present invention did not exceed the recognition rate obtained by the standard model learned based on the speech data. This is considered to result from the lack of information of the speech data caused when the speech data was transformed into the 16-mixture reference models. Thus, by creating 64-mixture reference models to hold adequate characteristics of the speech data, a standard model with a higher degree of precision can be created. For this reason, the number of mixture distributions of the reference model is set at as large as 300 in the ninth embodiment.

Also, the recognition experiments shown in FIG. 39 and FIG. 64 indicate the effects exerted by the initial standard model upon the recognition precision, demonstrating the importance of the method for determining an initial standard model (in FIG. 64, when the adult-female reference model was used as the initial standard model, a standard model with a higher degree of precision could be created as compared with when the adult-male reference model was used).

As described so far, a high-precision standard model can be created using an initial standard model having the same properties as the reference models, in accordance with the correspondence table among class ID, initial standard model, and reference model.

Note that the method for determining an initial standard model using such a correspondence table among class ID, initial standard model, and reference model can be applied to any of the stated first to tenth embodiments.

In the stated embodiments, Equation 25 is used as the likelihood of the standard model with respect to the reference models for estimating the statistics of the standard model. However, the present invention is not limited to such a likelihood function, and a likelihood function represented as the following Equation 66 may be used, for example.

$$\log L = \sum_{i=1}^{N} \int_{-\infty}^{\infty} \log \left[ \sum_{m=1}^{M} \omega_{(m)} f(x, \mu_{(m)}, \sigma_{(m)}^2) \right.$$
$$\left. \alpha_{(i)} \left\{ \sum_{l=1}^{L_i} v_{(l)} g_i(x, \mu_{(l)}, \sigma_{(l)}^2) \right\} \right] dx \quad \text{(Equation 66)}$$

Here, $\alpha(i)$ is a weight showing a level of importance corresponding to each reference model i to be integrated. For example, for the case of speaker adaptive speech recognition, the level of importance is determined by the degree of similarity between speech of the user and speech created from the integrated model. To be more specific, if the reference model is acoustically similar to the user's speech (meaning that the level of importance is high), $\alpha(i)$ is set at a large value (that is, a large amount of weight is assigned). The degree of similarity between speeches of the user and the integrated model may be determined by the likelihood obtained when the user's speech is inputted to the integrated model. Accordingly, when a standard model is to be created by integrating a plurality of reference models, the higher the degree of similarity of the reference model to the user's speech is in sound, the more amount of weight is assigned to exert an effect on the statistics of the standard model. Thus, a high-precision standard model more reflecting the characteristics of the user is created.

In each of the stated embodiments, the standard model structure determining unit determines the structure of a standard model on the basis of various kinds of factors, such as the usage information and the specification information. However, the present invention is not limited to these factors. For example, in the case of speech recognition, the structure of the standard model may be determined in accordance with various attributes of a speaker to be recognized, such as: age; gender; texture of the speaker's voice; tone of voice changed with emotions or health condition; speaking rate; civility in utterance; dialect; type of background noise; loudness of background noise; an S/N ratio between speech and background noise; microphone quality; and a degree of complexity in recognizable vocabulary.

A more specific explanation is given as follows with reference to FIG. 65A to FIG. 65J. If the speaker which is the object of the speech recognition is an elderly person or child, the number of Gaussian distributions (the number of mixtures) making up the standard model may be large (see FIG. 65A). If the speaker which is the object of speech recognition is male, the number of mixtures may be increased as compared with the case of a female (see FIG. 65B). The number of mixtures may be increased, depending on the texture of voice of the speaker which is the object of speech recognition. Specifically, the number may be increased according to "normal", "husky", and "hoarse" in this order (see FIG. 65C). The number of mixtures may be increased, depending on the tone of voice which is the object of speech recognition. Specifically, the number may be increased according to "normal", "angry voice", and "crying/laughing voice" in this order (see FIG. 65D). The number of mixtures may be increased, depending on a speaking rate of the speaker which is the object of speech recognition. Specifically, the faster or slower the rate is, the larger the number of mixtures is (see FIG. 65E). The number of mixtures may be increased, depending on the civility in utterance by the speaker which is the object of speech recognition. Specifically, the number may be increased according to "declamatory tone", "addressing tone", and "conversational tone" in this order (see FIG. 65F). The number of mixtures may be increased, depending on the dialect spoken by the speaker which is the object of speech recognition. Specifically, the number may be increased according to "standard language", "Osaka dialect", and "Kagoshima dialect" in this order (see FIG. 65G). The number of mixtures may be decreased, as the background noise in speech recognition becomes louder (see FIG. 65H). The number of mixtures may be increased, as the microphone used in speech recognition grows in performance (see FIG. 65I). The number of mixtures may be increased, as the recognizable vocabulary increases (see FIG. 65J). For most of these examples, the number of mixtures is determined, considering that the precision is ensured by increasing the number of mixtures when variations in speech to be recognized are wide.

INDUSTRIAL APPLICABILITY

The standard model creating apparatus of the present invention can be used as an apparatus that recognizes objects, such as speech, characters, and images, using a probability model or the like. For example, the standard model creating apparatus can be used as: a television receiving apparatus or a car navigation apparatus that executes various kinds of processing by voice; a translating apparatus that translates speech in one language into another; a game apparatus that is operated by voice; a search apparatus that searches for information on the basis of a search keyword by voice; an authentication apparatus that performs human detection, fingerprint authentication, face authentication, iris authentication, etc.; and an information processing apparatus that makes predictions, such as stock price prediction and weather prediction.

The invention claimed is:

1. A standard model creating apparatus for creating a standard model which shows an acoustic characteristic having a specific attribute and is used for speech recognition in an electronic apparatus used by a user, the standard model creating apparatus using a probability model that expresses a frequency parameter showing an acoustic characteristic as an output probability, the standard model creating apparatus comprising:

a reference model storing unit configured to store a plurality of reference models which are probability models showing an acoustic characteristic having a specific attribute; and a standard model creating unit configured to create the standard model by calculating statistics of the standard model using statistics of the plurality of reference models stored in said reference model storing unit, wherein said standard model creating unit includes:

a standard model structure determining unit configured to determine a structure of the standard model which is to be created, based on specification information regarding specifications of the electronic apparatus;

an initial standard model creating unit configured to determine initial values of the statistics specifying the standard model whose structure has been determined; and a statistics estimating unit configured to estimate and calculate the statistics of the standard model so as to maximize or locally maximize a probability or a likelihood of the standard model, whose initial values have been determined, with respect to the plurality of reference models, wherein the plurality of reference models and the standard model are expressed using at least one Gaussian distribution, said standard model structure determining unit is configured to determine a number of statistics of the standard model including at least a number of Gaussian mixture distributions as the structure of the standard model, said standard model structure determining unit is configured to determine a Gaussian mixture distribution having an Mf (Mf≧1) number of mixture distributions as the structure of the standard model, and said statistics estimating unit is configured to calculate at least one of a mixture weighting coefficient $\omega_{f(m)}$ (m=1, 2, ..., $M_f$), a mean value $\mu_{f(m)}$ (m=1,2, ..., $M_f$), and a variance $\sigma_{f(m)}^2$ (m=1,2, ..., $M_f$) which are the statistics of the standard model $$\sum_{m=1}^{M_f} \omega_{f(m)} f(x; \mu_{f(m)}, \sigma_{f(m)}^2)$$

(where $f(x;\mu_{f(m)},\sigma_{f(m)}^2)$ (m=1,2, ..., $M_f$) represents a Gaussian distribution, and $\chi$ represents input data) represented by the Gaussian mixture distribution so as to maximize or locally maximize a likelihood $$\log P = \sum_{i=1}^{N_g} \int_{-\infty}^{\infty} \log \left[ \sum_{m=1}^{M_f} \omega_{f(m)} f(x; \mu_{f(m)}, \sigma^2_{f(m)}) \right]$$

$$\left\{ \sum_{l=1}^{L_{g(i)}} v_{g(i,l)} g(x; \mu_{g(i,l)}, \sigma^2_{g(i,l)}) \right\} dx$$

of the standard model, with respect to Ng (Ng≧2) reference models $$\sum_{l=i}^{L_{g(i)}} v_{g(i,l)} g(x; \mu_{g(i,l)}, \sigma^2_{g(i,l)}) \ (i = 1, 2, \ldots, N_g)$$

(where
$g(x; \mu_{g(i,l)}, \sigma_{g(i,l)}^2)$ (i=1,2, ..., $N_g$, l=1,2, ..., $L_{(i)}$) represents a Gaussian distribution,
$L_{g(i)}$ (i=1,2, ..., $N_g$) represents a mixture distribution of each of reference models,
$v_{g(i,l)}$ (l=1,2, ..., $L_{g(i)}$) represents a mixture weighting coefficient,
$\mu^2_{g(i,l)}$ (l=1,2, ..., $L_{g(i)}$) represents a mean value, and
$\sigma_{g(i,l)}^2$ (l=1,2, ..., $L_{g(i)}$) represents a variance).

2. The standard model creating apparatus according to claim 1,
wherein the specification information indicates at least one of a type of an application program running on the electronic apparatus, and specifications of the electronic apparatus.

3. The standard model creating apparatus according to claim 1, further comprising:
a specification information holding unit configured to store an application/specifications correspondence database showing a correspondence between an application program which uses the standard model and specifications of the standard model,
wherein said standard model structure determining unit is configured to read specifications corresponding to an application program to be activated from the application/specifications correspondence database held by said specification information holding unit, and to determine the structure of the standard model based on the read specifications.

4. The standard model creating apparatus according to claim 1, further comprising:
a specification information creating unit configured to create the specification information,
wherein said standard model structure determining unit is configured to determine the structure of the standard model based on the created specification information.

5. The standard model creating apparatus according to claim 4,
wherein said specification information creating unit is configured to create the specification information with an Ni number of the Gaussian distributions when an instruction that the electronic apparatus is to perform quick speech recognition is obtained from the user, and to create the specification information with an N2 (>N1) number of the Gaussian distributions when an instruction that the electronic apparatus is to perform precise speech recognition is obtained from the user, and said standard model structure determining unit is configured to determine the number of the Gaussian mixture distributions according to the specification information created by said specification information creating unit.

6. The standard model creating apparatus according to claim 1, wherein the standard model creating apparatus is connected to a terminal apparatus via a communication channel, and further comprises:
a specification information receiving unit configured to receive the specification information from the terminal apparatus,
wherein said standard model structure determining unit is configured to determine the structure of the standard model based on the received specification information.

7. A method of creating a standard model which shows an acoustic characteristic having a specific attribute and is used for speech recognition in an electronic apparatus used by a user, the method using a probability model that expresses a frequency parameter showing an acoustic characteristic as an output probability, the method comprising:
a reference model reading step of reading plurality of reference models from a reference model storing unit which is configured to store a plurality of reference models which are probability models showing an acoustic characteristic having a specific attribute; and
a standard model creating step of creating the standard model by calculating statistics of the standard model using statistics of the plurality of reference models that has been read,
wherein the standard model creating step includes:
a standard model structure determining sub-step of determining a structure of the standard model which is to be created, based on specification information regarding specifications of the electronic apparatus;
an initial standard model creating sub-step of determining initial values of the statistics specifying the standard model whose structure has been determined; and
a statistics estimating sub-step of estimating and calculating the statistics of the standard model so as to maximize or locally maximize a probability or a likelihood of the standard model, whose initial values have been determined, with respect to plurality of reference models,
wherein the plurality of reference models and the standard model are expressed using at least one Gaussian distribution,
said standard model structure determining unit is configured to determine a number of statistics of the standard model including at least a number of Gaussian mixture distributions as the structure of the standard models
said standard model structure determining unit is configured to determine a Gaussian mixture distribution having an Mf (Mf≧1) number of mixture distributions as the structure of the standard model, and
said statistics estimating unit is configured to calculate at least one of a mixture weighting coefficient $\omega_{f(m)}$ (m=1, 2, ..., $M_f$), a mean value $\mu_{f(m)}$ (m=1,2, ..., $M_f$), and a variance $\sigma_{f(m)}^2$ (m=1,2, ..., $M_f$) which are the statistics of the standard model $$\sum_{m=1}^{M_f} \omega_{f(m)} f(x; \mu_{f(m)}, \sigma^2_{f(m)})$$

(where
f(x; $\mu_{f(m)}, \sigma_{f(m)}^2$) (m=1,2, ..., $M_f$) represents a Gaussian distribution, and $\chi$ represents input data) represented by the Gaussian mixture distribution so as to maximize or locally maximize a likelihood $$\log P = \sum_{i=1}^{N_g} \int_{-\infty}^{\infty} \log\left[\sum_{m=1}^{M_f} \omega_{f(m)} f(x; \mu_{f(m)}, \sigma_{f(m)}^2)\right] \left\{\sum_{l=1}^{L_{g(i)}} \upsilon_{g(i,l)} g(x; \mu_{g(i,l)}, \sigma_{g(i,l)}^2)\right\} dx$$

of the standard model, with respect to Ng (Ng≧2) reference models $$\sum_{l=1}^{L_{g(i)}} \upsilon_{g(i,l)} g(x; \mu_{g(i,l)}, \sigma_{g(i,l)}^2)(i = 1, 2, ..., N_g)$$

(where
g(x;$\mu_{g(i,l)}, \sigma_{g(i,l)}^2$) (i=1,2,..., $N_g$, l=1,2,..., $L_{(i)}$) represents a Gaussian distribution,
$L_{g(i)}$ (i=1,2, ..., $N_g$) represents a mixture distribution of each of reference models,
$\upsilon_{g(i,l)}$ (l=1,2, ..., $L_{g(i)}$) represents a mixture weighting coefficient,
$\mu_{g(i,l)}^2$ (l=1,2, ..., $L_{g(i)}$) represents a mean value, and
$\sigma_{g(i,l)}^2$ (l=1,2, ..., $L_{g(i)}$) represents a variance).

8. A program stored on a computer-readable medium which when executed causes a standard model creating apparatus to perform steps for creating a standard model which shows an acoustic characteristic having a specific attribute and is used for speech recognition in an electronic apparatus used by a user, the program using a probability model that expresses a frequency parameter showing an acoustic characteristic as an output probability, the steps comprising:
a reference model reading step of reading plurality of reference models from a reference model storing unit which is configured to store a plurality of reference models which are probability models showing an acoustic characteristic having a specific attribute; and
a standard model creating step of creating the standard model by calculating statistics of the standard model using statistics of the plurality of reference models that has been read,
wherein the standard model creating step includes:
a standard model structure determining sub-step configured to determine a structure of the standard model which is to be created, based on specification information regarding specifications of the electronic apparatus;
an initial standard model creating sub-step of determining initial values of the statistics specifying the standard model whose structure has been determined; and
a statistics estimating sub-step of estimating and calculating the statistics of the standard model so as to maximize or locally maximize a probability or a likelihood of the standard model, whose initial values have been determined, with respect to the plurality of reference models
wherein the plurality of reference models and the standard model are expressed using at least one Gaussian distribution, and
said standard model structure determining unit is configured to determine a number of statistics of the standard model including at least a number of Gaussian mixture distributions as the structure of the standard model,
said standard model structure determining unit is configured to determine a Gaussian mixture distribution having an Mf (Mf≧1) number of mixture distributions as the structure of the standard model, and
said statistics estimating unit is configured to calculate at least one of a mixture weighting coefficient $\omega_{f(m)}$ (m=1, 2, ..., $M_f$), a mean value $\mu_{f(m)}$ (m=1,2, ..., $M_f$), and a variance $\sigma_{f(m)}^2$ (m=1,2, ..., $M_f$) which are the statistics of the standard model $$\sum_{m=1}^{M_f} \omega_{f(m)} f(x; \mu_{f(m)}, \sigma_{f(m)}^2)$$

(where
f(x;$\mu_{f(m)}, \sigma_{f(m)}^2$) (m=1,2, ..., $M_f$ represents a Gaussian distribution, and $\chi$ represents input data) represented by the Gaussian mixture distribution so as to maximize or locally maximize a likelihood $$\log P = \sum_{i=1}^{N_g} \int_{-\infty}^{\infty} \log\left[\sum_{m=1}^{M_f} \omega_{f(m)} f(x; \mu_{f(m)}, \sigma_{f(m)}^2)\right] \left\{\sum_{l=1}^{L_{g(i)}} \upsilon_{g(i,l)} g(x; \mu_{g(i,l)}, \sigma_{g(i,l)}^2)\right\} dx$$

of the standard model, with respect to Ng (Ng≧2) reference models $$\sum_{l=1}^{L_{g(i)}} \upsilon_{g(i,l)} g(x; \mu_{g(i,l)}, \sigma_{g(i,l)}^2) \ (i = 1, 2, ..., N_g)$$

(where
g(x;$\mu_{g(i,l)}, \sigma_{g(i,l)}^2$) (i=1,2,..., $N_g$, l=1,2,..., $L_{(i)}$) represents a Gaussian distribution,
$L_{g(i)}$ (i=1,2, ..., $N_g$) represents a mixture distribution of each of reference models,
$\upsilon_{g(i,l)}$ (l=1,2, ..., $L_{g(i)}$) represents a mixture weighting coefficient,
$\mu_{g(i,l)}$ (l=1,2, ..., $L_{g(i)}$) represents a mean value, and
$\sigma_{g(i,l)}^2$ (l=1,2, ..., $L_{g(i)}$) represents a variance).

* * * * *